(12) United States Patent
Bazyn et al.

(10) Patent No.: US 9,182,018 B2
(45) Date of Patent: *Nov. 10, 2015

(54) CONTINUOUSLY AND/OR INFINITELY VARIABLE TRANSMISSIONS AND METHODS THEREFOR

(71) Applicant: Fallbrook Intellectual Property Company LLC, Cedar Park, TX (US)

(72) Inventors: Matthew R Bazyn, Leander, TX (US); Jeremy Carter, Austin, TX (US); Charles B Lohr, Austin, TX (US); Curtis Malone, Mustang, OK (US); Loren T McDaniel, Austin, TX (US); Peter D Poxton, Mustang, OK (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,866

(22) Filed: Jan. 6, 2014

(65) Prior Publication Data

US 2014/0141919 A1 May 22, 2014

Related U.S. Application Data

(63) Continuation of application No. 13/679,337, filed on Nov. 16, 2012, now Pat. No. 8,622,866, which is a continuation of application No. 12/394,821, filed on Feb. 27, 2009, now Pat. No. 8,313,405.

(60) Provisional application No. 61/032,834, filed on Feb. 29, 2008.

(51) Int. Cl.
*F16H 15/50* (2006.01)
*F16H 15/52* (2006.01)
*F16H 57/04* (2010.01)

(52) U.S. Cl.
CPC .............. *F16H 15/503* (2013.01); *F16H 15/50* (2013.01); *F16H 15/52* (2013.01); *F16H 57/043* (2013.01); *F16H 57/0487* (2013.01); *F16H 57/0426* (2013.01); *Y10T 74/19555* (2015.01)

(58) Field of Classification Search
CPC .................................. F16H 15/50; F16H 15/52
See application file for complete search history.

(56) References Cited

U.S. PATENT DOCUMENTS

| 719,595 A | 2/1903 | Huss |
|---|---|---|
| 1,121,210 A | 12/1914 | Techel |

(Continued)

FOREIGN PATENT DOCUMENTS

| CH | 118064 | 12/1926 |
|---|---|---|
| CN | 1054340 | 9/1991 |

(Continued)

OTHER PUBLICATIONS

Office Action dated Feb. 24, 2010 from Japanese Patent Application No. 2006-508892.

(Continued)

*Primary Examiner* — Tisha Lewis
(74) *Attorney, Agent, or Firm* — Knobbe Martens Olson & Bear LLP

(57) ABSTRACT

An infinitely variable transmission (IVT) having a rotatable input shaft arranged along a longitudinal axis of the transmission. In one embodiment, the input shaft is adapted to supply a lubricant to the interior of the transmission. In some embodiments, a stator assembly is coupled to, and coaxial with, the input shaft. The IVT has a plurality of planets operably coupled to the stator assembly. The planets are arranged angularly about the longitudinal axis of the transmission. In one embodiment, a traction ring is operably coupled to the planets. The IVT is provided with a housing that is operably coupled to the traction ring. The housing is substantially fixed from rotating with the input shaft. The traction ring is substantially fixed from rotating with the input shaft. In some embodiments, the IVT is provided with a lubricant manifold that is configured to supply a lubricant to the input shaft.

18 Claims, 41 Drawing Sheets

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |

(56) References Cited

U.S. PATENT DOCUMENTS

| | | |
|---|---|---|
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |

(56) References Cited

U.S. PATENT DOCUMENTS

| | | |
|---|---|---|
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 * | 11/2012 | Bazyn et al. .................. 475/196 |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,535,199 B2 | 9/2013 | Lohr et al. |
| 8,550,949 B2 | 10/2013 | Miller |
| 8,585,528 B2 | 11/2013 | Carter et al. |
| 8,622,866 B2 * | 1/2014 | Bazyn et al. .................. 475/196 |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,784,248 B2 | 7/2014 | Murakami et al. |
| 8,888,643 B2 | 11/2014 | Lohr et al. |
| 8,996,263 B2 | 3/2015 | Quinn et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0128107 A1 | 9/2002 | Wakayama |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0085979 A1 | 4/2005 | Carlson et al. |

(56) References Cited

U.S. PATENT DOCUMENTS

| | | |
|---|---|---|
| 2005/0184580 A1 | 8/2005 | Kuan et al. |
| 2005/0227809 A1 | 10/2005 | Bitzer et al. |
| 2006/0006008 A1 | 1/2006 | Brunemann et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039274 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0132135 A1 | 5/2009 | Quinn et al. |
| 2009/0251013 A1 | 10/2009 | Vollmer et al. |
| 2009/0312145 A1* | 12/2009 | Pohl et al. ........................ 477/37 |
| 2010/0093479 A1 | 4/2010 | Carter et al. |
| 2010/0137094 A1* | 6/2010 | Pohl .............................. 475/149 |
| 2011/0088503 A1 | 4/2011 | Armstrong et al. |
| 2011/0127096 A1 | 6/2011 | Schneidewind |
| 2011/0184614 A1 | 7/2011 | Keilers et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0079191 A1 | 3/2013 | Lohr |
| 2013/0095977 A1 | 4/2013 | Smithson et al. |
| 2013/0102434 A1 | 4/2013 | Nichols et al. |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288844 A1 | 10/2013 | Thomassy |
| 2013/0288848 A1 | 10/2013 | Carter et al. |
| 2013/0310214 A1 | 11/2013 | Pohl et al. |
| 2013/0324344 A1* | 12/2013 | Pohl et al. ..................... 475/185 |
| 2013/0331218 A1 | 12/2013 | Lohr et al. |
| 2013/0337971 A1 | 12/2013 | Kostrup |
| 2014/0011619 A1 | 1/2014 | Pohl et al. |
| 2014/0011628 A1 | 1/2014 | Lohr et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0144260 A1 | 5/2014 | Nichols et al. |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |

FOREIGN PATENT DOCUMENTS

| | | |
|---|---|---|
| CN | 1157379 | 8/1997 |
| CN | 1281540 A | 1/2001 |
| CN | 1283258 | 2/2001 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 A1 | 5/2003 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 832 816 | 4/1998 |
| EP | 0 976 956 | 2/2000 |
| EP | 1 136 724 | 9/2001 |
| EP | 1 366 978 | 3/2003 |
| EP | 1 433 641 | 6/2004 |
| EP | 1 624 230 | 2/2006 |
| EP | 1 811 202 | 7/2007 |
| FR | 620375 | 4/1927 |
| FR | 2460427 | 1/1981 |
| FR | 2590638 | 5/1987 |
| FR | 2909938 | 6/2008 |
| GB | 391448 | 4/1933 |
| GB | 592320 | 9/1947 |
| GB | 906020 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035482 | 6/1980 |
| GB | 2080452 | 8/1982 |
| JP | 44-1098 | 1/1944 |
| JP | 38-025315 | 11/1963 |
| JP | 41-3126 | 2/1966 |
| JP | 42-2843 | 2/1967 |
| JP | 42-2844 | 2/1967 |
| JP | 47-000448 | 7/1972 |
| JP | 47-29762 | 11/1972 |
| JP | 48-54371 | 7/1973 |
| JP | 49-12742 | 3/1974 |
| JP | 49-013823 | 4/1974 |
| JP | 50-114581 | 9/1975 |
| JP | 51-25903 | 8/1976 |
| JP | 51-150380 | 12/1976 |
| JP | 47-20535 | 8/1977 |
| JP | 53-048166 | 1/1978 |
| JP | 55-135259 | 4/1979 |
| JP | 56-047231 | 4/1981 |
| JP | 56-127852 | 10/1981 |
| JP | 58-065361 | 4/1983 |
| JP | 59-069565 | 4/1984 |
| JP | 59-144826 | 8/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-286750 | 11/1989 |

(56) References Cited

FOREIGN PATENT DOCUMENTS

| | | |
|---|---|---|
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-223555 | 10/1991 |
| JP | 04-166619 | 6/1992 |
| JP | 04-272553 | 9/1992 |
| JP | 4-351361 | 12/1992 |
| JP | 5-87154 | 4/1993 |
| JP | 52-35481 | 9/1993 |
| JP | 06-050169 | 2/1994 |
| JP | 6-50358 | 2/1994 |
| JP | 7-42799 | 2/1995 |
| JP | 07-133857 | 5/1995 |
| JP | 7-139600 | 5/1995 |
| JP | 07-259950 | 10/1995 |
| JP | 08-170706 | 7/1996 |
| JP | 09-024743 | 1/1997 |
| JP | 09-089064 | 3/1997 |
| JP | 10-061739 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |
| JP | 41-1063130 | 3/1999 |
| JP | 11-257479 | 9/1999 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-521109 | 11/2001 |
| JP | 2002-147558 | 5/2002 |
| JP | 2002-250421 | 6/2002 |
| JP | 2002-307956 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003-524119 | 8/2003 |
| JP | 2003-336732 | 11/2003 |
| JP | 2004-162652 | 6/2004 |
| JP | 2004-189222 | 7/2004 |
| JP | 8-247245 | 9/2004 |
| JP | 2004-526917 | 9/2004 |
| JP | 2005-003063 | 1/2005 |
| JP | 2005-240928 | 9/2005 |
| JP | 2006-015025 | 1/2006 |
| JP | 2003-194207 | 10/2006 |
| JP | 2006-283900 | 10/2006 |
| JP | 2006-300241 | 11/2006 |
| JP | 2008-002687 | 1/2008 |
| JP | 03-149442 | 1/2009 |
| JP | 2010-069005 | 4/2010 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| WO | WO 99/20918 | 4/1999 |
| WO | WO 01/73319 | 10/2001 |
| WO | WO 03/100294 | 12/2003 |
| WO | WO 2005/083305 | 9/2005 |
| WO | WO 2005/108825 | 11/2005 |
| WO | WO 2005/111472 | 11/2005 |
| WO | WO 2006/091503 | 8/2006 |
| WO | WO 2008/078047 | 7/2008 |
| WO | WO 2008/095116 | 8/2008 |
| WO | WO 2008/100792 | 8/2008 |
| WO | WO 2008/154437 | 12/2008 |
| WO | WO 2010/017242 | 2/2010 |
| WO | WO 2010/135407 | 11/2010 |
| WO | WO 2011/101991 | 8/2011 |
| WO | WO 2012/030213 | 3/2012 |
| WO | WO 2013/112408 | 8/2013 |

OTHER PUBLICATIONS

Office Action dated Feb. 17, 2010 from Japanese Patent Application No. 2009-294086.
International Search Report and Written Opinion dated Feb. 2, 2010 from International Patent Application No. PCT/US2008/068929, filed on Jan. 7, 2008.
Office Action dated Nov. 22, 2011 for U.S. Appl. No. 12/394,821.
International Search Report and Written Opinion dated Aug. 6, 2009 for PCT Application No. PCT/US2009/035540.
Thomassy: An Engineering Approach to Simulating Traction EHL. CVT-Hybrid International Conference Mecc/Maastricht/The Netherlands, Nov. 17-19, 2010, p. 97.
Office Action dated May 14, 2013 in U.S. Appl. No. 13/679,337.

* cited by examiner

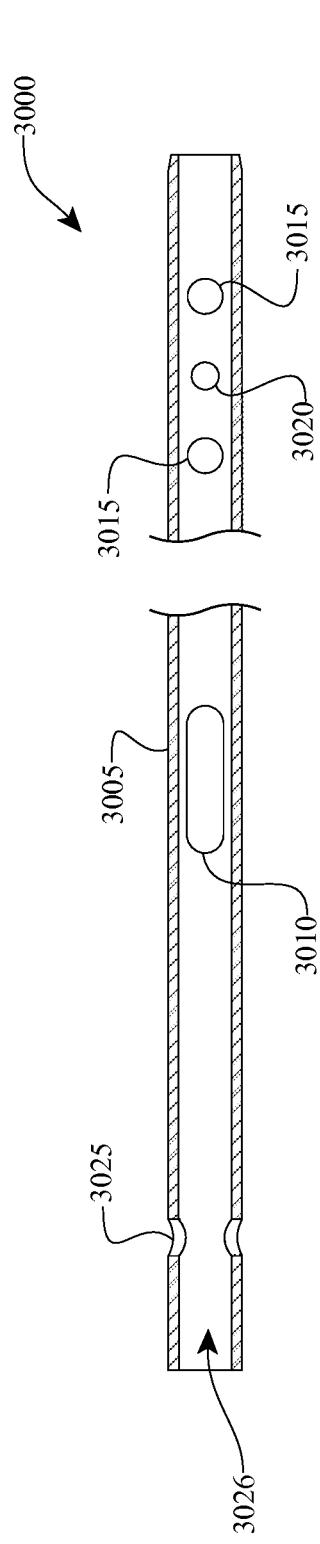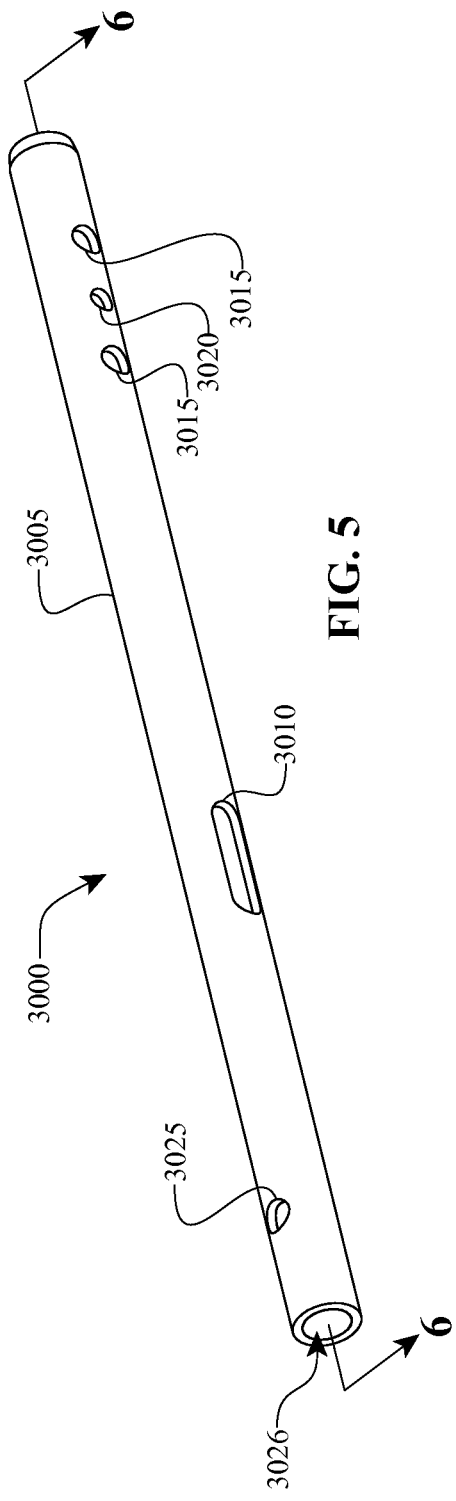
FIG. 6
FIG. 5

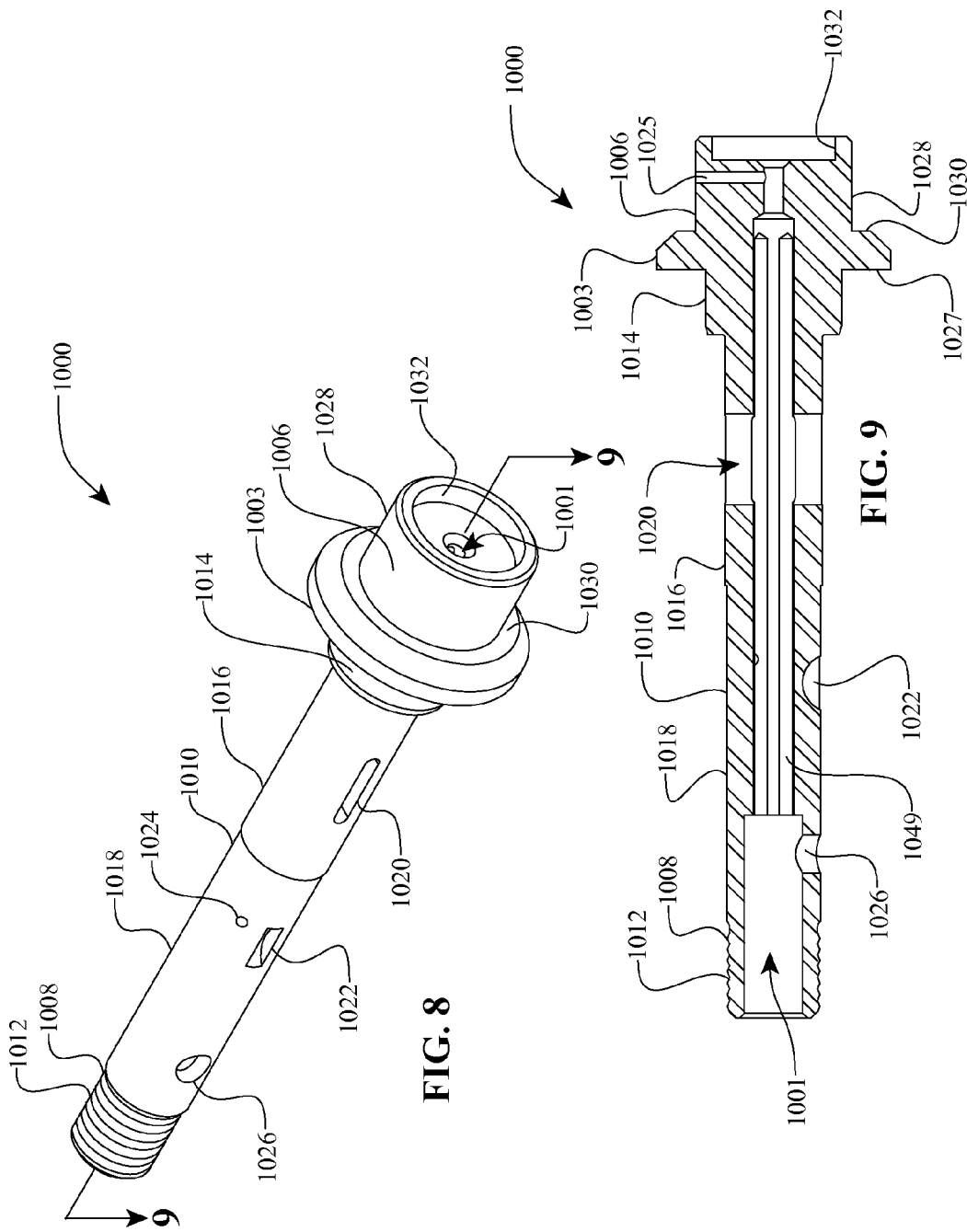

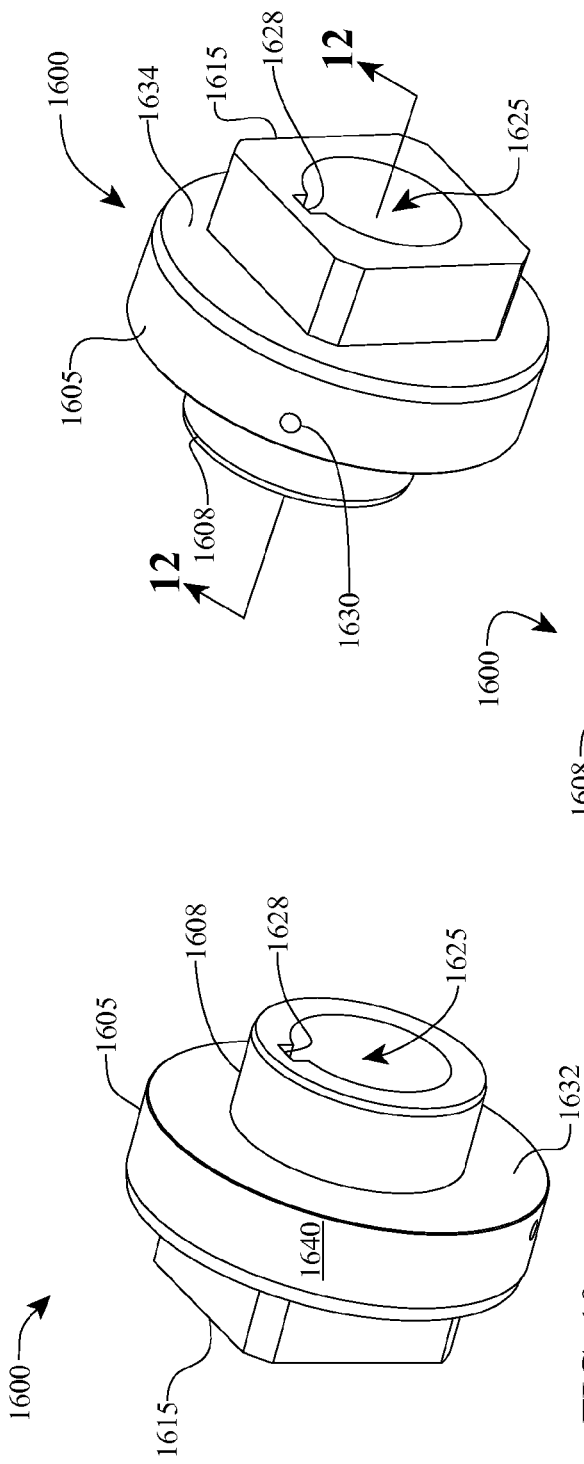
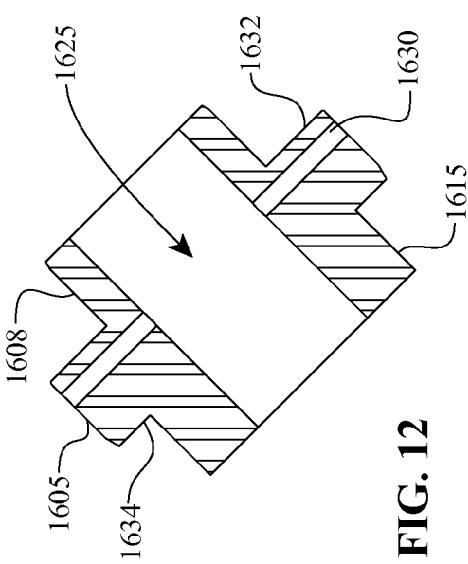
FIG. 11
FIG. 12
FIG. 10

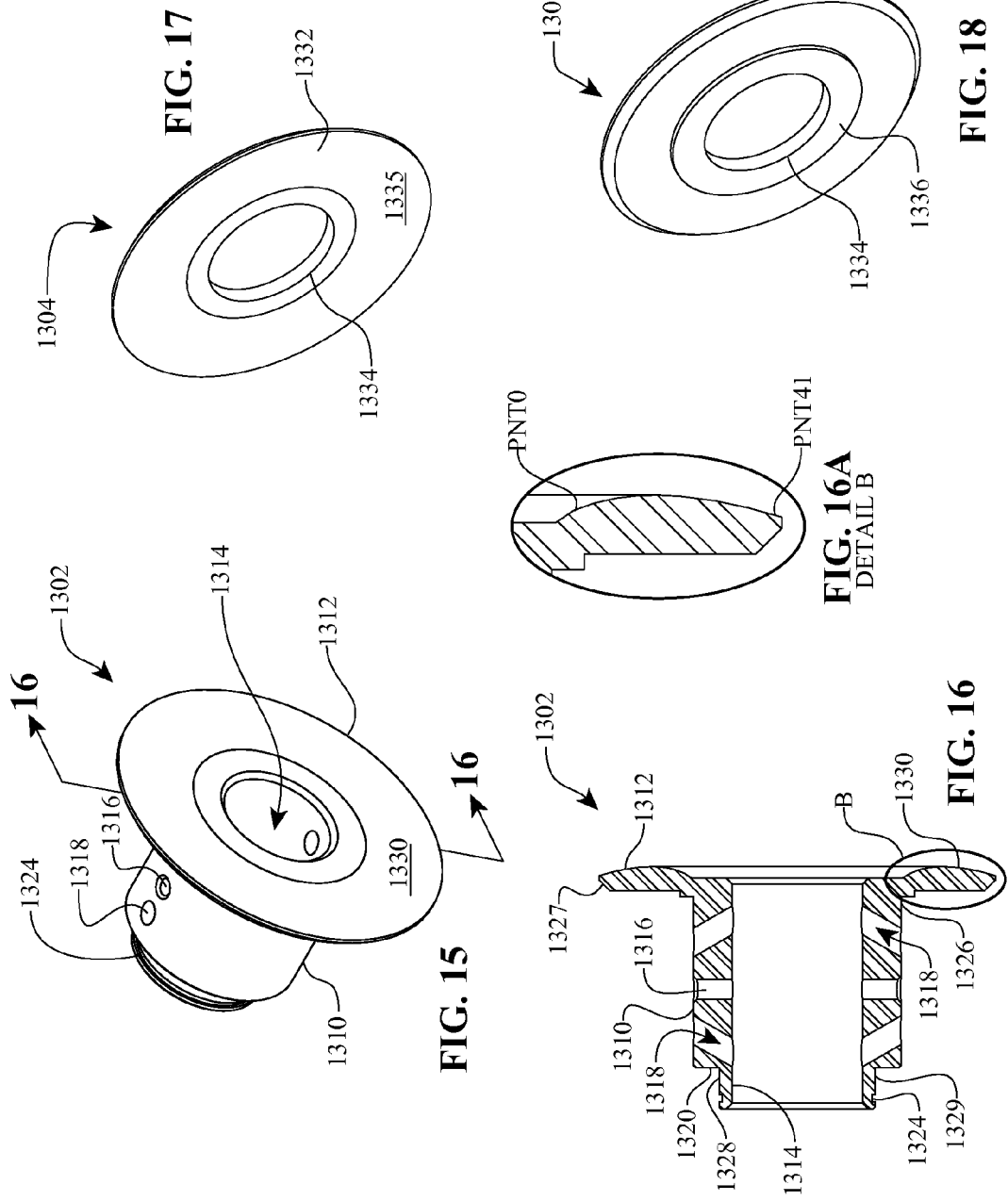

| CAM SURFACE PROFILE | | |
|---|---|---|
| Point Name | X | Y |
| PNT0 | -9.007 | 27.690 |
| PNT1 | -9.030 | 28.189 |
| PNT2 | -9.029 | 28.689 |
| PNT3 | -9.011 | 29.189 |
| PNT4 | -8.979 | 29.688 |
| PNT5 | -8.935 | 30.186 |
| PNT6 | -8.882 | 30.683 |
| PNT7 | -8.819 | 31.179 |
| PNT8 | -8.747 | 31.674 |
| PNT9 | -8.668 | 32.168 |
| PNT10 | -8.582 | 32.660 |
| PNT11 | -8.489 | 33.152 |
| PNT12 | -8.390 | 33.642 |
| PNT13 | -8.285 | 34.131 |
| PNT14 | -8.174 | 34.618 |
| PNT15 | -8.058 | 35.104 |
| PNT16 | -7.937 | 35.589 |
| PNT17 | -7.811 | 36.073 |
| PNT18 | -7.680 | 36.556 |
| PNT19 | -7.544 | 37.037 |
| PNT20 | -7.404 | 37.517 |
| PNT21 | -7.259 | 37.996 |
| PNT22 | -7.110 | 38.473 |
| PNT23 | -6.958 | 38.949 |
| PNT24 | -6.801 | 39.424 |
| PNT25 | -6.640 | 39.897 |
| PNT26 | -6.476 | 40.370 |
| PNT27 | -6.308 | 40.841 |
| PNT28 | -6.136 | 41.310 |
| PNT29 | -5.961 | 41.778 |
| PNT30 | -5.783 | 42.246 |
| PNT31 | -5.601 | 42.711 |
| PNT32 | -5.416 | 43.176 |
| PNT33 | -5.227 | 43.639 |
| PNT34 | -5.036 | 44.101 |
| PNT35 | -4.841 | 44.561 |
| PNT36 | -4.644 | 45.021 |
| PNT37 | -4.443 | 45.479 |
| PNT38 | -4.240 | 45.935 |
| PNT39 | -4.033 | 46.391 |
| PNT40 | -3.824 | 46.845 |
| PNT41 | -3.528 | 47.475 |

FIG. 19

DETAIL A

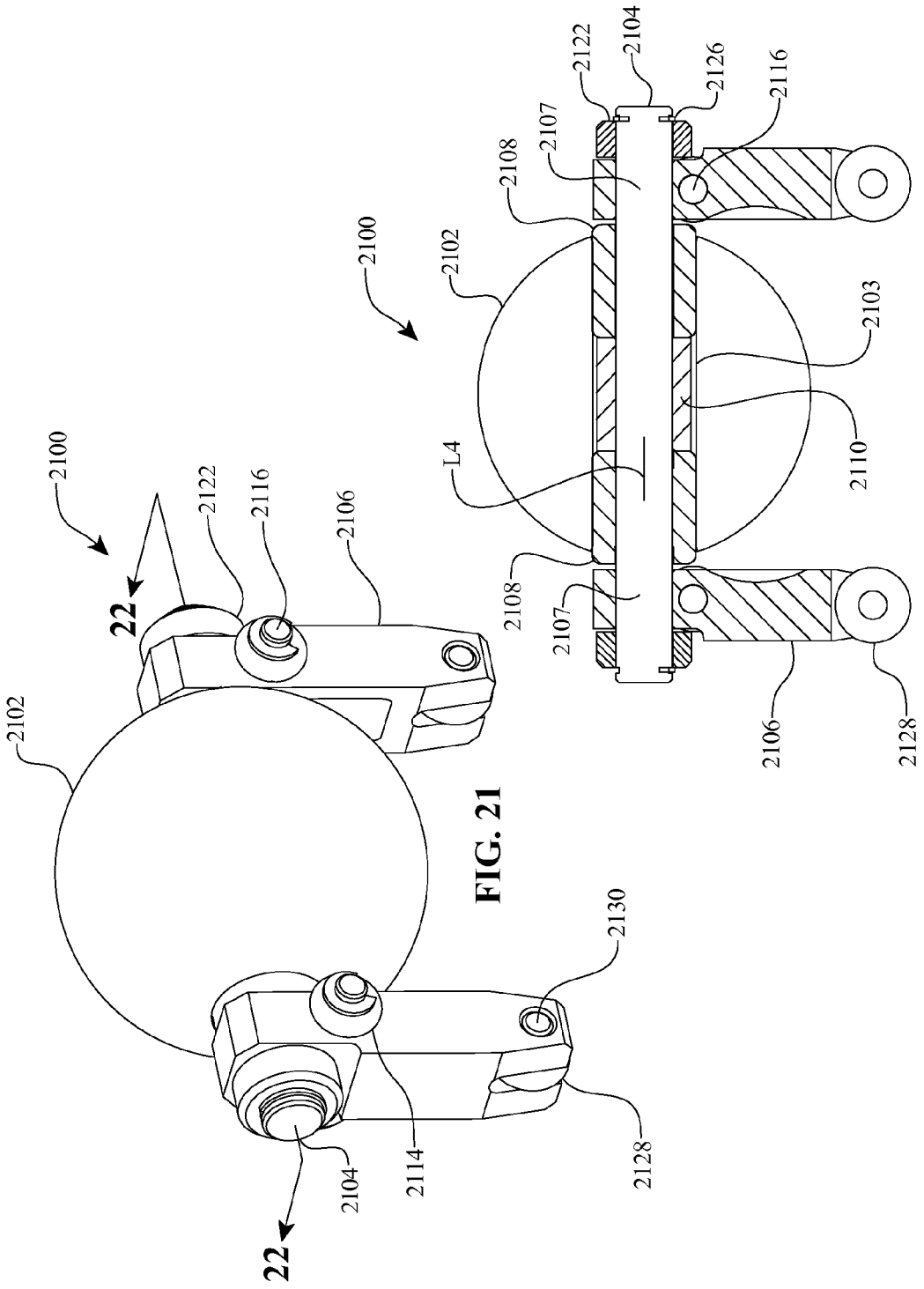

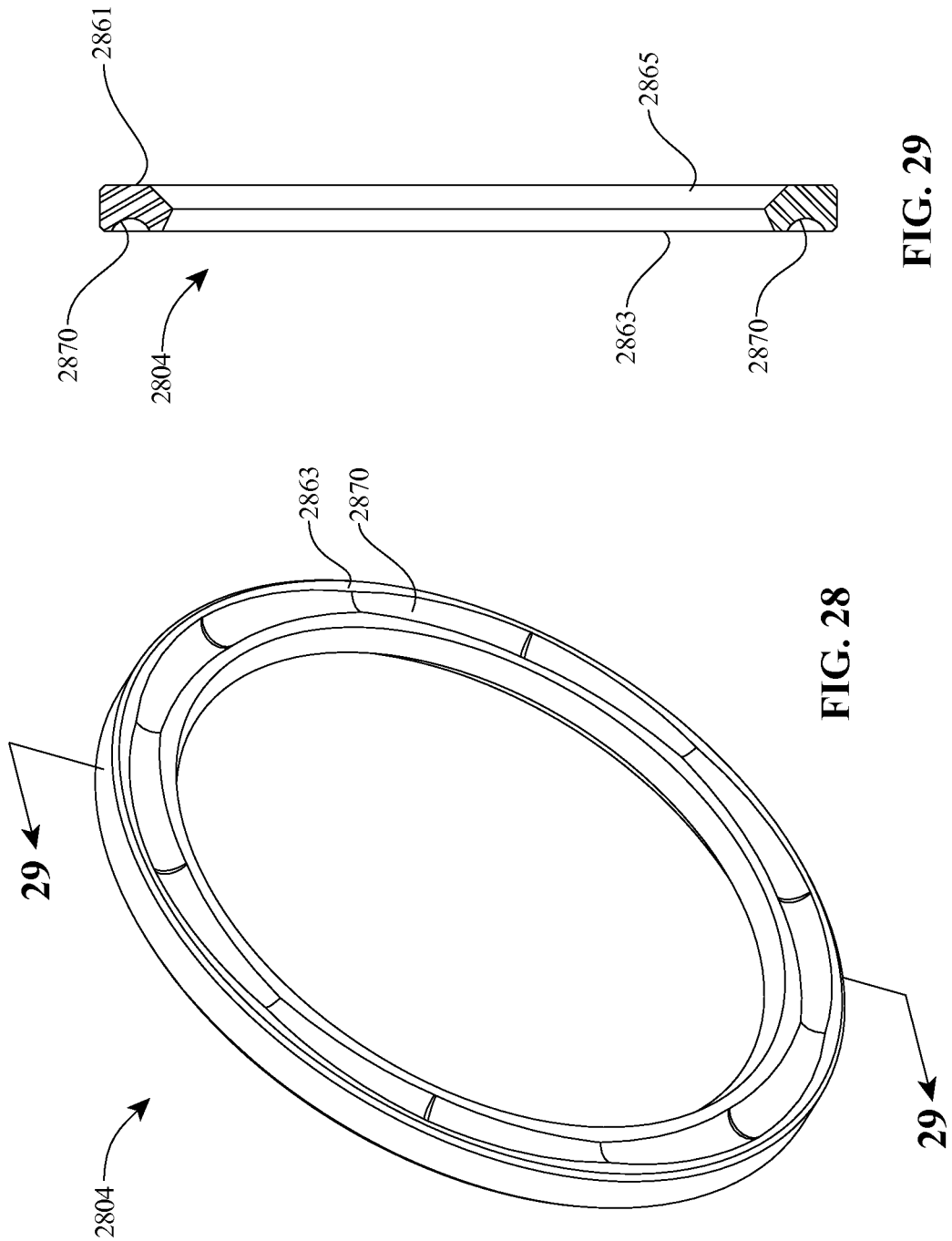

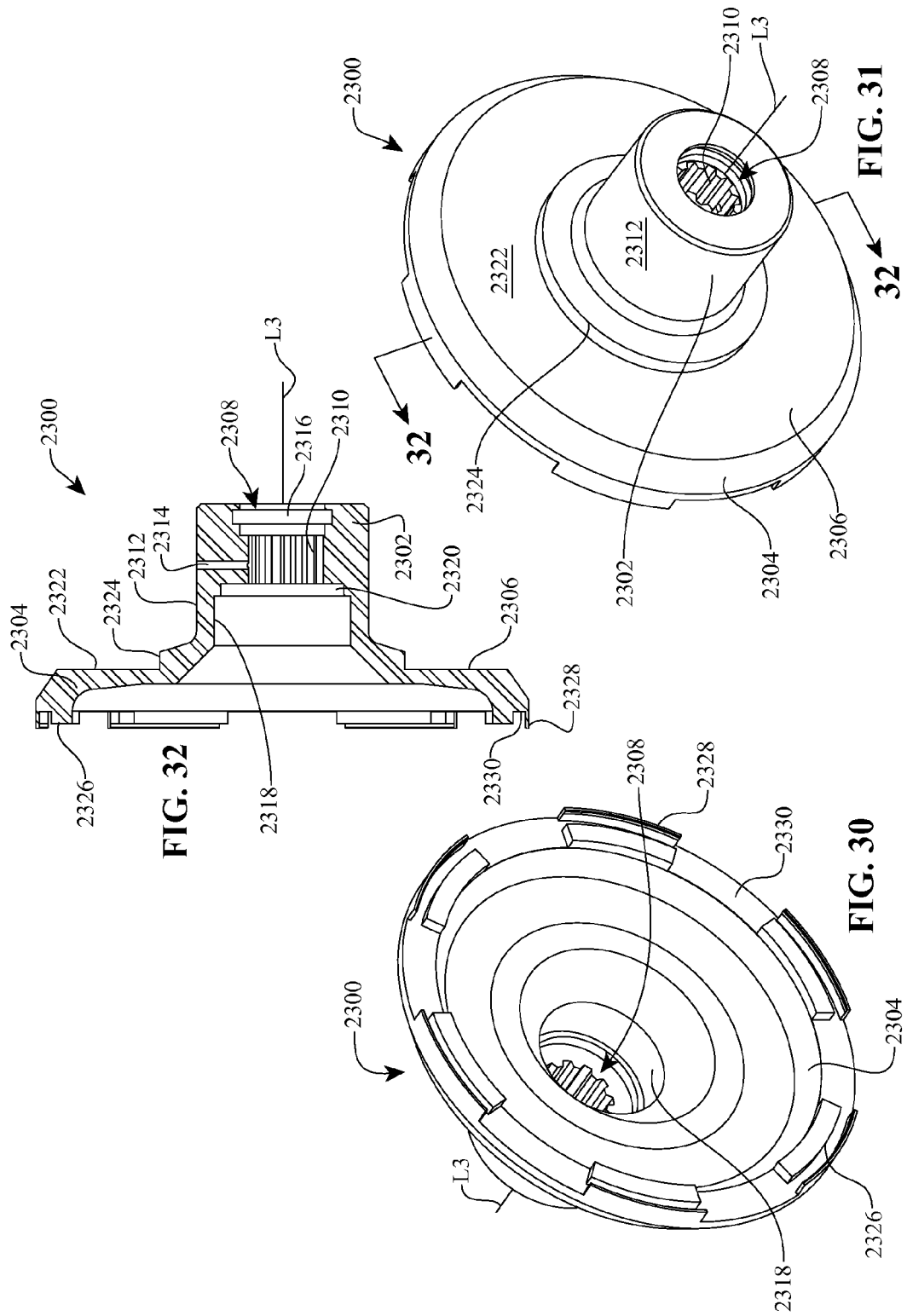

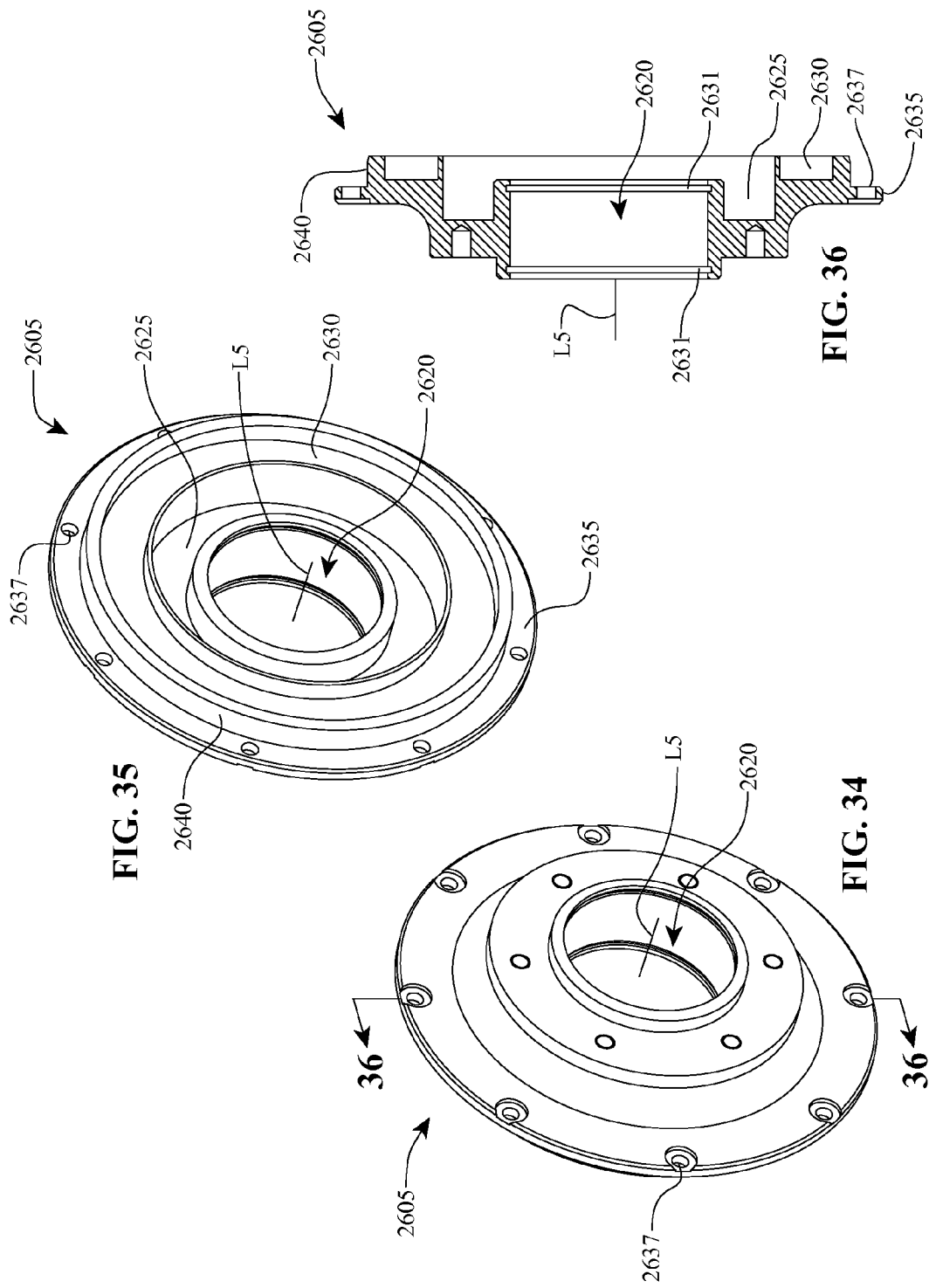

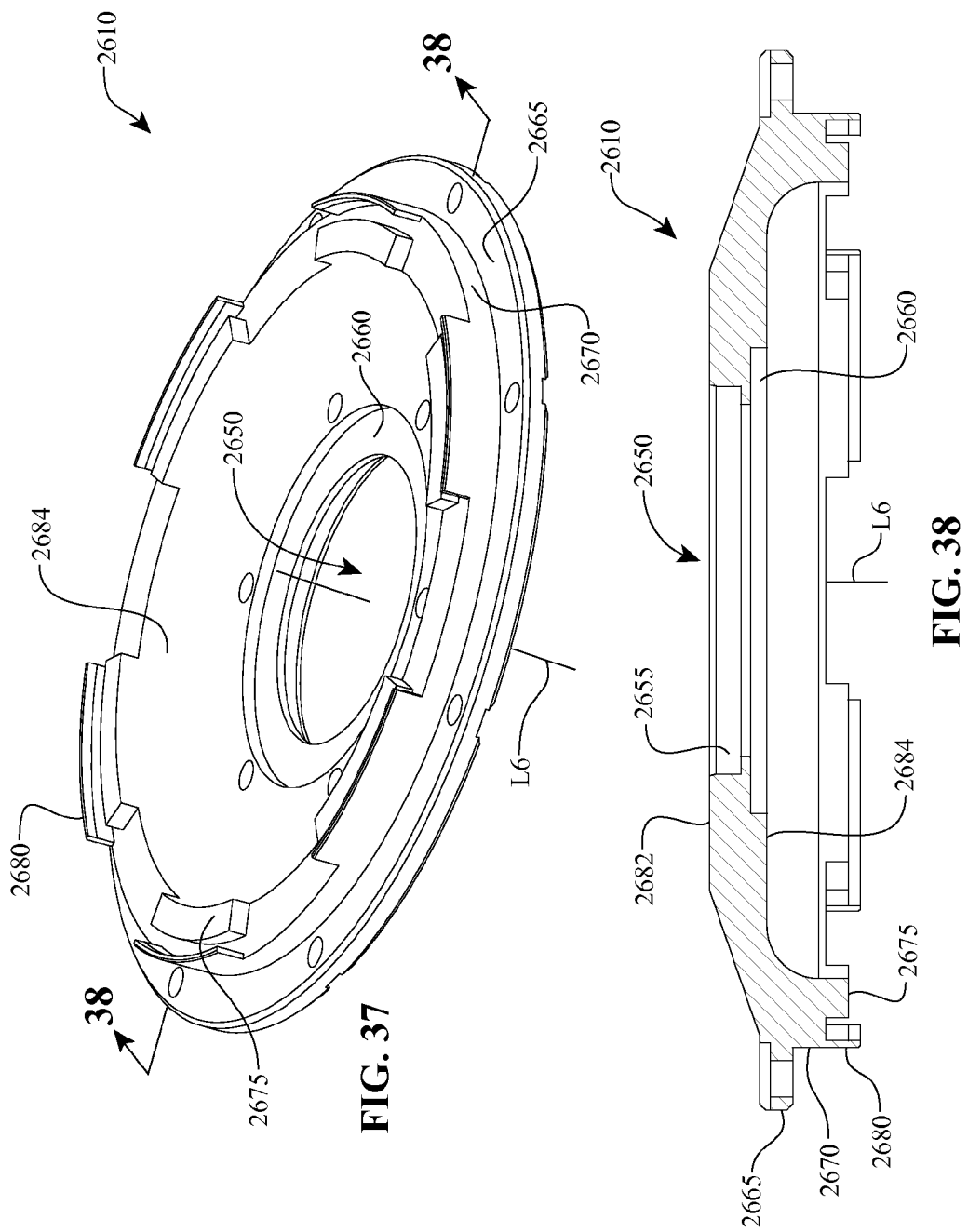

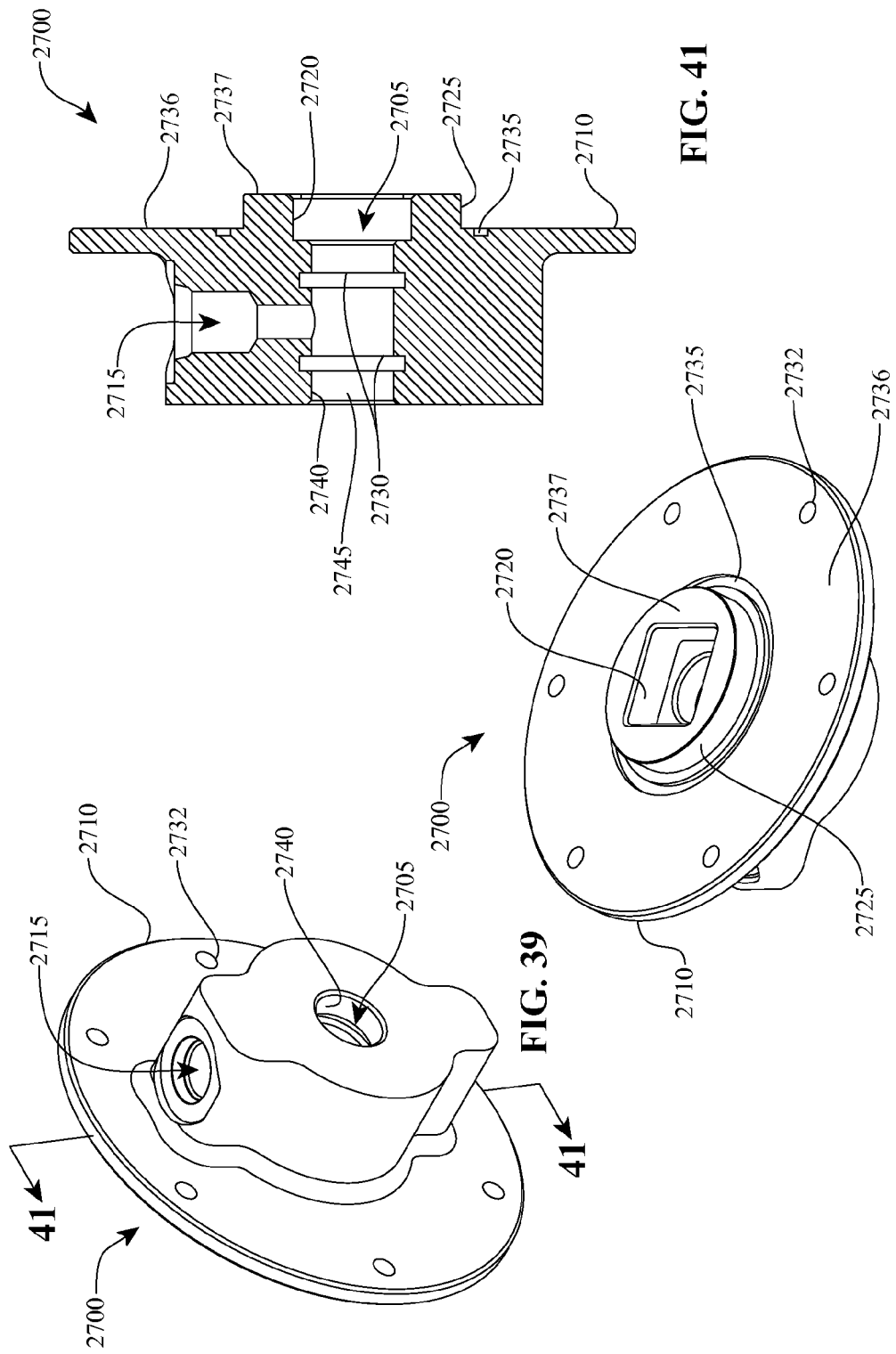

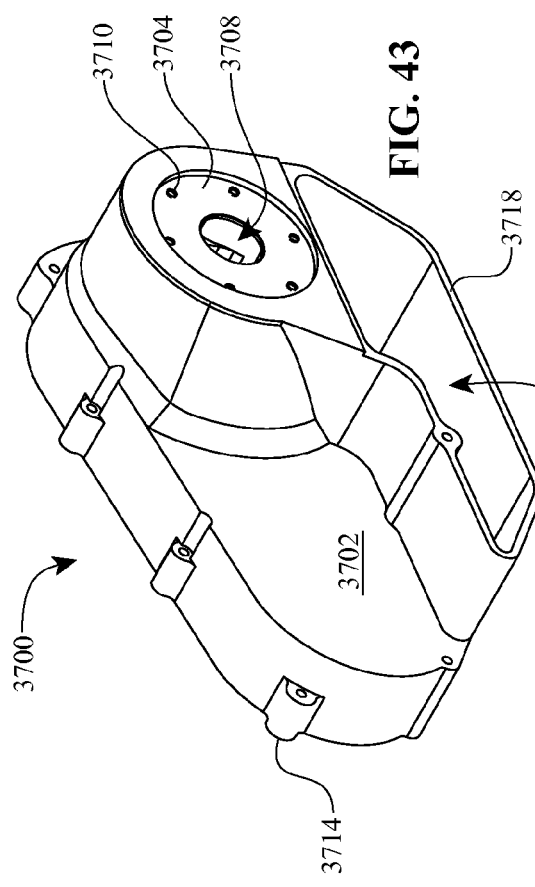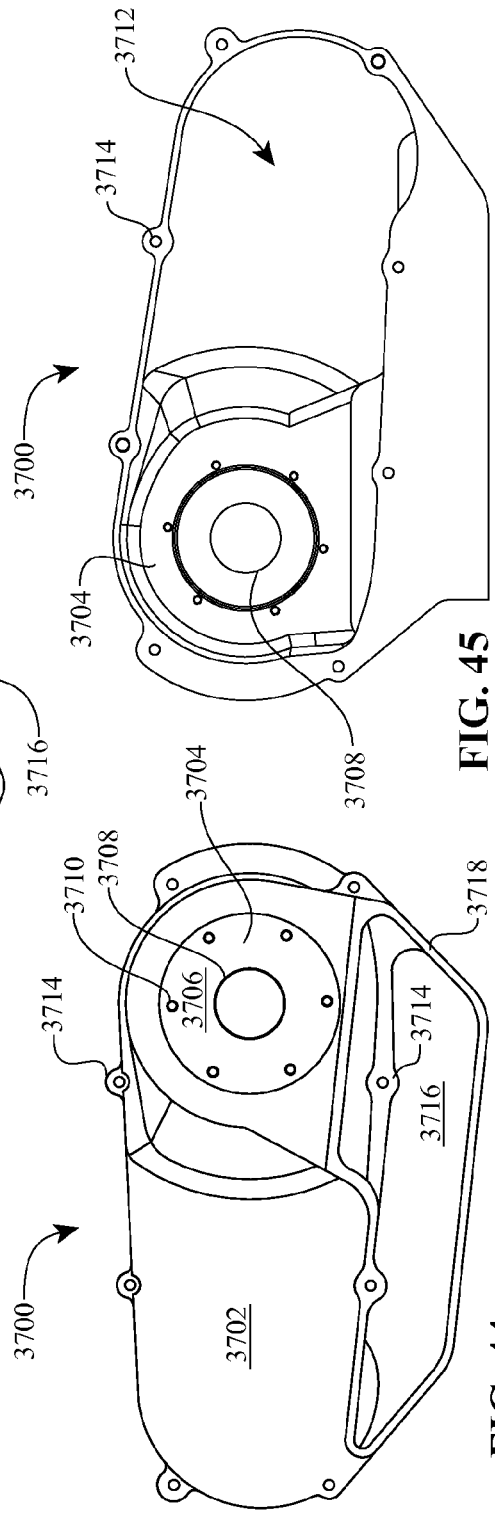
FIG. 43
FIG. 44
FIG. 45

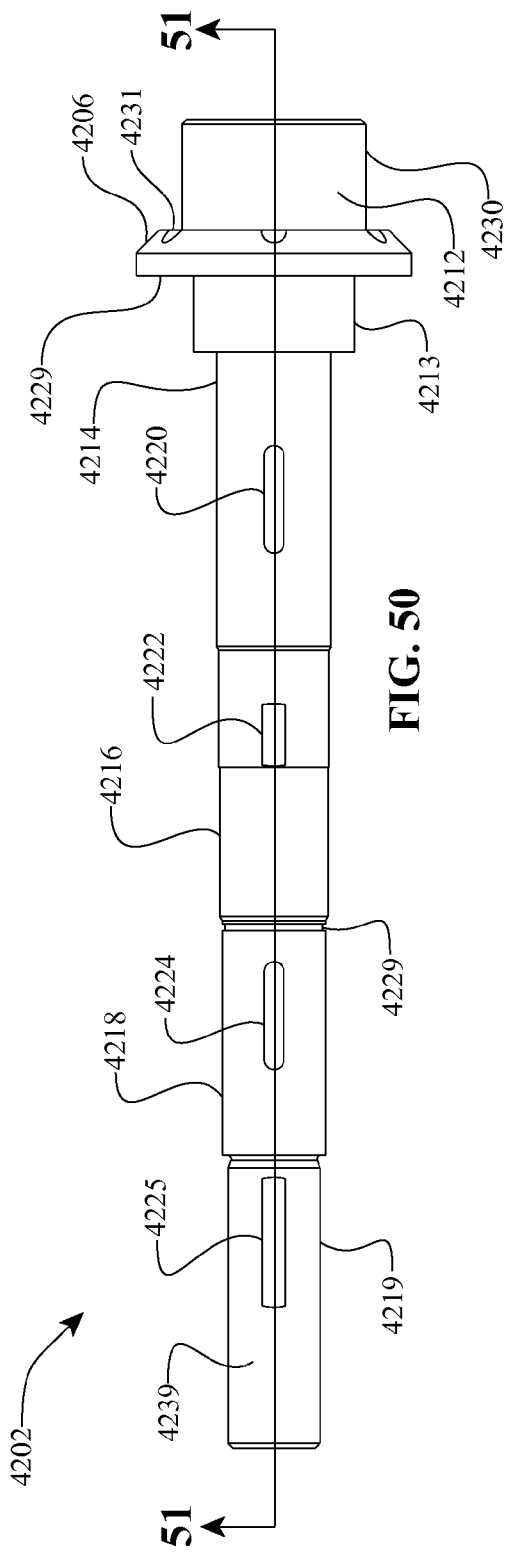
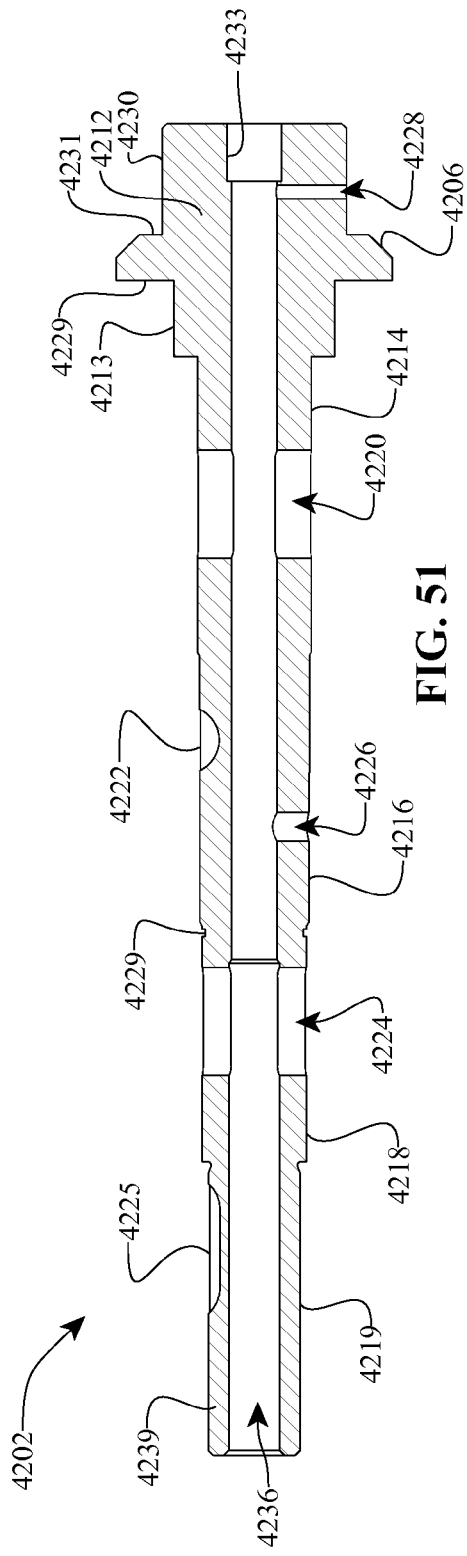
FIG. 50
FIG. 51

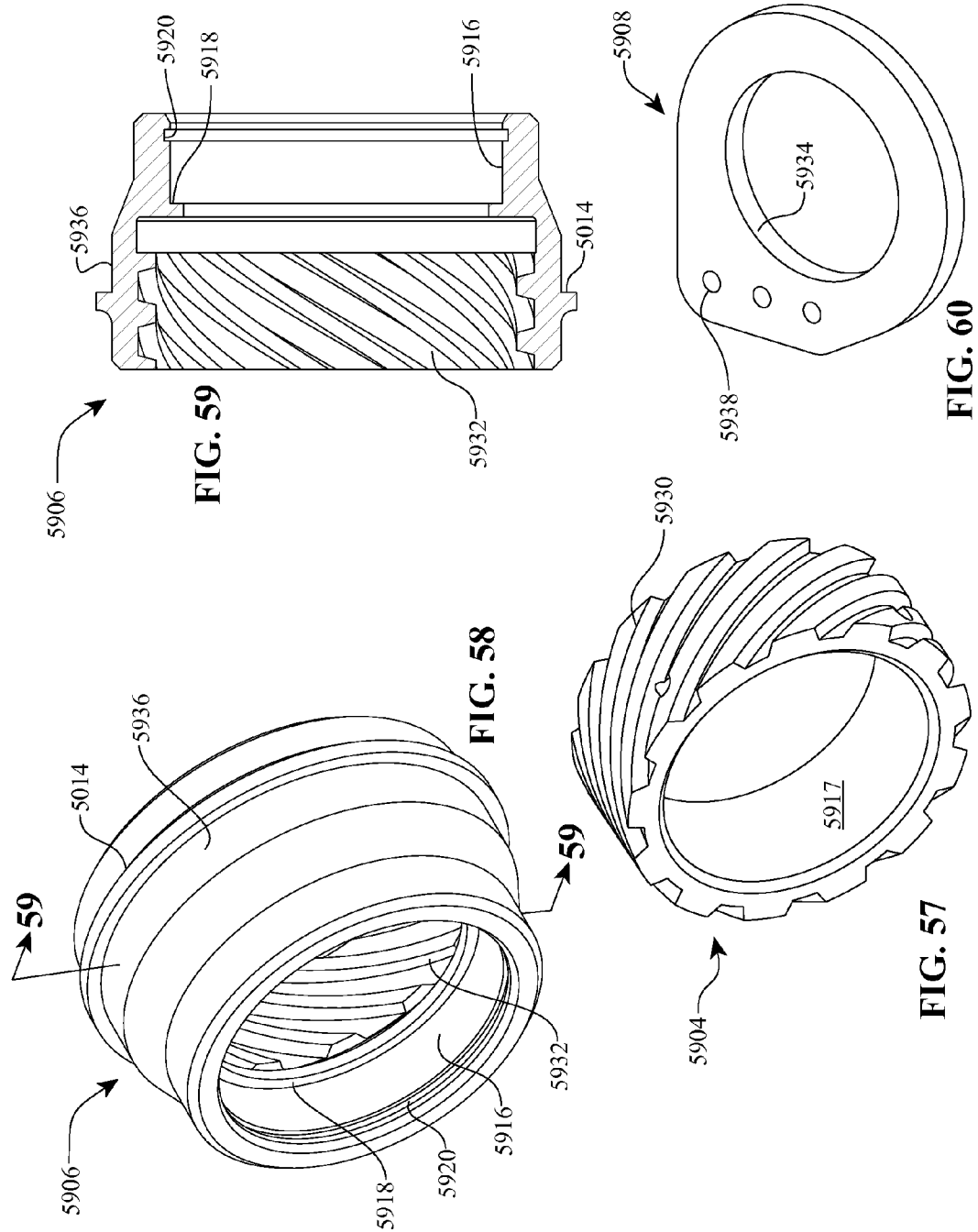

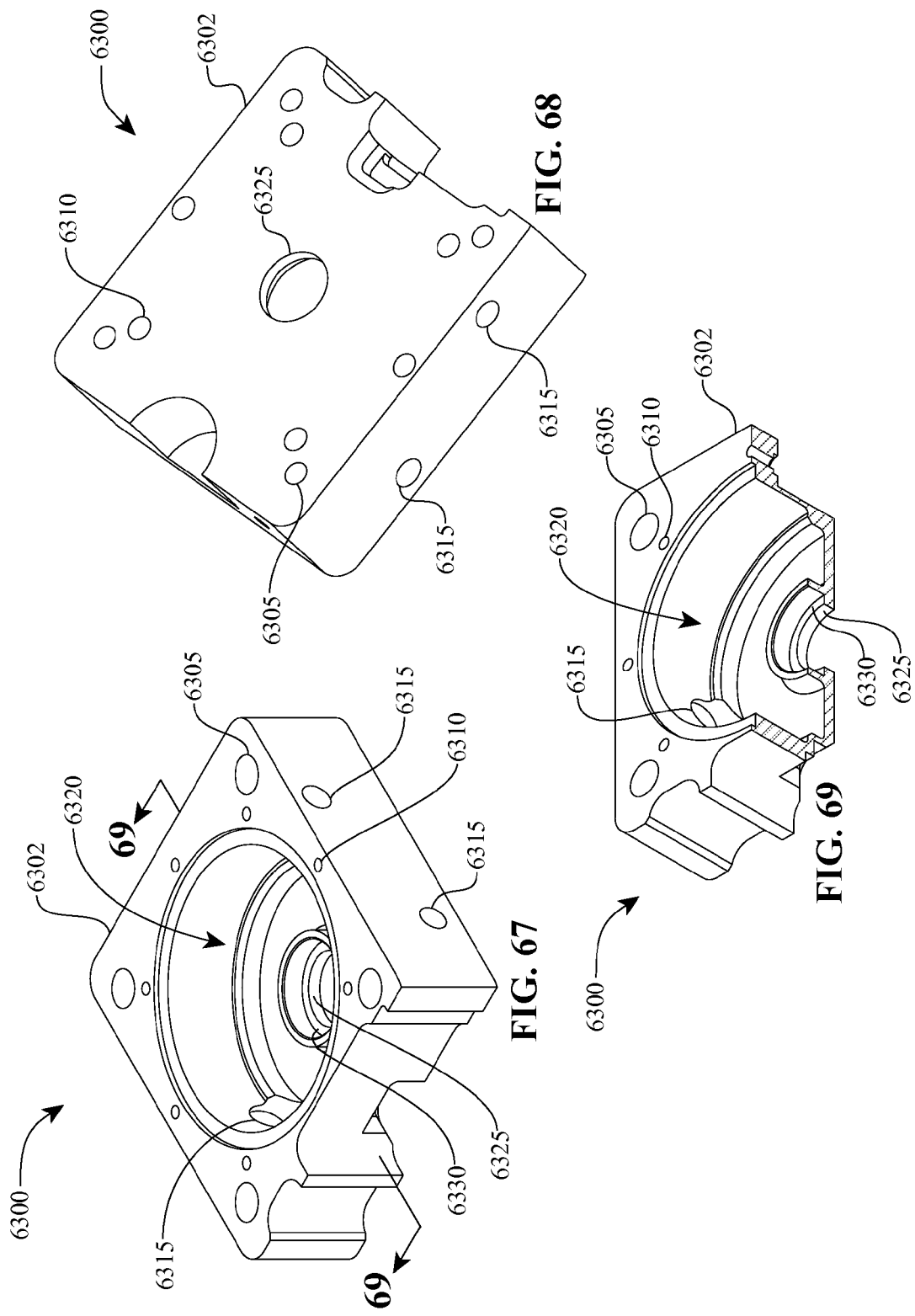

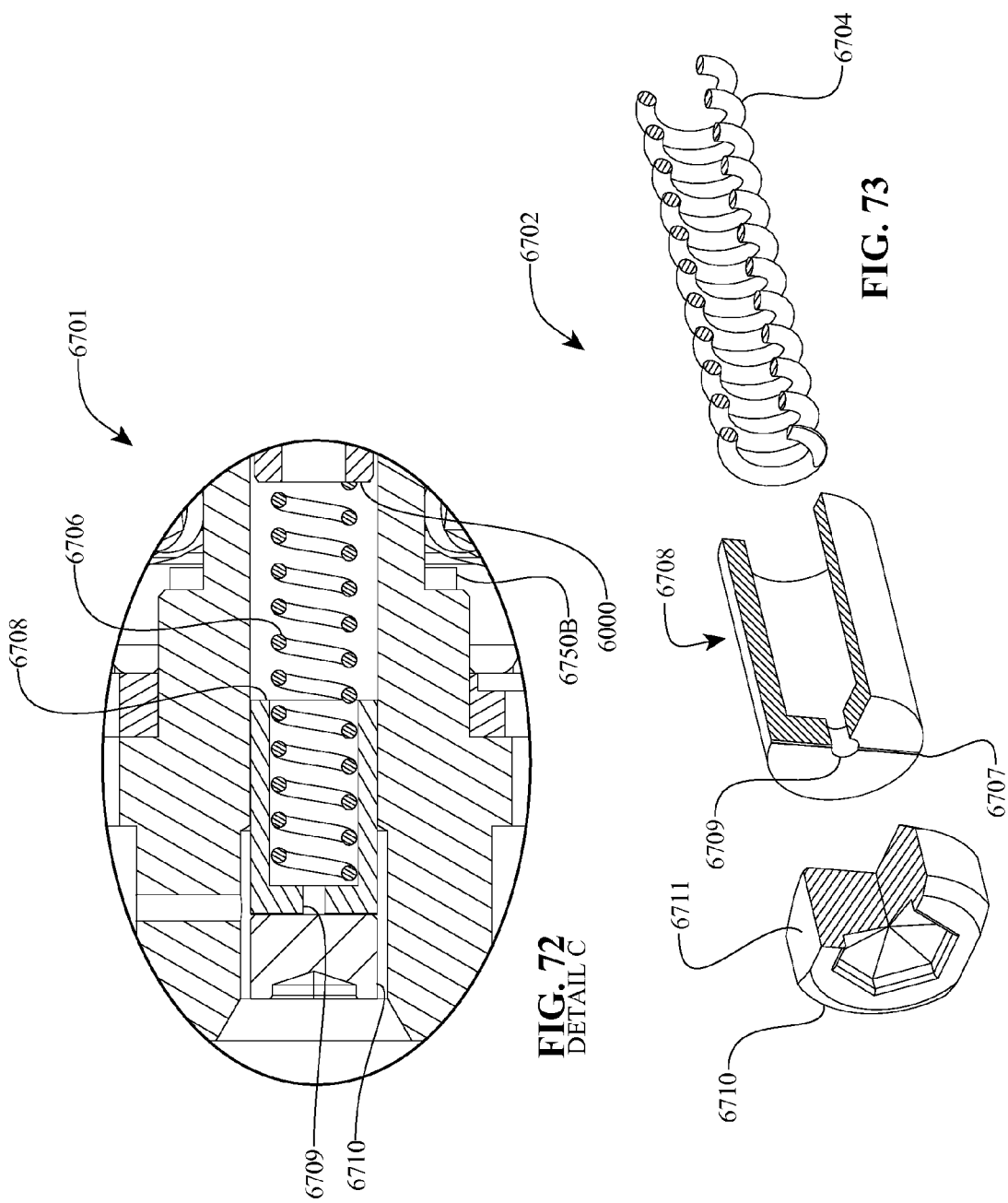

CONTINUOUSLY AND/OR INFINITELY VARIABLE TRANSMISSIONS AND METHODS THEREFOR

CROSS REFERENCE TO RELATED APPLICATIONS

This application is a continuation of U.S. patent application Ser. No. 13/679,337, filed Nov. 16, 2012 and scheduled to issue on Jan. 7, 2014 as U.S. Pat. No. 8,622,866, which is a continuation of U.S. patent application Ser. No. 12/394,821, filed Feb. 27, 2009, and issued on Nov. 20, 2012 as U.S. Pat. No. 8,313,405, which claims the benefit of U.S. Provisional Patent Application No. 61/032,834, filed on Feb. 29, 2008. Each of the above-identified applications is hereby incorporated by reference in its entirety.

BACKGROUND OF THE INVENTION

1. Field of the Invention

The disclosed invention relates generally to mechanical power modulation and transmission. More specifically, the invention concerns continuously and infinitely variable units and transmissions, subassemblies, components, and methods for use therewith.

2. Description of the Related Art

In the relevant technology various types of continuously and infinitely variable transmissions (C/IVT) are known. For example, one well known class of continuous variators is the belt-and-variable-radius-pulley variator. Other known variators include hydrostatic, toroidal, and cone-and-ring variators. In some cases, these variators couple to other gearing to provide infinitely variable transmission functionality. The present disclosure is addressed in part to a type of C/IVT typically known as a ball-type rolling traction CVT. To provide a continuously or infinitely variable transmission, various ball-type rolling traction transmissions have been developed in which power is transmitted through traction rollers supported in a housing between torque input and output discs. In some such transmissions, traction rollers are mounted on support structures configured to cause the engagement of the traction rollers with the input and output discs in circles of varying diameters depending on the desired transmission ratio.

Although ball-type rolling traction CVTs have gained some acceptance in certain industrial applications, the technology has generally been unable to overcome technical and economic hurdles to gain a wider adoption across multiple fields of use. The success of many known solutions has been limited. There is a continuing need in the CVT/IVT industry for transmission and variator improvements in increasing efficiency and packaging flexibility, simplifying operation, and reducing cost, size, and complexity, among other things. The inventive embodiments disclosed here address many of these challenges. In particular, though certainly not limited in scope of applicability, certain inventive embodiments disclosed here provide mechanisms and methods for employing continuously variable units and/or continuously variable transmissions in vehicle applications.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of the Preferred Embodiments" one will understand how the features of the system and methods provide several advantages over traditional systems and methods.

One aspect of the invention relates to a continuously variable transmission (CVT) having a number of planets arranged angularly about the longitudinal axis of the CVT, each planet having a through bore that forms a tiltable axis of rotation of the planet. The CVT further includes a main axle arranged along the longitudinal axis of the CVT and a lubricant manifold coupled to the main axle. The lubricant manifold is adapted to supply lubricant to the main axle. Optionally, the CVT has a stator assembly operably coupled to the planets. The stator assembly is concentric with the longitudinal axis of the transmission. Alternatively, the CVT has a shift rod arranged in a central bore of the main axle. In some cases, the shift rod is adapted to supply the lubricant to the interior of the CVT.

Another aspect of the invention addresses a method for lubricating internal components of a transmission. The method includes, in one embodiment, providing a lubricant manifold configured to cooperate with a lubricant source, providing a main axle adapted to receive the lubricant manifold, providing a shift rod having a central bore and adapted to cooperate with the main axle. The method further includes supplying a lubricant via the lubricant manifold to the main axle and delivering the lubricant through the main axle to the rod. In some embodiments, the method includes delivering the lubricant through the central bore of the shift rod to a shift rod lubricant passage. Optionally, the method includes the step of supplying a pressurized lubricant via the lubricant source. Alternatively, the method includes the step of delivering the lubricant through a lubricant delivery passage of the main axle to the interior of the transmission.

One more aspect of the invention concerns an infinitely variable transmission that includes an input shaft arranged along the longitudinal axis of the transmission and operably coupled to a power source. The transmission further includes a stator assembly coupled to the input shaft and a number of planets operably coupled to the stator assembly. In some embodiments, the transmission has a means for supplying lubricant to the input shaft. Optionally, the input shaft and the stator assembly are rigidly coupled. Alternatively, the means for supplying a lubricant includes a lubricant manifold adapted to supply lubricant to the input shaft. Optionally, the transmission has a shift rod operably coupled to the input shaft.

Yet another aspect of the invention involves a mechanism for facilitating an adjustment in a speed ratio of a transmission. In one embodiment, the mechanism includes a shift rod having a number of lubricant ports and a closed end. The mechanism can also include a shift cam body operably coupled to the shift rod, the shift cam body having a number of lubricant channels. Optionally, the mechanism has a shift actuation subassembly coupled to the shift rod. Optionally, the shift actuation subassembly includes a shift pin collar coupled to the shift rod. The shift pin collar is configured to rotate with an input shaft of the transmission. Alternatively, the shift actuation subassembly includes a shift screw operably coupled to the shift pin collar. The shift screw is substantially non-rotatable with an input shaft of the transmission.

One aspect of the invention is directed to an infinitely variable transmission that includes an input shaft arranged along the longitudinal axis of the transmission and a stator assembly coupled to, and coaxial with, the input shaft. The transmission further includes a number of planets operably coupled to the stator assembly. In one embodiment, the planets are arranged angularly about the longitudinal axis of the transmission. The transmission further includes a traction ring operably coupled to the planets and a housing operably coupled to the traction ring. In one embodiment, the housing is substantially fixed from rotating with the input shaft. Optionally, the traction ring is substantially fixed from rotating with the input shaft. Alternatively, the input shaft and the stator assembly are rigidly coupled. Optionally, the traction ring has a substantially annular ring having a front face and a rear face and a number of bi-directional ramps located on the front face. The cross-section of each ramp is curved. Alternatively, the traction ring has a contact surface located on the rear face.

Another aspect of the invention relates to a mechanism for facilitating an adjustment of a speed ratio in an infinitely variable transmission. The mechanism includes, in one embodiment, a shift rod arranged along a longitudinal axis of the transmission, a shift nut operably coupled to the shift rod, and a shift screw operably coupled to the shift nut. In some embodiments, the shift rod is adapted to supply a lubricant to the interior of the transmission. Optionally, a rotation of the shift screw axially translates the shift rod. Alternatively, the shift rod is adapted to supply a lubricant to the interior of the infinitely variable transmission. Optionally, the mechanism has a shift cam body operably coupled to the shift rod. The shift cam body has a number of lubricant channels.

Yet one more aspect of the invention addresses a method of operating an infinitely variable transmission (IVT). The method includes receiving power on an input shaft and providing a shift rod arranged along the longitudinal axis of the IVT. In one embodiment, the shift rod is adapted to supply a lubricant to internal components of the IVT and is also adapted to facilitate an adjustment speed ratio of the IVT. The method further includes transferring power from the input shaft to a number of planets arranged angularly around the longitudinal axis of the IVT. In one embodiment, the method includes providing an output shaft coupled to the planets. The output shaft delivers power from the planets to an external load coupled to the IVT. Optionally, the method includes the step of coupling a stator assembly to the input shaft. The stator assembly and the input shaft are substantially rotatable. Alternatively, the method includes the step of providing a source of pressurized lubricant coupled to the IVT. Optionally, the method includes the step of supplying the pressurized lubricant to the shift rod.

In another aspect, the invention concerns a shift actuation mechanism for an infinitely variable transmission (IVT). The shift actuation mechanism includes a shift pin collar having a central bore adapted to receive an input shaft, a shift screw coupled to the shift pin collar, and a control plate coupled to the shift pin collar. The shift actuation mechanism further includes a shift nut coupled to the shift screw. The shift nut is adapted to be substantially fixed from rotating relative to the shift screw. In one embodiment, the shift actuation mechanism includes a shift rod arranged along the longitudinal axis of the IVT and operably coupled to the shift screw. Optionally, the shift actuator has a coupling device adapted to cooperate with the shift rod. Alternatively, the shift rod is configured to rotate about the longitudinal axis of the IVT. Optionally, the shift screw is substantially fixed from rotation relative to the shift rod.

Another aspect of the invention relates to a shift pin collar for an infinitely variable transmission (IVT). The shift pin collar is a substantially cylindrical body with a central bore. A neck is located on the periphery of the cylindrical body and is adapted to receive a bearing. The substantially cylindrical body has a number of holes which are adapted to receive a coupling device of the IVT.

Yet one more aspect of the invention addresses a shift screw for an infinitely variable transmission (IVT). The shift screw is a substantially cylindrical body having a central bore, a threaded portion arranged on the central bore, and a first shoulder arranged on the central bore. The first shoulder is adapted to receive a first bearing of the IVT. In one embodiment, the shift screw has a second shoulder located on the periphery of the cylindrical body. The second shoulder is adapted to receive a second bearing of the IVT. The shift screw also has a reaction flange located on the periphery of the cylindrical body.

In another aspect, the invention concerns a lubricant manifold for use with a transmission. The lubricant manifold is a substantially disc-shaped body with a central bore. In one embodiment, the lubricant manifold has a shoulder located on the central bore that is adapted to receive a bearing of the transmission. The lubricant manifold has a lubricant passage configured to intersect the central bore. The lubricant passage extends radially from the central bore to an outer circumference of the disc-shaped body. The lubricant manifold also has a number of grooves arranged on the central that are adapted to receive a number of seals of the transmission. The lubricant manifold has an engagement shoulder extending from a face of the disc-shaped body and is coaxial with the central bore. The lubricant manifold also has an engagement face located on a face of the disc-shaped body that is oppositely located to the engagement shoulder. The lubricant manifold has a seal groove located on the engagement face. Optionally, the lubricant passage has a threaded portion. Alternatively, the lubricant manifold has a first and second seal groove. Each seal groove is formed on the central bore. The first seal groove is located on one side of the lubricant passage. The second seal groove is located on a second side of the lubricant passage. Alternatively, the threaded portion of the lubricant passage is arranged on the periphery of the disc-shaped body.

One more aspect of the invention concerns a lubricant manifold for use with a transmission. The lubricant manifold is a circular body with a central bore. The lubricant manifold has a flange extending from the circular body. The flange is concentric with the central bore. One side of the flange is an engagement face. The lubricant manifold also has an engagement hub extending from the engagement face. The engagement hub has a central pilot recess. The outer face of the engagement hub has a reaction surface. The engagement hub also has a lubricant passage boss extending from the flange. Optionally, the central piloting recess has a substantially square cross-section. Alternatively, the flange has a number of fastening holes arranged around the periphery of the flange. Optionally, the reaction surface has a substantially circular cross-section.

Yet another aspect of the invention involves a housing cover plate for use with an infinitely variable transmission (IVT). The housing cover plate is a generally circular body with a central bore. The housing cover plate has a flange coupled to the circular body. The flange is concentric with the central bore. The housing cover plate has a shoulder located on the inner diameter of the circular body and a number of lubricant channels arranged angularly around the circumference of the circular body. Optionally, the housing cover plate has grooves arranged on the central bore and adapted to receive a retention device of the IVT. Alternatively, the central bore is adapted to receive a bearing of the IVT. Optionally, the flange has a number of fastening holes.

One aspect of the invention concerns a housing cover plate for use with a continuously or infinitely variable transmission (C/IVT). The housing cover plate is a substantially circular disc with a central passage. The housing cover plate has a bearing recess formed on the central passage and a thrust washer recess coupled to the central passage in proximity to the bearing recess. The housing cover plate also has a number of engagement features. The engagement features are arranged on a face of the circular body in proximity to the outer circumference. The housing cover plate also has a flange coupled to the periphery of the circular body. Optionally, the engagement features have a substantially square cross-section. Alternatively, the flange has a number of fastening holes. Optionally, the housing cover plate has a groove formed on the central passage. The groove is configured to couple to a seal of the C/IVT.

Another aspect of the invention relates to a lubricant sump for use with an infinitely variable transmission (IVT). The lubricant sump is a body with a central bore and a number of holes located on an exterior perimeter edge portion of the body. The holes are adapted for mounting the body to a support structure of the IVT. The lubricant sump also has a number of lubricant passages located on the periphery of the body. The lubricant passages are configured to intersect the central bore. The lubricant sump has a seal pocket located substantially at the central bore of the body and a cavity concentric with the central bore. The cavity is adapted to receive a lubricant of the IVT. Optionally, the body has a substantially square cross-section.

Yet one more aspect of the invention addresses a mechanism for adjusting a speed ratio range for an infinitely variable transmission (IVT). The mechanism includes a shift rod arranged along the longitudinal axis of the IVT. The mechanism, in one embodiment, includes a shift-stop-cylinder assembly. The shift-stop-cylinder assembly is arranged coaxially with the shift rod and is coupled to a first end of the shift rod. The mechanism also includes a shift-stop-dowel assembly. The shift-stop-dowel assembly is arranged coaxially with the shift rod and is coupled to a second end of the shift rod. Optionally, the shift-stop-cylinder has a shift stop cylinder coupled to a spring and an adjustment nut. Alternatively, the shift-stop-spring assembly has a substantially cylindrical dowel coupled to the spring and an adjustment nut coupled to the spring. Optionally, the adjustment nut is configured to couple with a main axle of the IVT.

In another aspect, the invention concerns an axial force generating (AFG) mechanism for use in a continuously variable transmission (CVT). The AFG includes a load cam ring. The load cam ring is a substantially annular ring having a front face and a rear face. A number of bi-directional ramps are located on the front face of the load cam ring. The cross-section of the ramps of the load cam ring is curved. The AFG further includes a number of load cam rollers coupled to the load cam ring and a traction ring coupled to the load cam rollers. The traction ring is a substantially annular ring having a front face and a rear face. A number of bi-directional ramps are located on the front face of the traction ring. The ramps of the traction ring are adapted to receive the load cam rollers. The cross-section of the ramps of the traction ring is curved. Optionally, the load cam rollers are substantially spherical. Alternatively, the AFG has a preload spring coupled to the load cam ring. Optionally, the preload spring is a wave spring adapted to couple to the load cam ring.

Another aspect of the invention relates to a load cam ring for use in a continuously variable transmission (CVT). The load cam ring is a substantially annular ring having a front face and a rear face. A number of bi-directional ramps are located on the front face of the load cam ring. The cross-section of the ramps of the load cam ring is curved. Optionally, the engagement features have a substantially square cross-section.

In another aspect, the invention concerns a traction ring for use in a continuously variable transmission. The traction ring is a substantially annular ring having a front face and a rear face. A number of bi-directional ramps are located on the front face of the traction ring. The cross-section of the ramps of the traction ring is curved. Optionally, the engagement features have a substantially square cross-section. Alternatively, the contact surface has an angle of inclination in the range of 5 degrees to 75 degrees. Optionally, the contact surface has an angle of inclination of about 45 degrees.

One more aspect of the invention addresses an output shaft for use with a continuously variable transmission. The output shaft has a substantially cylindrical neck having a central bore. A reaction flange extends from one end of the neck and is concentric to the central bore. A number of splines are located on the central bore. A number of engagement features are located on the peripheral circumference of the reaction flange. Optionally, the output shaft has a number of piloting guides located on the peripheral circumference of the reaction flange. The piloting guides are substantially aligned with the engagement features about the central bore. Alternatively, the output shaft has a bearing support surface arranged on the central bore. Optionally, the output shaft has a lubricant passage formed on the cylindrical neck. The lubricant passage extends radially from the periphery of the cylindrical neck and is configured to intersect the central bore.

Yet another aspect of the invention involves a main axle for use in a continuously variable transmission (CVT). The main axle is an elongated body having a first end portion, a second end portion, and a central portion. A central bore is formed through the main axis of the elongated body, and extends from the first end portion and beyond the middle portion. The central bore has a fluted portion. The main axle has an axial reaction flange located at the first end portion. A threaded portion is located at the second end portion. The central portion of the main axle includes a first segment extending from the reaction flange, a second segment extending from the first segment, and a third segment extending from the second segment. The second segment has a slot. The third segment has a lubricant delivery passage and a lubricant inlet passage. The first, second, and third segments define respective shoulders that couple to components of the CVT. Optionally, the main axle has a first lubricant delivery passage located at the first end portion of the elongated body. Alternatively, the diameter of the first segment is larger than the diameter of the second segment. Optionally, the diameter of the second segment is larger than the diameter of the third segment.

One aspect of the invention concerns an auxiliary axle for use with a continuously or infinitely variable transmission. The auxiliary axle has a main body with a central bore. A locking member slot is provided along the axial length of the central bore. A reaction flange extends radially from a central portion of the main body. A lubricant passage is located on the reaction flange and intersects the central bore. The auxiliary axle has a first shoulder that extends from a first face of the reaction flange. The first shoulder is configured to couple to a stator of the transmission. Optionally, the auxiliary axle has a second shoulder extending from a second face of the reaction flange. The second shoulder has a substantially square-cross section. Alternatively, the first shoulder has a substantially circular cross-section.

Another aspect of the invention relates to a shift rod for use with a continuously or infinitely variable transmission. The shift rod is an elongated body having a central bore. The central bore is adapted to supply a lubricant to internal components of the transmission. The shift rod has a slot located substantially at the central portion of the elongated body. The slot is adapted to supply lubricant to the central bore. The shift rod has a number of lubricant passages on a first end of the elongated body. An actuator engagement passage is located on a second end of the elongated body. Optionally, one end of the elongated body is substantially closed. Alternatively, the shift rod has a piloting stub arranged on one end of the elongated body. Optionally, the shift rod has a seal groove arranged on the periphery of the elongated body between the slot and the actuator engagement passage.

Yet one more aspect of the invention addresses an input shaft for use in an infinitely variable transmission (IVT). The input shaft is an elongated body having a first end portion, a second end portion, and a central portion. A central bore is formed through the main axis of the elongated body, and extends from the first end portion and beyond the middle portion. The central bore has a fluted portion. The input shaft has an axial reaction flange located at the first end portion. A threaded portion is located at the second end portion. The central portion of the input shaft includes a first segment extending from the reaction flange, a second segment extending from the first segment, a third segment extending from the second segment, a fourth segment extending from the third segment, and a fifth segment extending from the fourth segment. The second segment has a first slot. The third segment has a first locking member seat, a lubricant delivery passage, and a lubricant inlet passage. The fourth segment has a second slot. The fifth segment has a second locking member seat. The first, second, third, fourth, and fifth segments define respective shoulders that couple to components of the CVT. Optionally, the second segment has a smaller diameter than the first segment. Alternatively, the third segment has a smaller diameter than the second segment. Optionally, the fifth segment has a smaller diameter than the fourth segment.

In another aspect, the invention concerns a drivetrain casing for use with a continuously or infinitely variable transmission (C/IVT). The drivetrain casing, in one embodiment, has a main body with an exterior surface and an interior surface, and also has an upper portion and lower portion. A mounting portion is arranged on the upper portion of the exterior surface. The mounting portion is configured to couple to a housing cover of the C/IVT, and has a central passage. A lubricant sump cavity is located on the lower portion of the main body. Optionally, the drivetrain casing has a number of fastening bosses arranged on the periphery of the upper portion. Alternatively, the drivetrain casing has a mounting surface configured to receive a seal of the C/IVT. Optionally, the drivetrain casing has an interior space partially separated from the lubricant sump cavity.

Another aspect of the invention relates to a continuously variable transmission (CVT). The CVT includes a number of planets arranged angularly about the longitudinal axis of the CVT. Each planet has a through bore that forms a tiltable axis of rotation of the planet. The CVT includes a load cam ring that is coaxial with the number of planets. The load cam ring is a substantially annular ring having a front face and a rear face. A number of bi-directional ramps are located on the front face of the load cam ring. The cross-section of the ramps of the load cam ring is curved. The CVT further includes a number of load cam rollers coupled to the load cam ring, and a traction ring coupled to the load cam rollers. The traction ring is a substantially annular ring having a front face and a rear face. A number of bi-directional ramps are located on the front face of the traction ring. The ramps of the traction ring are adapted to receive the load cam rollers. The cross-section of the ramps of the traction ring is curved. Optionally, the transmission has a main axle arranged along the longitudinal axis of the CVT. Alternatively, the transmission has a stator assembly operably coupled to the planets. The stator assembly is concentric with the longitudinal axis of the CVT. Optionally, the transmission has a lubricant manifold configured to supply a lubricant to the main axle.

Yet another aspect of the invention involves a transmission having a number of planets arranged about the longitudinal axis of the transmission. Each planet has a through bore that forms a tiltable axis of rotation of the planet. The transmission has a housing cover. The housing cover is a generally circular body with a central bore. The housing cover plate has a flange coupled to the circular body. The flange is concentric with the central bore. The housing cover plate has a shoulder located on the inner diameter of the circular body and a number of lubricant channels arranged angularly around the circumference of the circular body. Optionally, the transmission has a housing subassembly coupled to the housing cover. The housing subassembly includes a substantially cylindrical body configured to enclose components of the transmission. Alternatively, the housing subassembly is configured to rotate about the longitudinal axis of the transmission. Optionally, the housing subassembly is substantially fixed from rotating about the longitudinal axis of the transmission.

In another aspect of the invention involves a continuously or infinitely variable transmission. The transmission includes a number of planets arranged about the longitudinal axis of the transmission. Each planet has a through bore that forms a tiltable axis of rotation of the planet. The transmission also includes a main axle arranged coaxial with the planets. The main axle is an elongated body having a first end portion, a second end portion, and a central portion. A central bore is formed through the main axis of the elongated body, and extends from the first end portion and beyond the middle portion. The central bore has a fluted portion. The main axle has an axial reaction flange located at the first end portion. A threaded portion is located at the second end portion. The central portion of the main axle includes a first segment extending from the reaction flange, a second segment extending from the first segment, and a third segment extending from the second segment. The second segment has a slot. The third segment has a lubricant delivery passage and a lubricant inlet passage. The first, second, and third segments define respective shoulders that couple to components of the transmission. The transmission also includes an auxiliary axle coupled to the main axle. The auxiliary axle has a main body with a central bore. A locking member slot is provided along the axial length of the central bore. A reaction flange extends radially from a central portion of the main body. A lubricant passage is located on the reaction flange and intersects the central bore. The auxiliary axle has a first shoulder that extends from a first face of the reaction flange. The first shoulder is configured to couple to a stator of the transmission. The transmission also includes a stator assembly coupled to, and coaxial with, the main axle. Optionally, the transmission has a lubricant manifold coupled to the main axle. The lubricant manifold supplies a lubricant to the main axle. Alternatively, the transmission has a shift rod coupled to the main axle. Optionally, the shift rod is adapted to supply lubricant to the interior of the transmission.

These and other improvements will become apparent to those skilled in the relevant technology as they read the following detailed description and view the enclosed figures.

BRIEF DESCRIPTION OF THE FIGURES

FIG. 5 is a perspective view of one embodiment of a shift rod that can be used in the CVT of FIG. 4.

FIG. 6 is a cross-sectional view of the shift rod of FIG. 5.

FIG. 8 is a perspective view of an embodiment of a main axle that can be used with the CVT of FIG. 7.

FIG. 9 is a cross-sectional view of the main axle of FIG. 8.

FIG. 10 is a perspective view of an auxiliary axle that can be used with the CVT of FIG. 1.

FIG. 11 is another perspective view of the auxiliary axle of FIG. 10.

FIG. 12 is a cross-sectional view of the auxiliary axle of FIG. 10.

FIG. 15 is a perspective view of a first shift cam body that can be used with the CVT of FIG. 1.

FIG. 16 is a cross-sectional view of the first shift cam body of FIG. 15.

FIG. 16A is a cross-sectional Detail B view of certain features of the first shift cam body of FIG. 16.

FIG. 17 is a perspective view of a second shift cam body that cam be used with the CVT of FIG. 1.

FIG. 18 is another perspective view of the second shift cam body of FIG. 17.

FIG. 19 is a table of coordinates for a shift cam surface profile that can be used for the shift cam bodies of FIGS. 15 and 17.

FIG. 21 is a perspective view of a planet-and-shift-lever subassembly that can be used with the CVT of FIG. 1.

FIG. 22 is a cross-sectional view of the planet-and-shift-lever subassembly of FIG. 21.

FIG. 28 is a perspective view of one embodiment of a traction ring that can be used with the CVT of FIG. 1.

FIG. 29 is a cross-sectional view of the traction ring of FIG. 28.

FIG. 30 is a perspective view of one embodiment of an output shaft that can be used with the CVT of FIG. 1.

FIG. 31 is another perspective view of the output shaft of FIG. 30.

FIG. 32 is a cross-sectional view of the output shaft of FIG. 30.

FIG. 34 is a perspective view of an embodiment of a first housing cover plate that can be used with the CVT of FIG. 1.

FIG. 35 is another perspective view of the first housing cover plate of FIG. 34.

FIG. 36 is a cross-sectional view of the first housing cover plate of FIG. 34.

FIG. 37 is a perspective view of an embodiment of a second housing cover plate that can be used with the CVT of FIG. 1.

FIG. 38 is a cross-sectional view of the second housing cover plate of FIG. 37.

FIG. 39 is a perspective view of an embodiment of a lubricant manifold that can be used with the CVT of FIG. 1.

FIG. 40 is another perspective view of the lubricant manifold of FIG. 39.

FIG. 41 is a cross-sectional view of the lubricant manifold of FIG. 39.

FIG. 43 is a perspective view of an embodiment of a drivetrain casing that can be used with the CVT of FIG. 1.

FIG. 44 is a plan view of the drivetrain casing of FIG. 43.

FIG. 45 is another plan view of the drivetrain casing of FIG. 43.

FIG. 50 is a plan view of an embodiment of an input shaft that can be used with the IVT of FIG. 46.

FIG. 51 is a cross-sectional view of the input shaft of FIG. 50.

FIG. 57 is a perspective view of an embodiment of a shift nut that can be used with the IVT of FIG. 46.

FIG. 58 is a perspective view of one embodiment of a shift screw that can be used with the IVT of FIG. 46.

FIG. 59 is a cross-sectional view of the shift screw of FIG. 58.

FIG. 60 is a perspective view of one embodiment of a control plate that can be used with the IVT of FIG. 46.

FIG. 67 is a perspective view of one embodiment of a lubricant sump that can be used with the IVT of FIG. 46.

FIG. 68 is another perspective view of the lubricant sump of FIG. 67.

FIG. 69 is a cross-sectional perspective view of the lubricant sump of FIG. 67.

FIG. 72 is a cross-sectional detail view of an embodiment of a shift-stop-spring assembly that can be used with the IVT of FIG. 71.

FIG. 73 is an exploded, partial cross-sectional perspective view of the shift-stop-spring assembly of FIG. 72.

DETAILED DESCRIPTION OF THE FIGURES

Figure 1:
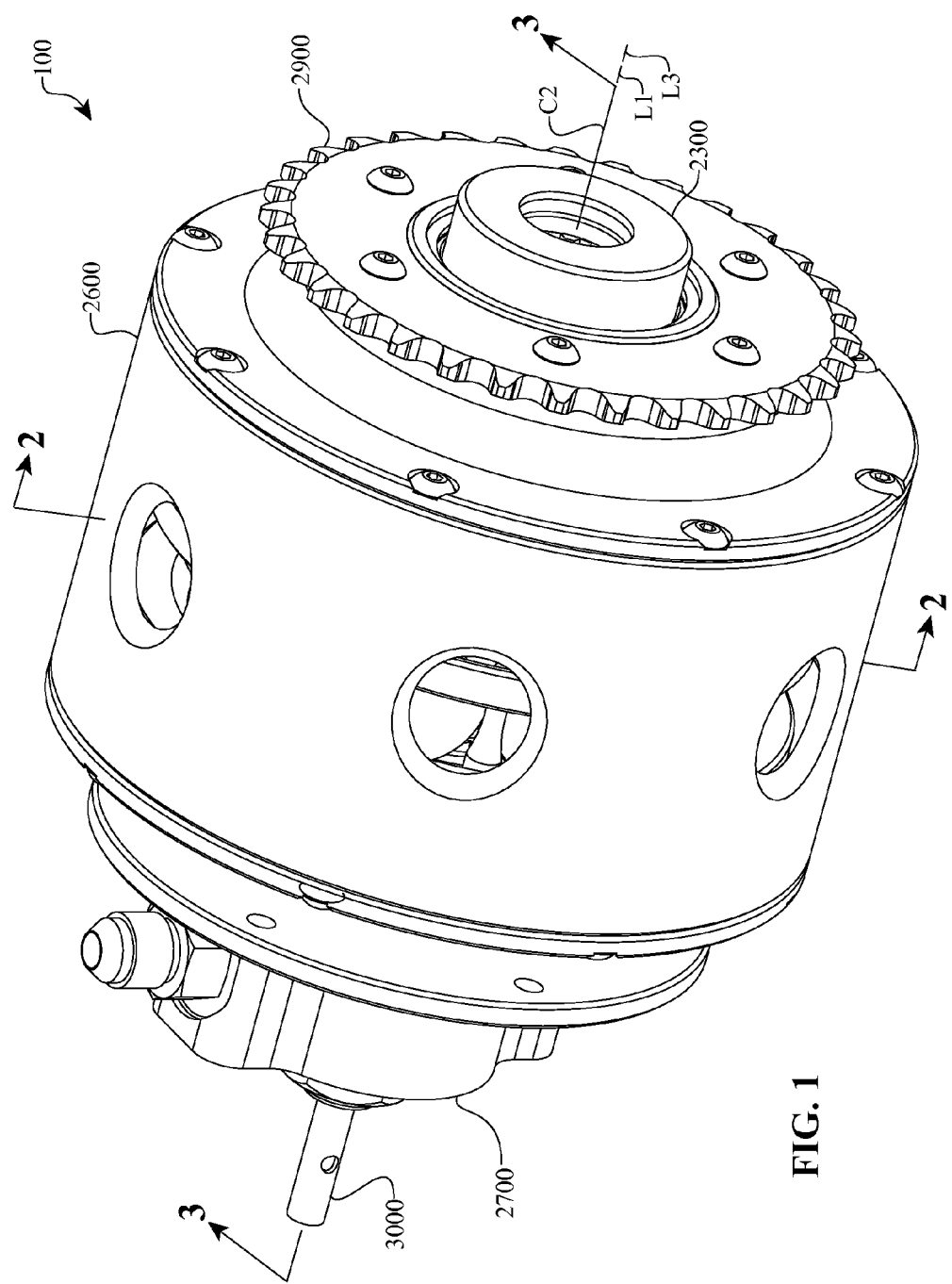
FIG. 1 is a perspective view of one embodiment of a continuously variable transmission (CVT).
Figure 2:
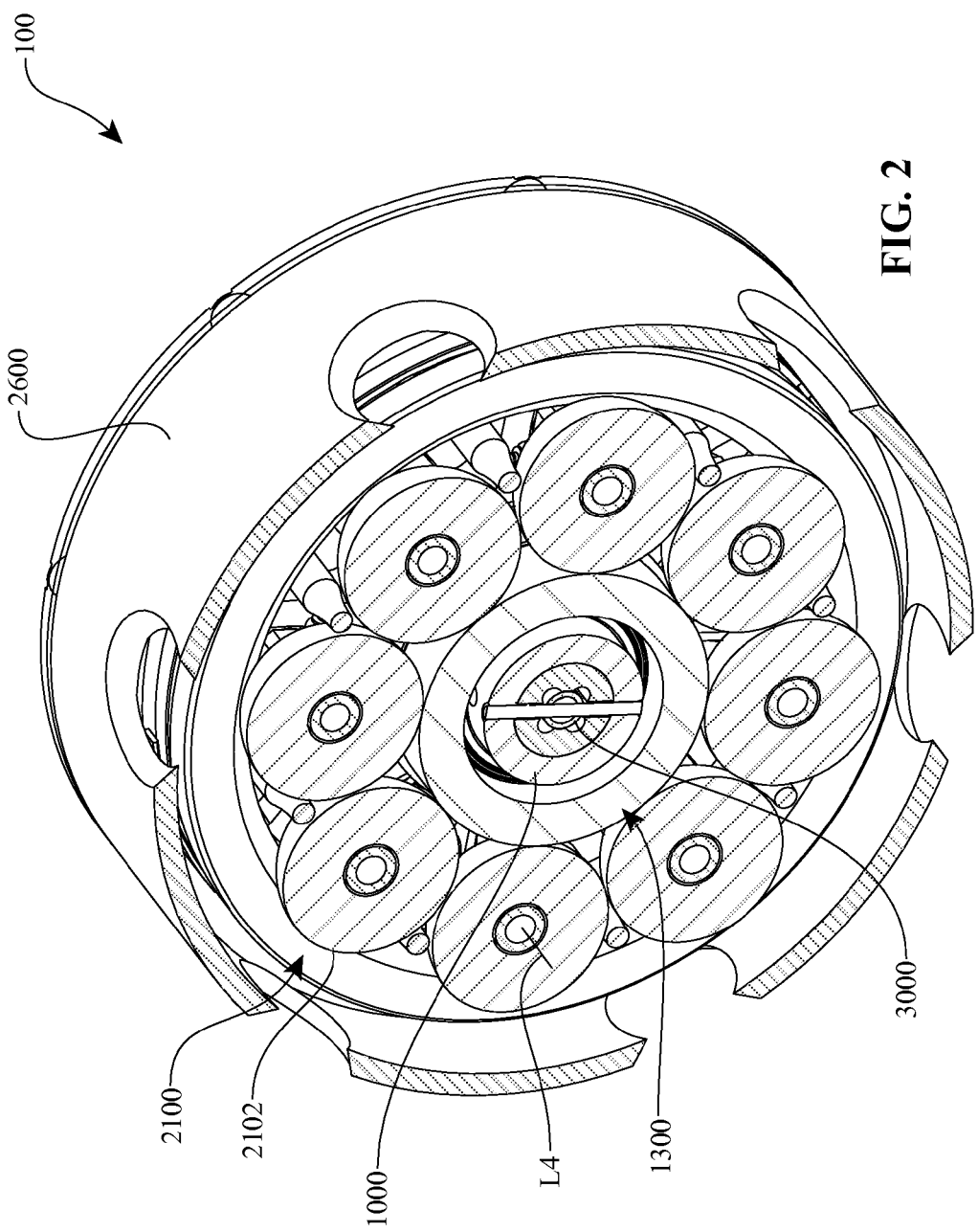
FIG. 2 is a cross-sectional perspective view of the CVT of FIG. 1.

The inventive embodiments disclosed here relate to technology described in U.S. patent applications Ser. Nos. 11/243,484, 11/585,677, and 60/948,152, which are hereby incorporated herein by reference in entireties. As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

Components which are used on both the right and left side of a transmission or equipment are designated with the letters a and b. For example, where there are two axial force generator subassemblies 2800, the first axial force generator subassembly 2800A, while the second axial force generator subassembly 2800B. Generally, all of the components on a side are designated with the letter a, and all substantially similar components on another side are designated with the letter b; when a component is referred to generically without a side designation, the a or b suffix is removed.

Referring to FIGS. 1-4 now, a continuously variable transmission (CVT) 100 is shown. The CVT 100 is particularly suitable for, among other applications, vehicles such as a utility kart, a recreational go-kart, a racing go-kart or the like. In use, the CVT 100 couples between a prime mover (for example, a gas powered engine, motor or the like) and a load (for example a rear axle assembly) for varying torque applied from the prime mover to the load. As discussed below in greater detail, components of the CVT 100 are arranged and interconnected in a manner that facilitates torque and speed being adjusted in a continuously variable manner.

Still referring to FIGS. 1-4, in one embodiment, a main axle 1000 supports a shift-cam-and-sun subassembly 1300 in a manner allowing translation of the shift-cam-and-sun subassembly 1300 along a longitudinal axis L1 of the main axle 1000. The main axle 1000 supports an auxiliary axle 1600 in a manner that coincidentally aligns a longitudinal axis L2 of the auxiliary axle 1600 with the main axle longitudinal axis L1 and that inhibits unrestricted relative rotation of the auxiliary axle 1600 with respect to the main axle 1000. The main axle 1000 and the auxiliary axle 1600 jointly support a stator subassembly 1700 such that a centerline axis C1 of the stator subassembly 1700 extends coincidentally with the main axle longitudinal axis L1. A number of planet-and-shift-lever subassemblies 2100 is arrayed angularly around the main axle longitudinal axis L1 and is supported jointly by the shift-cam-and-sun subassembly 1300 and the stator subassembly 1700.

The main axle 1000 supports an output shaft 2300 in a manner such that a longitudinal axis L3 of the output shaft 2300 extends coincidentally with the main axle longitudinal axis L1. The output shaft 2300 and the main axle 1000 are engaged in a manner allowing the output shaft 2300 to rotate with respect to the main axle 1000 about the output shaft longitudinal axis L3. The output shaft 2300 and the auxiliary axle 1600 jointly support a housing subassembly 2600 in a manner that coincidentally aligns a centerline axis C2 of the housing subassembly 2600 with the main axle longitudinal axis L1 and that allows relative rotation of the housing subassembly 2600 with respect to the output shaft 2300 and the auxiliary axle 1600. The main axle 1000 and the auxiliary axle 1600 jointly support a lubricant manifold 2700 in a manner inhibiting unrestricted relative rotation of the lubricant manifold 2700 with respect to the main axle 1000. A shift rod 3000 extends though the main axle 1000 and couples to the shift-cam-and-sun subassembly 1300 for facilitating selective translation of the shift-cam-and-sun subassembly 1300 along the main axle longitudinal axis L1.

Each one of the planet-and-shift-lever subassemblies 2100 is supported in a manner that allows synchronous rotation of all the planet-and-shift-lever subassemblies 2100 about a respective reference axis T1 extending through a planet 2102 of each one of the planet-and-shift-lever subassemblies 2100. Through such synchronous rotation, all of the planet-and-shift-lever subassemblies 2100 are substantially in the same relative rotational position at a given point in time. An axis T1 (see FIGS. 1-3) associated with each one of the planet-and-shift-lever subassemblies 2100 extends through a center point of the respective planet 2102 substantially perpendicular to a reference axis R1 extending radially from the main axle longitudinal axis L1.

Figure 3:
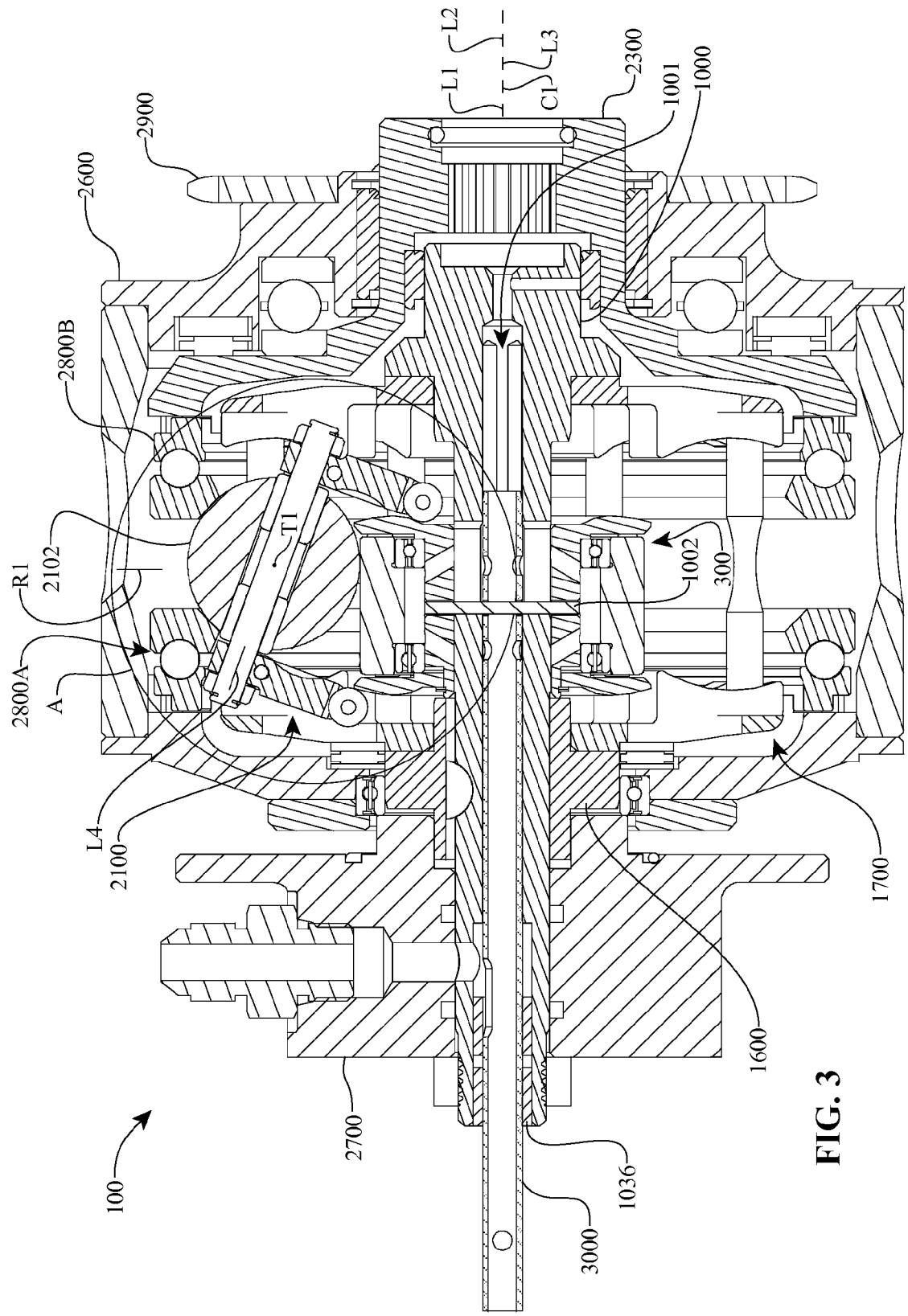
FIG. 3 is a cross-sectional view of the CVT of FIG. 2.
Figure 4:
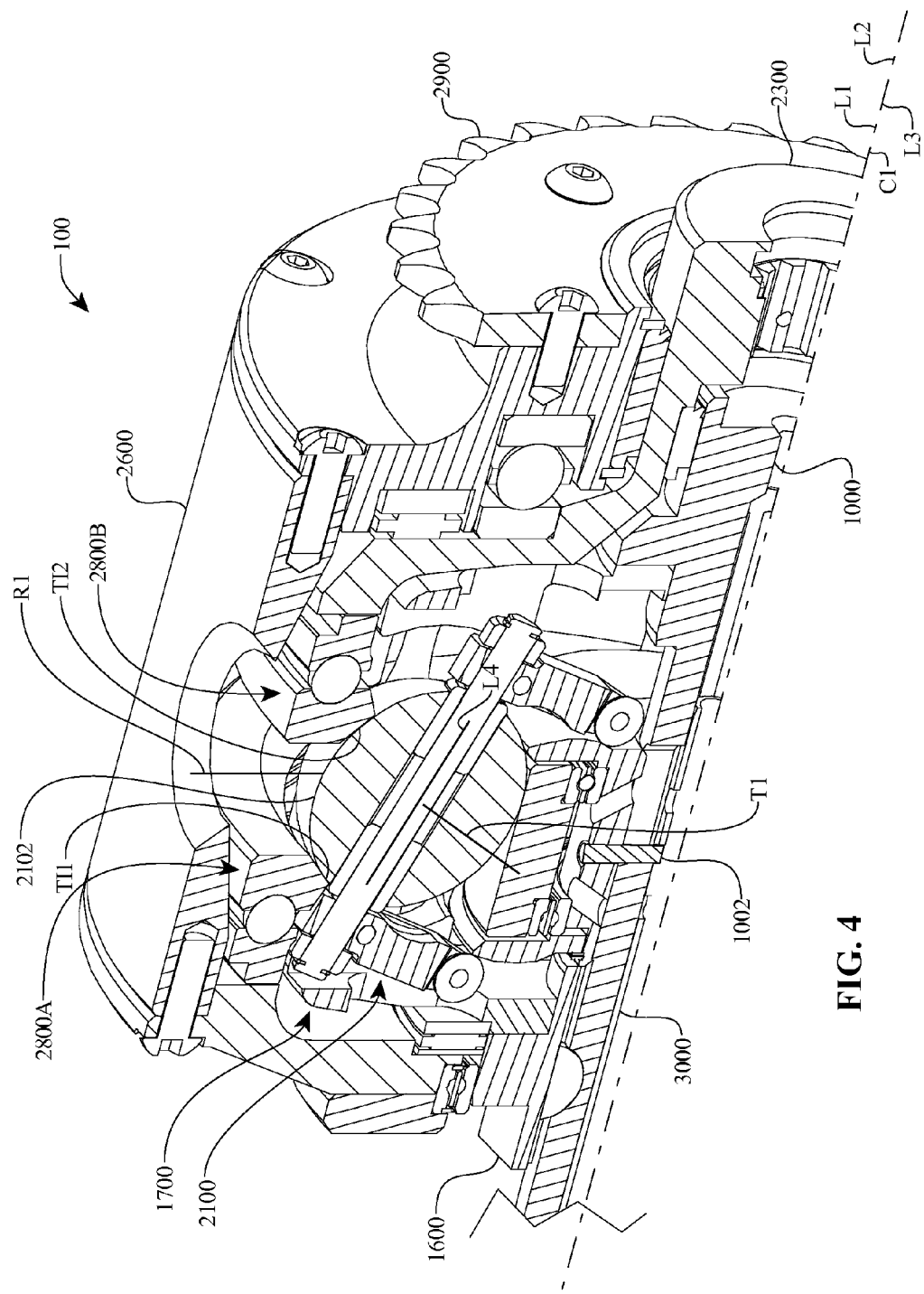
FIG. 4 is a partial cross-sectional perspective view of the CVT of FIG. 3.

Referring now to FIGS. 3 and 4, in one embodiment, a first axial force generator subassembly 2800A couples between the housing subassembly 2600 and the planets 2102 of the planet-and-shift-lever subassemblies 2100 and a second axial force generator subassembly 2800B couples between the output shaft 2300 and each one of the planets 2102. In one embodiment, the axial force generator subassemblies 2800A, 2800B are elements of an axial force generator that maintains forced engagement between the axial force generator subassemblies 2800A, 2800B and the planets 2102. In one embodiment, the first axial force generator subassembly 2800A couples to the housing subassembly 2600 in a manner inhibiting unrestricted relative rotation of the first axial force generator subassembly 2800A with respect to the housing subassembly 2600. The second axial force generator subassembly 2800B couples to the output shaft 2300 in a manner inhibiting unrestricted relative rotation of the second axial force generator subassembly 2800B with respect to the output shaft 2300. The first axial force generator subassembly 2800A, the second axial force generator subassembly 2800B, and the shift-cam-and-sun subassembly 1300 jointly locate each one of the planets 2102 in a manner that substantially inhibits the axial translation of the planets 2102 and substantially constrains the angular translation of the planets 2102 about the respective reference axis T1.

101161 During operation of the CVT 100, the main axle 1000 and the lubricant manifold 2700 are held stationary through rigid connection of the lubricant manifold 2700 to a mating structure (for example, a drivetrain casing 3700 shown in FIG. 43) and a non-rotating interconnection of the lubricant manifold 2700 with the main axle 1000. The housing subassembly 2600 can be configured to exert torque on the first axial force generator subassembly 2800A such as through a power input device 2900 attached to the housing subassembly 2600. Examples of the power input device 2900 include, but are not limited to, a sprocket (shown in FIGS. 3 and 4), a pulley, a cog, a hub, etc. Through traction at a respective first traction interface TI1 between the input axial force generator subassembly 2800A and each planet 2102, torque is exerted by the first axial force generator subassembly 2800A on the planets 2102, thereby causing each planet 2102 to rotate about a respective planet longitudinal axis L4. The first traction interface TI1 is defined, as used here, as a region of contact between the first axial force generator subassembly 2800A and the respective planet 2102.

Through traction at a respective second traction interface TI2 between the second axial force generator subassembly 2800B and each planet 2102, torque is exerted by the planets 2102 on the second axial force generator subassembly 2800B, thereby causing the second axial force generator subassembly 2800B and output shaft 2300 to jointly rotate about the main axle 1000. The second traction interface TI2 is defined, as used here, as a region of contact between the second axial force generator subassembly 2800B and the respective planet 2102.

Turning now to a brief discussion of power flow through the CVT 100 and still referring to FIGS. 3 and 4, the torque input device 2900 has torque exerted thereon from a power source (for example an engine) and exerts torque to the housing subassembly 2600. The exertion of torque on the housing subassembly 2600 urges the housing subassembly 2600 to rotate about the main axle longitudinal axis L1. The housing subassembly 2600 exerts torque to the first axial force generator subassembly 2800A, which is then transferred from the first axial force generator subassembly 2800A to each planet 2102 via the respective first traction interface TI1. In response to the exertion of torque on the planets 2102, the planets 2102 each rotate about their respective planet longitudinal axis L4 thereby transferring torque to the second axial force generator subassembly 2800B via the respective second traction interface TI2. The second axial force generator subassembly 2800B exerts torque on the output shaft 2300 thereby urging the output shaft 2300 to rotate about the output shaft longitudinal axis L3. It will be ready apparent to a person of ordinary skill in the relevant technology that the power flow through the CVT 100 can be reversed by providing a power input at the shaft 2300 and, by following the reverse of the power path described above, taking power out at the torque transmitting device 2900.

Synchronous rotation of all the planet-and-shift-lever subassemblies 2100 about the respective reference axis T1 allow a torque ratio of the CVT 100 to be varied. The torque ratio refers to a relative position of the first traction interface TI1 and the second traction interface TI2 for a given angular orientation (that is, tilt) of the planet-and-shift-lever subassemblies 2100. When the surface speed of the planets 2102 at the respective first traction interface TI1 is the same as the surface speed of the planets 2102 at the respective second traction interface TI2, the torque ratio is substantially 1:1 and, ignoring system inefficiencies, there is no corresponding torque multiplication. Through controlled tilting of the planet-and-shift-lever subassemblies 2100, the ratio of the surface speed at the first traction interfaces TI1 to that of the surface speed at the second traction interfaces TI2 is selectively adjustable, thereby adjusting torque ratio. As discussed further below, the shift-cam-and-sun subassembly can be configured such that translation of the shift-cam-and-sun subassembly 1300 causes such tilt of the planet-and-shift-lever subassemblies 2100. The direction of tilt of the planet-and-shift-lever subassemblies 2100 from the position corresponding to the torque ratio of 1:1 dictates whether the corresponding torque multiplication is greater than 1 (that is, torque output is greater than torque input) or less than 1 (that is, torque input is greater than torque output).

As depicted in FIGS. 3 and 4, the first traction interface TI1 and the second traction interface TI2 are angularly equidistant relative to the respective reference axis R1 extending through the corresponding tangential reference axis T1 (See FIG. 4). Ignoring inefficiency and creep effects, the torque ratio is 1:1 when the longitudinal axis L4 of each planet 2102 is parallel with the longitudinal axis L1 of the main axle 1000; in which case, the surface speed of the planets 2102 at the first traction interface TI1 is substantially the same as the surface speed of the planets 2102 at the second traction interface TI2. Such an equidistant configuration provides for a balanced adjustment range such that, in some embodiments, full adjustment of the planet-and-shift-lever subassemblies 2100 in a first adjustment direction (for example, yielding torque multiplication) results in substantially the inverse value as full adjustment in a second direction (for example, yielding torque division). In other embodiments, the first traction interface TI1 and the second traction interface TI2 can be non-equidistant from the reference axis T1 when the torque ratio is 1:1 and the main axle longitudinal axis L1 is parallel with the planet longitudinal axis L4. Such a non-equidistant configuration provides for biasing of the adjustment range such that full adjustment of the planet-and-shift-lever subassemblies 2100 in the first adjustment direction results in asymmetric torque multiplication or division values than full adjustment in the second adjustment direction.

Presented now is a brief description of torque ratio variation functionality provided by a Continuously Variable Transmission (CVT) in the context of the disclosures made herein (for example, the CVT 100). Such CVT functionality allows essentially every fractional torque ratio within a given range to be selected in a continuous manner as opposed to a discrete or stepped manner. For example, in the case of the CVT 100 disclosed herein, the ability to adjust torque ratio in a continuous manner over a defined torque ratio range is through angular control of the planet-and-shift-lever subassemblies 2100.

It should be noted that such CVT functionality does not inherently offer rotational direction change through torque ratio adjustment. For a given CVT construction, power input rotational direction with respect to power output rotational direction is fixed (that is, the same direction or the opposite direction). For example, referring to the CVT 100 and FIG. 3, power input rotational direction with respect to power output rotational direction is fixed in the same direction—counter-clockwise rotation of the power input device 2900 causes counter-clockwise rotation of the output shaft 2300 and clockwise rotation of the power input device 2900 causes clockwise rotation of the output shaft 2300. For a constant rotational speed of the power input device 2900, varying angular positioning of the planet-and-shift-lever subassemblies 2100 serves only to increase or decrease the rotational speed of the planets 2102, thereby causing a proportional and respective increase or decrease in rotation speed of the output shaft 2300 under the assumption that there is negligible or limited slippage between the planets 2102 and the second axial force generator subassembly 2800B. For the CVT 100, the first axial force generator subassembly 2800A, the planets 2102 and the second axial force generator subassembly 2800B always rotate in the same direction.

Returning now to discussing construction and elements of the CVT 100, as best shown in FIGS. 5 and 6, one embodiment of the shift rod 3000 includes an elongated tubular body 3005 having a slot 3010, lubricant passages 3015, a coupling device passage 3020, an actuator engagement passage 3025, and a central bore 3026. The central bore 3026 can extend along the entire length of the tubular body 3005 or, alternatively, a portion of the length. The slot 3010, the lubricant passages 3015, the coupling device passage 3020 and the actuator engagement passage 3025 extend between an exterior surface of the elongated tubular body 3005 to the central bore 3026.

Referring to FIGS. 3-6, the shift rod 3000 can be slidably engaged within a main axle longitudinal passage 1001 for affecting synchronous rotation of the planet-and-shift-lever subassemblies 2100. A coupling device 1002 such as a roll pin couples the shift rod 3000 to the shift-cam-and-sun subassembly 1300. The coupling device 1002 extends through the coupling device passage 3020 and is fixedly engaged within mating holes of the shift-cam-and-sun subassembly 1300 such that axial translation of the shift rod 3000 causes a corresponding axial translation of the shift-cam-and-sun subassembly 1300. Through engagement of the shift-cam-and-sun subassembly 1300 with all of the planet-and-shift-lever subassemblies 2100, translation of the shift-cam-and-sun subassembly 1300 causes all of the planet-and-shift-lever subassemblies 2100 to synchronously rotate the about the respective axis T1, thereby resulting in an adjustment of the torque ratio. The slot 3010 allows lubricant to flow from the lubricant manifold 2700 into the shift rod central bore 3026 with the shift rod 3000 at various translated positions. The lubricant passages 3015 allow lubricant to flow from the central bore 3026 to the shift-cam-and-sun subassembly 1300.

Figure 7:
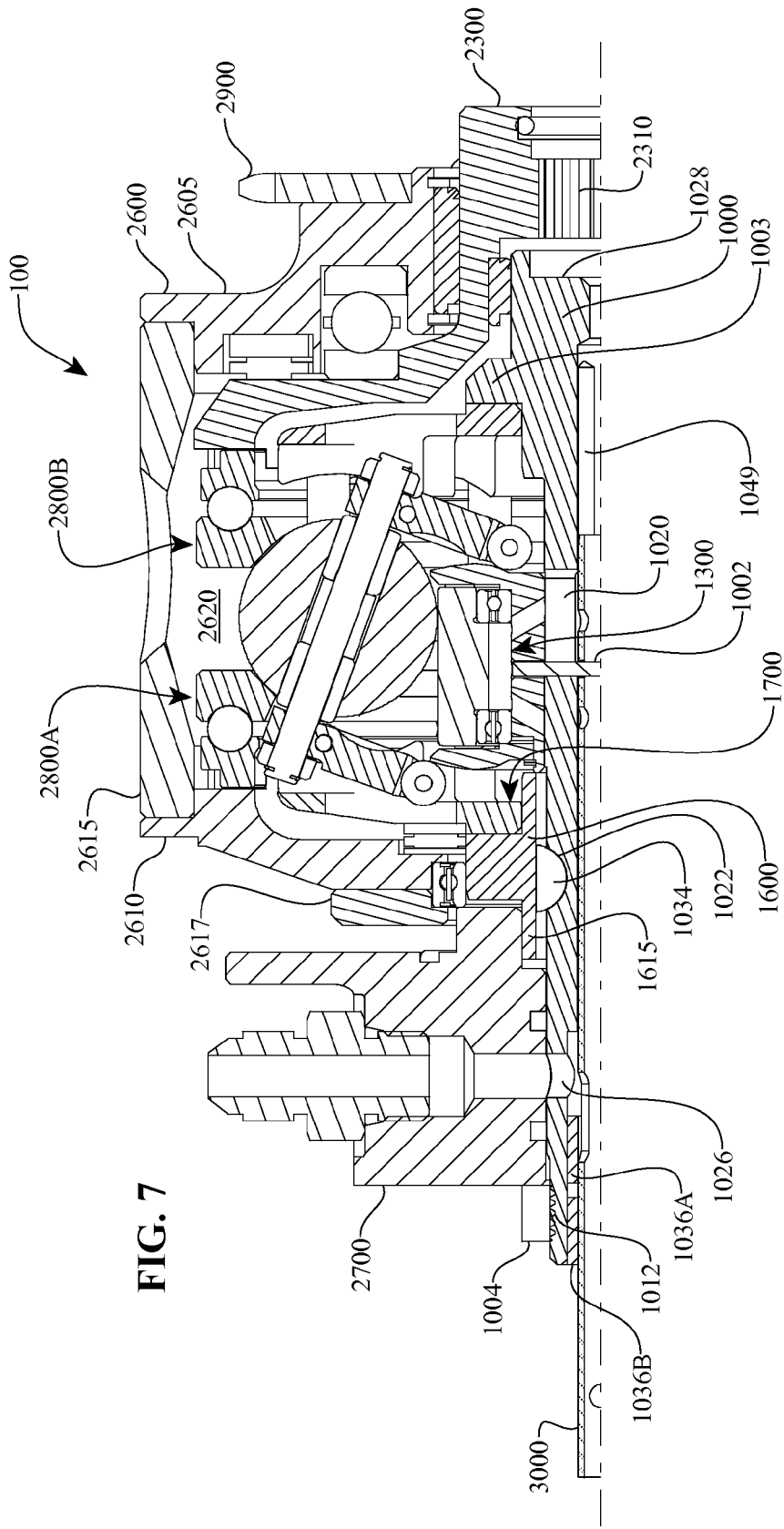
FIG. 7 is partial cross-sectional view of the CVT of FIG. 1.

Referring now to FIGS. 7-9, in one embodiment, the main axle 1000 can be configured for having the shift-cam-and-sun subassembly 1300, the auxiliary axle 1600, the stator subassembly 1700, the housing subassembly 2600, and the lubricant manifold 2700, axially constrained between an axial reaction flange 1003 and a main axle nut 1004 (FIG. 7). In one embodiment, the main axle 1000 includes a first end portion 1006, a second end portion 1008, and a central portion 1010. The axial reaction flange 1003 is located at the first end portion 1006, and threads 1012 are provided at the second end portion 1008. The main axle nut 1004 includes a threaded bore configured for mating with the threads 1012. The axial reaction flange 1003 can be fixedly attached to the main axle 1000 adjacent the first end portion 1006.

In one embodiment, the main axle 1000 includes various structural features configured for engaging mating components of subassemblies and/or related fastening devices. The central portion 1010 can include a first segment 1014 of a first diameter, a second segment 1016 of a second diameter, a third segment 1018 of a third diameter, a slot 1020, a locking member seat 1022 (for example, a recess configured for receiving a key), a first lubricant delivery passage 1024, a second lubricant delivery passage 1025, and a lubricant inlet passage 1026. The first segment 1014 can extend from an inboard face 1027 of the axial reaction flange 1003, with the second segment 1016 extending from the first segment 1014, and the third segment 1018 extending from the second segment 1016. In this manner, the segments 1014, 1016, and 1018 can define respective shoulders on which various components and/or subassemblies can be mounted. The second end portion 1006 of the main axle 1000 can include a shoulder 1028 extending from an outboard face 1030 of the axial reaction flange 1003, which shoulder 1028 can have a recess 1032 therein to provide axial clearance for a shaft (not shown) engaged within a splined bore 2310 of the output shaft 2300.

In one embodiment, the main axle longitudinal passage 1001 extends along the longitudinal axis L1 between the first end portion 1006 and the second end portion 1008 of the main axle 1000. The slot 1020, the lubricant delivery passages (1024, 1025), and the lubricant inlet passage 1026 each extend communicatively between a respective exterior face of the main axle 1000 and the longitudinal passage 1001. Adjacent to the first end portion 1006 of the main axle 1000, the longitudinal passage 1001 can be configured to receive a bushing 1036A and a bushing 1036B (See FIG. 7). The bushings 1036A and 1036B slidably support and align the shift rod 3000. In some embodiments, the placement of the bushings 1036A and 1036B form a groove that can be adapted to receive, for example, an o-ring. In one embodiment, at least a portion of the longitudinal passage 1001 includes flutes 1049 (See FIGS. 7 and 9), which serve to reduce the amount of surface contact between the main axle 1000 and the shift rod 3000 for reducing force required to translate the shift rod 3000, and for allowing the flow of the lubricant between the shift rod 3000 and the main axle longitudinal passage 1001.

As best shown in FIGS. 10-12, in one embodiment, the auxiliary axle 1600 includes a reaction flange 1605, a first shoulder 1608, a second shoulder 1615, a central bore 1625, a locking member slot 1628, and lubricant passages 1630. The first shoulder 1608 extends from a first side face 1632 of the reaction flange 1605. The second shoulder 1615 extending from a second side face 1634 of the reaction flange 1605. The central bore 1625 and the locking member slot 1628 each extend between opposing ends of the auxiliary axle 1600. The lubricant passages 1630 extend between the central bore 1625 and an exterior surface of the reaction flange 1605. The first shoulder 1608 can have a circular cross-sectional shape and the second shoulder 1615 can have a rectangular cross-sectional shape. However, it is disclosed herein that the shoulders 1608, 1615 are not limited to any particular cross-sectional shape.

Referring to FIGS. 7 and 10-12, the auxiliary axle 1600 can be mounted on the third segment 1018. In one embodiment, a locking member 1034 (See FIG. 7) engages between the locking member channel 1628 of the auxiliary axle 1600 and the locking member seat 1022 of the main axle 1000. Engagement of the locking member 1034 between the locking member channel 1628 and the locking member seat 1022 inhibits unrestricted rotation of the auxiliary axle 1600 with respect to the main axle 1000. The lubricant passages 1630 allow the flow of lubricant from the shift rod central bore 3026 to subsystem components adjacent to the reaction flange 1605.

Figure 13:
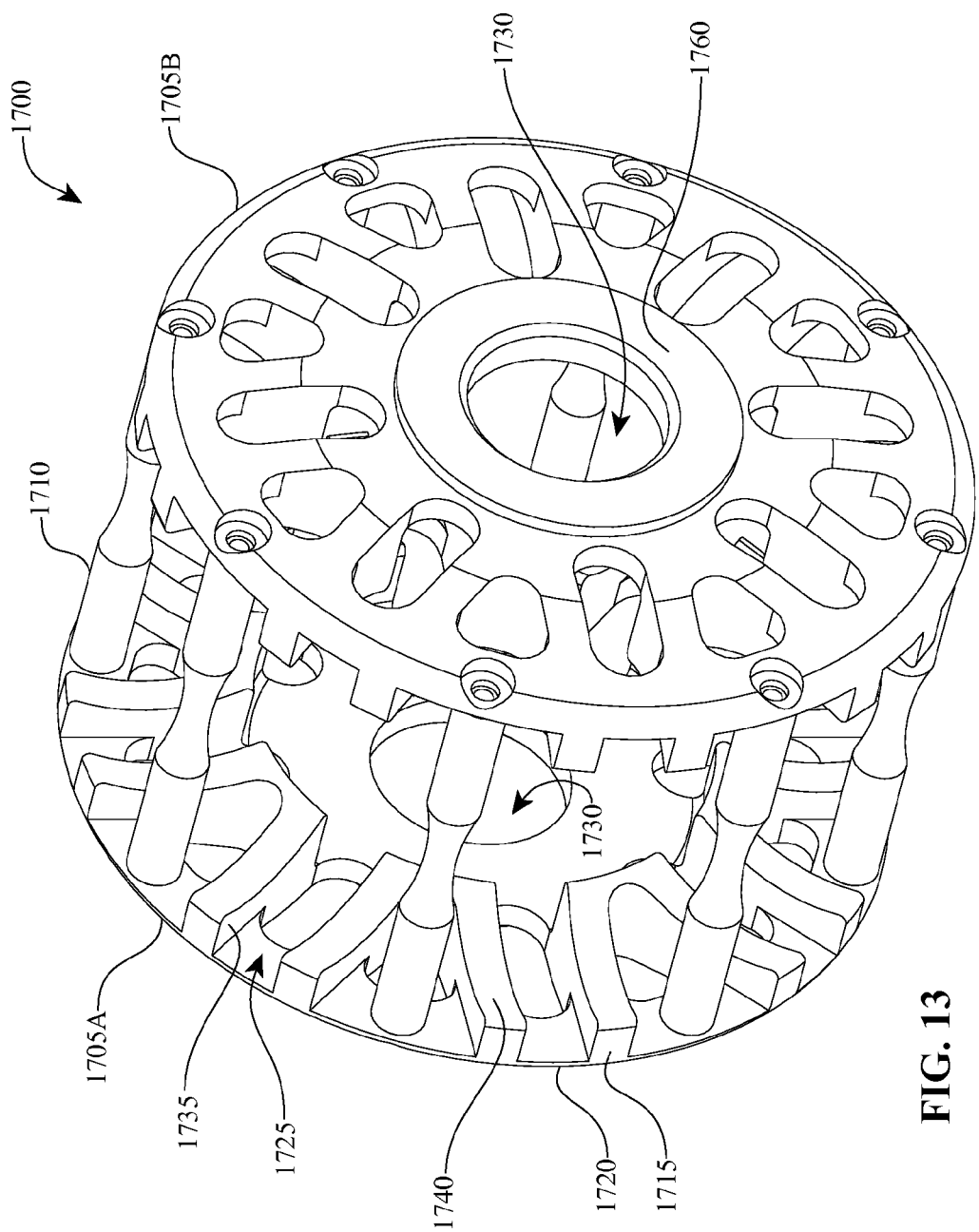
FIG. 13 is a perspective view of a stator assembly that can be used with the CVT of FIG. 1.

As shown in FIG. 13 as an illustrative example, in one embodiment, the stator subassembly 1700 includes a first stator 1705A, a second stator 1705B, and stator connecting rods 1710. The stators 1705A, 1705B are preferably, but not necessarily, essentially identical in construction and can sometimes be referred to herein generically as the stator 1705. The stators 1705A, 1705B are arranged in an opposing face-to-face fashion. The stator connecting rods 1710 fixedly couple between the stators 1705A, 1705B by means such as threaded fasteners, for example. The stators 1705A, 1705B can include dowel pin holes (not shown) for receiving dowels pins to limit relative motion between the stators 1705A, 1705B. Alternatively, the stator connecting rods 1710 can serve as dowels, being received in respective dowel holes of the stators 1705A, 1705B. Alternatively, the stator connecting rods 1710 are not used; in such embodiments, it is preferable to ensure a constant, or controllable, relative angular position of the stator 1705A versus the angular position of the stator 1705B. In some embodiments, the stator assembly 1700 includes two stators formed as a single piece. The stator assembly 1700 can take many different forms to provide substantially similar functionality as described in this disclosure.

The stator 1705 can include a number of shift lever guide flanges 1715. In one embodiment, the shift lever guide flanges 1715 extend from a main body 1720 and are oriented in a radially extending manner. A planet axle passage 1725 extends between each adjacent pair of shift lever guide flanges 1715. Preferably, but not necessarily, the shift lever guide flanges 1715 are uniformly spaced around a central bore 1730 of the stator 1705 whereby the stator 1705 is generally circularly shaped and symmetrical with respect to the central bore 1730. Each shift lever guide flange 1715 includes a skew roller reaction surface 1735 and a shift guide roller reaction surface 1740. The skew roller reaction surface 1735 is substantially flat and the shift guide roller reaction surface 1740 is contoured. Examples of such contour include, but are not limited to, semi-circular, parabolic, elliptical and angularly tapered. Adjacent skew roller reaction surfaces 1735 of adjacent shift lever guide flanges 1715 extend substantially parallel to each other and adjacent shift guide roller reaction surfaces 1740 of adjacent shift lever guide flanges 1715 are substantially aligned.

Referring to FIGS. 7, 9, 10, and 13, in one embodiment, the stator subassembly 1700 mounts jointly on the first segment 1014 of the main axle 1000 and a first shoulder 1608 of the auxiliary axle 1600. The bore 1730 of the first stator 1705A engages the first segment 1014 of the main axle 1000 and the bore 1730 of the second stator 1705B engages the first shoulder 1608 of the auxiliary axle 1600. In this manner, the stator subassembly 1700 is axially constrained between the axial reaction flange 1003 of the main axle 1000 and the reaction flange 1605 of the auxiliary axle 1600. Furthermore, the stator subassembly 1700 can be engaged with the main axle 1000 in a manner that inhibits unrestricted relative rotational movement between the stator subassembly 1700 and the main axle 1000. It is disclosed herein that the stator subassembly 1700 can be engaged with the main axle 1000 and/or the auxiliary axle 1600 by any suitable fastening method or methods. Examples of such suitable fastening methods include, but are not limited to, interference press fit, threaded fastener and mating threaded holes, keyed engagement, splined engagement, etc. For example, one or both of the stators 1705A, 1705B can be secured using screws or bolts (not shown) that engage mating threaded holes (not shown) of the main axle 1000 and/or the auxiliary axle 1600.

Figure 14:
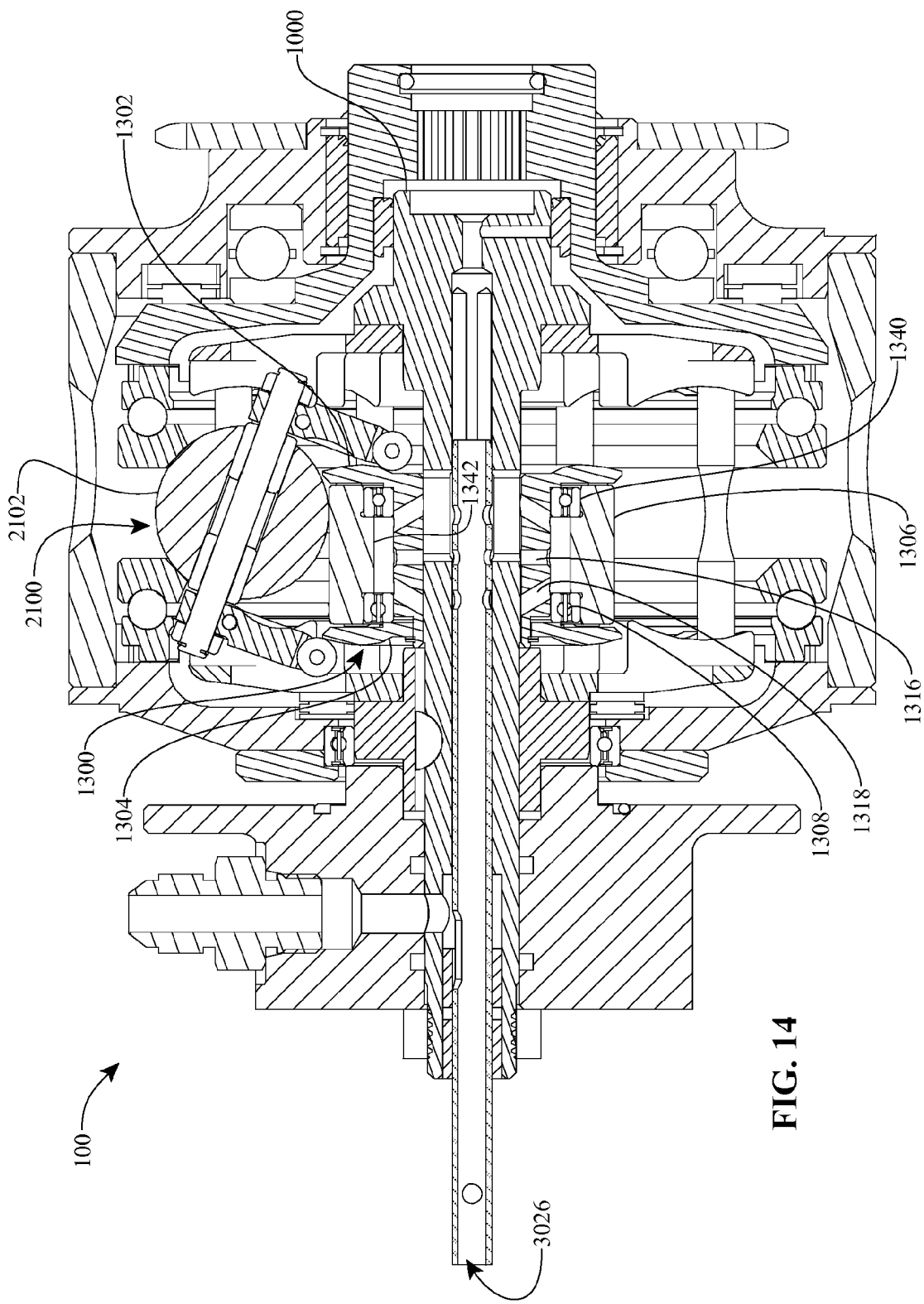
FIG. 14 is yet another cross-sectional view of the CVT of FIG. 1.

As best shown in FIG. 14, in one embodiment, the shift-cam-and-sun subassembly 1300 includes a first shift cam body 1302, a second shift cam body 1304, a sun 1306, and bearings 1308. The sun 1306 can be operationally coupled to the first shift cam body 1302 through the bearings 1308, thereby allowing the sun 1306 to rotate with respect to the first shift cam body 1302. The bearings 1308 can be configured to transfer axial and radial loads between the sun 1306 and the first shift cam body 1302. The sun 1306 and the first shift cam body 1302 can be configured to receive the bearings 1308.

As best shown in FIGS. 15 and 16, in one embodiment, the first shift cam body 1302 includes an extension 1310, a shift cam 1312, a central bore 1314, coupling member holes 1316, lubricant channels 1318, a bearing shoulder 1320, and a retention device groove 1324. The extension 1310 can have a generally cylindrical shape and the shift cam 1312 can have a generally round shape. The shift cam 1312 can be integrally formed with a first end portion 1326 of the extension 1310. An angled edge 1327 of the shift cam 1312 can be provided for directing lubrication from the shift cam 1312 to adjacent components of the CVT 100, as well as providing clearance for planets 2102. The retention device groove 1324 can be formed in a second end portion 1328 of the extension 1310. The second end portion 1328 can include a reduced diameter segment 1329 that defines the bearing shoulder 1320. The central bore 1314 extends through the extension 1310 between the end portions 1326, 1328. The coupling member holes 1316 and the lubricant channels 1318 extend through the extension 1310 at respective positions between the first and second end portions 1326, 1328. The shift cam 1312 has a shift cam surface 1330 defining a respective shift cam surface profile.

Referring to FIGS. 15-18 now, in one embodiment, the second shift cam body 1304 includes a shift cam 1332 and a central bore 1334 (See FIGS. 17 and 18). The shift cam 1332 has a shift cam surface 1335 defining a respective geometric shift cam surface profile. The central bore 1334 is configured for allowing the second shift cam body 1304 to be mounted at the reduced diameter segment 1329 of the first shift cam body 1302 with a reaction surface 1336 abutting the bearing shoulder 1320 of the first shift cam body 1302. A retention device (not shown) such as a snap ring engages the retention device groove 1324 for fixedly securing the second shift cam body 1304 to the first shift cam body 1302. In other embodiments, the first shift cam body 1302 is coupled to the second shift cam body 1304 via, for example, threads, welds, swage, and the like.

In some embodiments, the shift cam surfaces 1330, 1335 of the shift cam bodies 1302, 1304 have substantially identical shift cam surface profiles. One embodiment of data points defining a shape of the shift cam profiles 1330, 1335 is shown in the table of FIG. 19. The X-dimension refers to an axial reference distance to a point on the shift cam surface and the corresponding Y-dimension refers to a radial reference distance to the point on the shift cam surface. A shift cam surface profile defines, in part, the sensitivity of the change in the speed ratio of the CVT 100 for a given control input, such as the axial movement of the shift-cam-and-sun subassembly 1300. The shift cam surface profile, in one embodiment, defines an angular position Gamma of the planet-and-shift-lever subassemblies 2100 as a function of the axial position X of the shift-cam-and-sun subassembly 1300. In some embodiments, the shift cam surface profile is configured to yield a linear relationship between Gamma and X; in other embodiments, the shift cam surface profile is configured to yield a non-linear relationship between Gamma and X. In yet other embodiments, the shift cam surface profile is configured such that an X translation of the shift-cam-and-sun subassembly 1300 when the CVT 100 is near the 1:1 speed ratio results in substantially more, or alternative less, change in Gamma than a similar X translation when the CVT 100 is near a extreme ratio limit. Additionally, in some embodiments the shift cams surfaces 1330 and 1335 of shift cam bodies 1302 and 1304 can have substantially different shift cam surface profiles, if for example it was desired to have a different shift rate when relative to the axial displacement of the shift-cam-and-sun subassembly 1300 when shifting from overdrive to underdrive compared to shifting from underdrive to overdrive.

As shown in FIG. 14, in one embodiment, the sun 1306 can have a generally cylindrical shape with internal recesses 1340 for receiving the bearings 1308 and a central shoulder 1342 that facilitates axial constraint of the bearings 1308 for limiting an insertion depth of each one of the bearings 1308 within the respective one of the recesses 1340. The inventive embodiments are not limited to particular ways for positioning the bearings 1308 with respect to the sun 1306. For example, in other embodiments, a bearing 1308 has an outer race with an integral positioning flange that engages an exterior edge face of the sun 1306. In still other embodiments, the recesses 1340 have a tapered face and each one of the bearings 1308 has an outer race with a tapered exterior surface that engages the tapered face of the respective one of the recesses 1340. In still other embodiments, the central shoulder 1342 can be omitted and a discrete spacer can be used to facilitate proper spacing between the bearings 1308.

Still referring to FIG. 14, the first shift cam body 1302 is slidably mounted on the second segment 1016 of the main shaft 1000. Relative position of the first shift cam body 1302 and placement of the coupling member holes 1316 is such that the coupling member holes 1316 remain aligned with the main axle slot 1020 over a desired longitudinal travel of the shift-cam-and-sun subassembly 1300 for facilitating coupling of the shift-cam-and-sun subassembly 1300 to the shift rod 3000. Furthermore, relative position of the first shift cam body 1302 and placement of the lubricant channels 1318 is such that one or more of the lubricant channels 1318 remains aligned with the main axle slot 1020 over the desired longitudinal travel of the shift-cam-and-sun subassembly 1300 for maintaining an open lubricant flow path between the shift rod central bore 3026 and the one or more of lubricant channels 1318. In this manner, a flow path is provided between the shift rod central bore 3026 and the lubricant channels 1318.

Referring now to FIGS. 20-23, in one embodiment, each one of the planet-and-shift-lever subassemblies 2100 includes a planet 2102 rotatably mounted on a planet axle 2104, which can be positioned on a planet central bore 2103. In some embodiments, each planet 2102 can be spherical in shape. Spaced apart planet bearings 2108 and an inner spacer 2110 can mount coaxially on the planet axle 2104. In some embodiments, the inner spacer 2110 is positioned between the planet bearings 2108. Accordingly, each planet 2102 is rotatably mounted on a respective planet axle 2104 in a rotatable manner. It is disclosed herein that the inventive embodiments are not limited to particular planet bearing and spacer arrangements for rotatably mounting each planet 2102 on the respective planet axle 2104. For example, in some embodiments, a planet bearing and spacer arrangement using more than two or less than two planet bearings and the addition of one or more outer spacers can be implemented.

Planet axle shift levers 2106 ("shift levers 2106") can be fixedly attached to opposing end portions 2107 of the planet axle 2104 such that the planet 2102 is positioned between the shift levers 2106. The planet axle 2104 extends through a planet axle bore 2111 (see FIGS. 22 and 23) of each shift lever 2106. In one embodiment, the planet axle 2104 has a substantially uniform diameter over its entire length and has skew rollers 2122 mounted on the opposing end portions 2107. In another embodiment, the opposing end portions 2107 include skew roller shoulders (i.e., reduced diameter portions) on which the skew rollers 2122 mount. Each skew roller 2122 can be held in place by a clip ring 2126. The clip ring 2126 can be engaged within a groove in the end portions 2107 of the planet axle 2104. It is disclosed herein that, in some embodiments, a shift lever 2106 can include one or more features such as, for example, a recess, a channel, etc., for providing clearance with other components of the CVT 100.

As shown in FIGS. 20-23, in one embodiment, a shift guide roller axle 2116 can be engaged within a shift guide roller axle bore 2117 (FIG. 23) of each shift lever 2106 and, optionally, within a corresponding axle capturing feature (not shown) of the planet axle 2104. Examples of the axle capturing feature include, but are not limited to, a feature generally characterized as a notch, a cut out, a channel, a seat, or the like. In one embodiment, the shift guide roller axle bore 2117 is generally perpendicular to the longitudinal axis L4 of the planet axle bore 2111. The shift guide roller axle bore 2117 is adjacent to a first end portion 2121 of the shift lever 2106. The shift guide roller axle 2116 and the optional axle capturing feature (not shown) can be configured for limiting (for example, substantially precluding) radial displacement of the shift guide roller axle 2116 with respect to the engaged axle capturing feature. Thus, such mating configuration of the shift guide roller axle 2116 and the optional axle capturing feature limits displacement of the shift lever 2106 along the longitudinal axis L4 when the shift guide roller axle 2116 is mounted on the planet axle 2104 with the shift guide roller axle 2116 engaged within the shift guide roller axle bore 2117 and the optional axle capturing feature 2119. Shift guide rollers 2114 can be mounted on opposing end portions of each shift guide roller axle 2116. Each shift guide roller axle 2116 can be secured in place by, clip rings 2120, which clip rings 2120 can be engaged within a groove 2191 of the shift guide roller axle 2116 and, optionally, washers.

Figure 23:
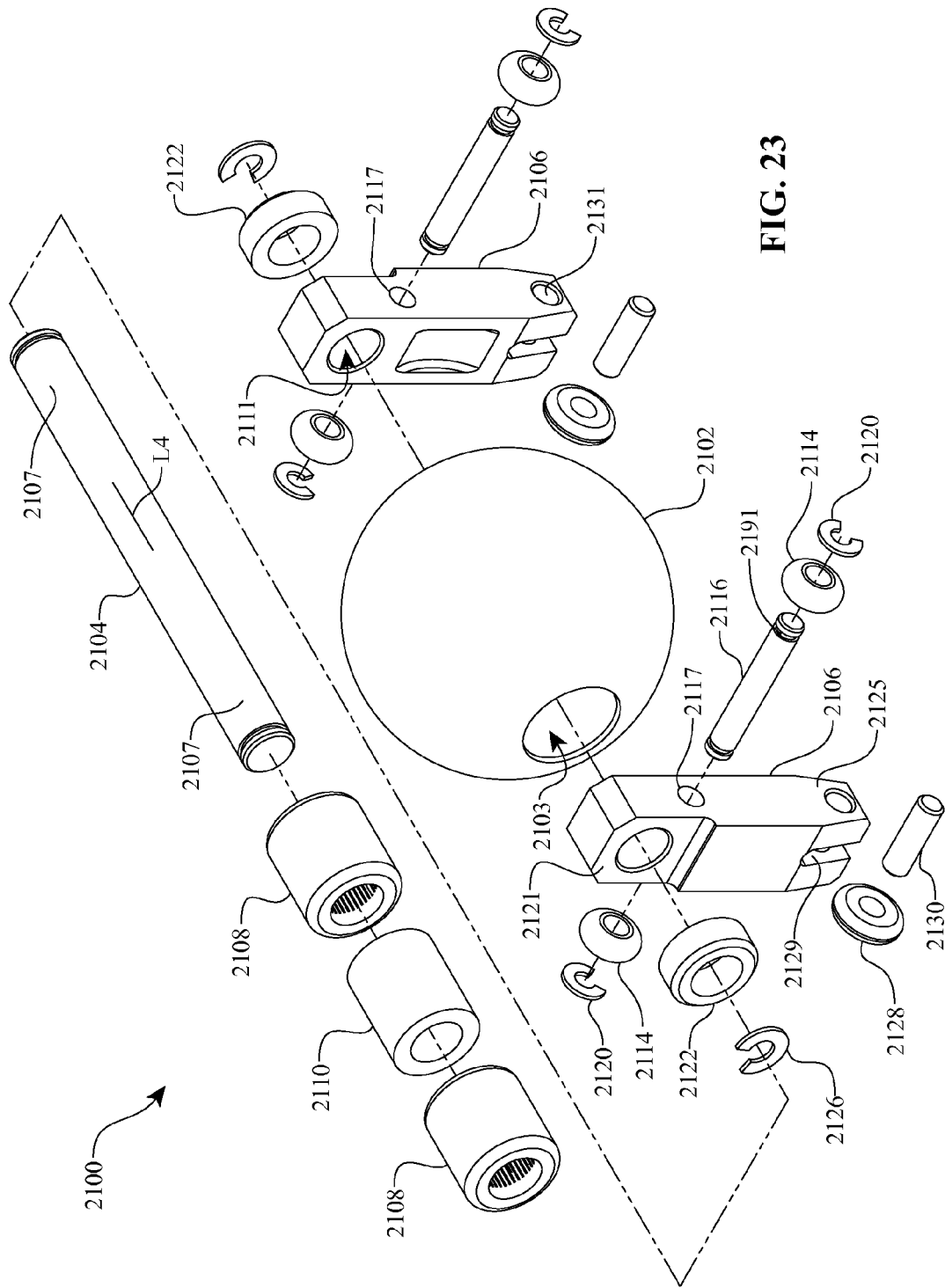
FIG. 23 is an exploded perspective view of the planet-and-shift-lever subassembly of FIG. 21.

At a second end portion 2125 of the shift lever 2106, a roller receiving channel 2129 can be provided. A shift cam roller 2128 is positioned in the roller receiving channel 2129. A shift cam roller axle 2130 extends through the shift cam roller 2128 and into engagement with axle receiving passages 2131 (FIG. 23). In one embodiment, the shift cam roller axle 2130 can be secured in place through an interference fit with the respective axle receiving passages 2131. In other embodiments, securing means such as a clip and groove arrangement can be implemented.

Figure 20:
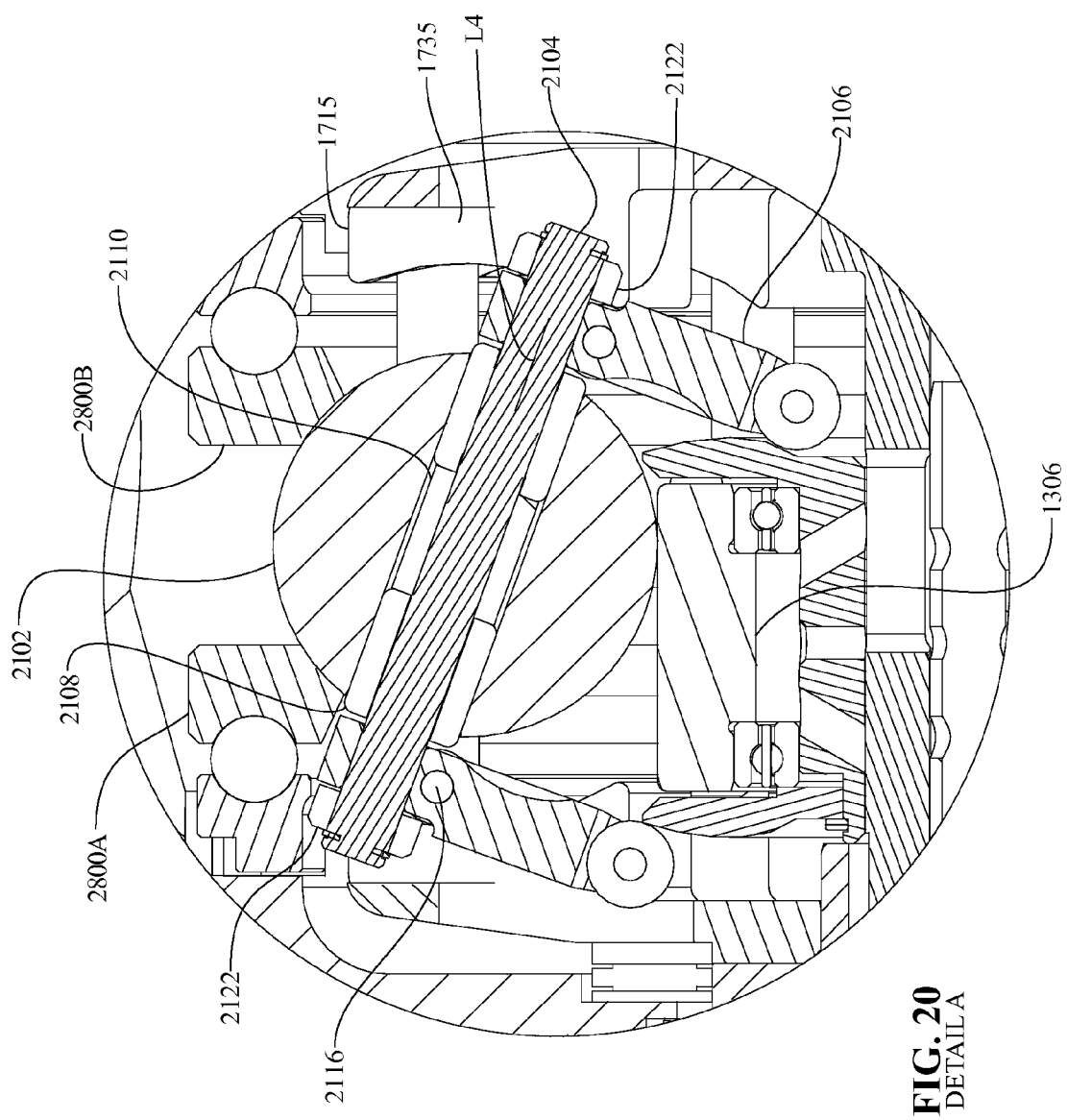
FIG. 20 is a cross-sectional, Detail A view of the CVT of FIG. 1 showing a planet-and-shift-lever subassembly.

Referring to FIG. 20, simultaneous engagement of each planet 2102 (one shown in FIG. 20) with the first axial force generator subassembly 2800A, the second axial force generator subassembly 2800B, and the sun 1306 substantially constrains axially and radially the planet 2102 of each planet-and-shift-lever subassembly 2100. The planet 2102 is rotatably mounted on the respective planet axle 2104. The skew roller 2122 of a planet-and-shift-lever subassembly 2100 is positioned within a respective planet axle passage 1725 (also See FIG. 13) and engages skew roller reaction surfaces 1735 of adjacent shift lever guide flanges 1715, thereby substantially precluding rotation of the respective planet-and-shift-lever subassembly 2100 about any radial axis extending perpendicular to the longitudinal axis L1. The two shift guide rollers 2114 of each shift lever 2106 engage respective shift guide roller reaction surfaces 1740. Accordingly, a first one of the shift guide rollers 2114 engages a shift guide roller reaction surface 1740 on a first side of the respective planet axle passage 1725, and a second one of the shift guide rollers 2114 engages a shift guide roller reaction surface 1740 on a second side of the respective planet axle passage 1725. The semi-circular shape of the shift guide roller reaction surfaces 1740 and the corresponding engagement by the shift guide rollers 2114 serves to, among other things, substantially preclude axial displacement of the respective planet-and-shift-lever subassemblies 2100 relative to the main axle longitudinal axis L1, as well as to reduce the force needed to effect a tilting of the planet axles 2104.

Hence, each planet-and-shift-lever subassembly 2100 is substantially axially and radially constrained relative to the main axle longitudinal axis L1, and constrained with respect to rotation about any radial axis extending perpendicular to the main axle longitudinal axis L1. However, preferably, each planet-and-shift-lever subassembly 2100 is rotatable about the respective tangential reference axis T1, which extends through a center point of the respective planet 2102 substantially perpendicular to a radial reference axis extending from the main axle longitudinal axis L1 through the center point of the respective planet 2102.

Referring now to FIGS. 24-29, in one embodiment, the first axial force generatoraxial force generator subassembly 2800A and the second load-cam-and-traction-ring subassembly 2800B (see FIG. 24) are substantially identical in construction and function, and are sometimes referred to herein generically as the axial force generator subassembly 2800. The axial force generator subassembly 2800A can include a load cam ring 2802, a traction ring 2804A, and a number of load cam rollers 2806. In one embodiment, the load cam ring 2802 is in interlocked engagement with the housing subassembly 2600, thereby facilitating the transfer of torque from the housing subassembly 2600 to the load cam ring 2802 by inhibiting unrestricted rotation of the first axial force generator subassembly 2800A with respect to the housing subassembly 2600. The load cam ring 2802 can be configured to transfer torque to the traction ring 2804A via the number of load cam rollers 2806. The load cam rollers 2806 are engaged between the load cam ring 2802 and the traction ring 2804A. The traction ring 2804B can be positioned between the load cam rollers 2806 and the planets 2102. With respect to the first axial force generator subassembly 2800A, torque exerted on the load cam ring 2802 by the housing subassembly 2600 is transferred from the load cam ring 2802 to the traction ring 2804A through the load cam rollers 2806.

Figure 26:
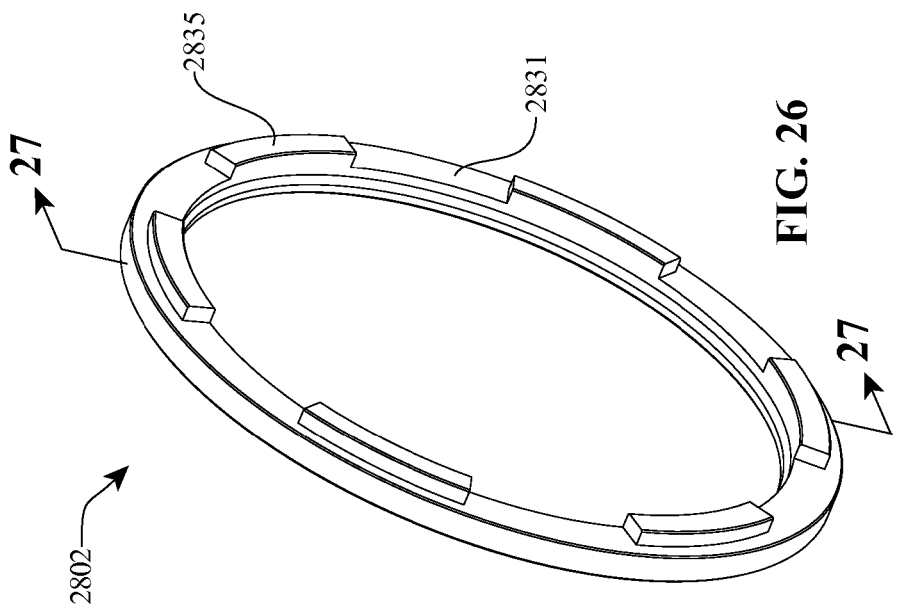
FIG. 26 is another perspective view of the load cam ring of FIG. 25.
Figure 27:
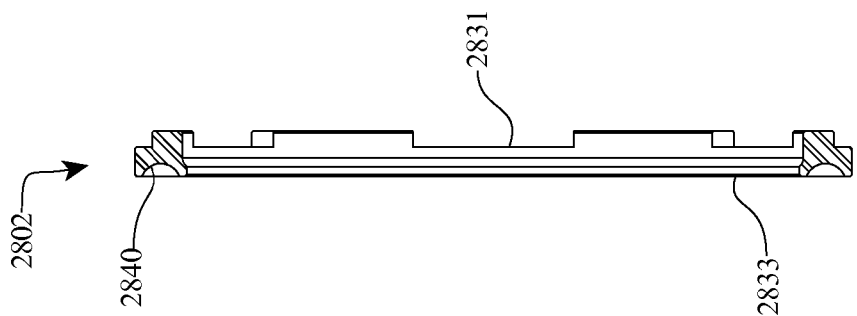
FIG. 27 is a cross-sectional view of the load cam ring of FIG. 25.
Figure 25:
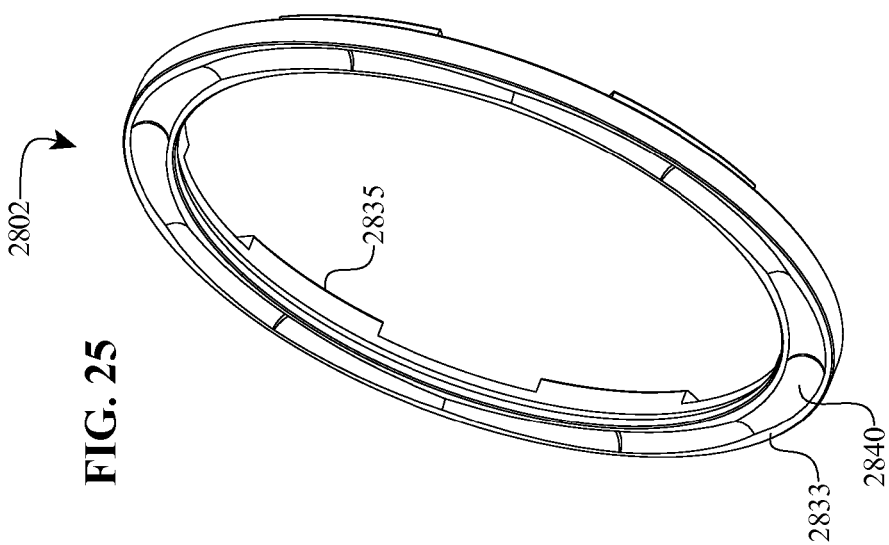
FIG. 25 is a perspective view of one embodiment of a load cam ring that can be used with the CVT of FIG. 1.

As best shown in FIGS. 25-27, in one embodiment, the load cam ring 2802 has a generally annular ring shape with a front face 2831 and a rear face 2833. The load cam ring 2802 can include engagement features 2835 (for example, peripheral splines) on the front face 2831 that engage mating engagement features of the housing subassembly 2600 (that is, in the case of the first axial force generator subassembly 2800A) or mating engagement features of the output shaft 2300 (that is, in the case of the second axial force generator subassembly 2800B). In one embodiment, a number of bi-directional ramps 2840 can be provided in the rear face 2833.

As best shown in FIGS. 28 and 29, in one embodiment, the traction ring 2804 has a generally annular ring shape with a front face 2861 and a back face 2863. The traction ring 2804 includes a contact surface 2865 that engages the planets 2102 (one shown in FIG. 24). In one embodiment, a number of bi-directional ramps 2870 can be provided in the rear face 2863.

The ramps 2840, 2870 can each be configured for receiving one of the load cam rollers 2806 (FIG. 24) to cooperate with the respective load cam roller 2806 for applying an axial force and a tangential force on the traction ring 2804A in response to torque being exerted on the load cam ring 2802. Through such cooperation, torque exerted on the load cam ring 2802 by the housing subassembly 2600 causes the load cam rollers 2806 to urge the traction ring 2804A into compressive engagement with the planets 2102 and to urge the traction ring 2804A into rotation about the main axle longitudinal axis L1, thereby providing for torque transfer from the load cam ring 2802 to the planets 2102 via the traction ring 2804A.

Figure 24:
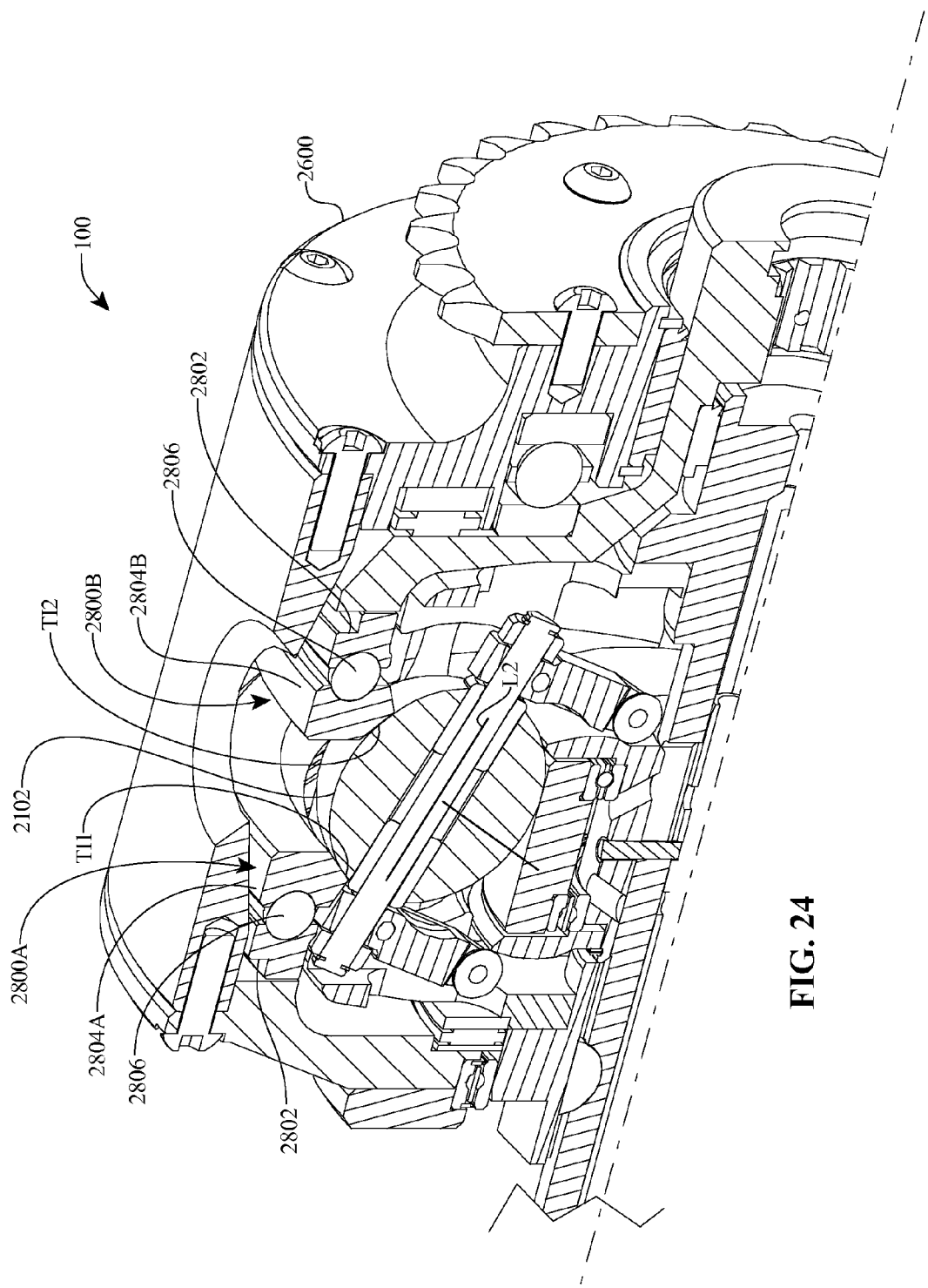
FIG. 24 is yet another partial cross-sectional perspective view of certain components of the CVT of FIG. 1.

The first traction interface TI1 is the region of contact between the contact surface 2865 and each one of the planets 2102 (one shown in FIG. 24). Through traction at each first traction interface TI1 (See FIG. 24), torque imparted to the traction ring 2804A by the load cam ring 2802 is transferred to the planets 2102 through engagement of the load cam rollers 2806 with the ramps 2840, 2870. Such transfer of torque causing each planet 2102 to rotate about the respective planet axle 2104. Preferably, but not necessarily, traction at the first traction interfaces TI1 is provided through an elasto-hydrodynamic layer formed by a traction fluid. The traction ring contact surface 2865 is generally angled relative to the front face 2861, wherein the profile of the contact surface 2865 mates efficiently with a curvature of each planet 2102. The angle of inclination between the front face 2861 and the contact surface 2865 can be between about 5 degrees and 75 degrees, more preferably between about 15 degrees and 65 degrees, even more preferably between about 30 degrees and 55 degrees, and most preferably between about 35 degrees and 50 degrees.

As disclosed above, in one embodiment, the first axial force generator subassembly 2800A and the second axial force generator subassembly 2800B are substantially identical in construction and function. Accordingly, through traction at each second traction interface TI2 (See FIG. 24) of the second axial force generator subassembly 2800B, torque exerted on the traction ring 2804B by the planets 2102 is transferred from the traction ring 2804B to the load cam 2802 through the load cam rollers 2806. As with the first axial force generator subassembly 2800A, preferably, but not necessarily, traction at the second traction interfaces TI2 is provided through an elasto-hydrodynamic layer formed by a traction fluid.

As shown in FIGS. 30-32, in one embodiment, the output shaft 2300 includes a neck 2302 and a thrust reaction flange 2304. The neck 2302 and the thrust reaction flange 2304 can be generally symmetric about the output shaft longitudinal axis L3. The neck 2302 attaches to and extends from a first side 2306 of the thrust reaction flange 2304. The output shaft 2300 includes a central passage 2308 extending through the neck 2302 and the thrust reaction flange 2304 along the longitudinal axis L3. The neck 2302 can include splines 2310 within the central passage 2308 for allowing interlocked engagement of the output shaft 2300 to a mating component (for example, a shaft) of a related device, apparatus or system. A bearing support surface 2312 of the neck 2302 can extend generally parallel to the longitudinal axis L3. A lubricant channel 2314 extends between the central passage 2308 and the bearing support surface 2312 for providing a lubricant flow path to an output shaft bearing mounted on the bearing support surface 2312. A seal groove 2316 (See FIG. 32) such as, for example, an O-ring groove can be provided within the central passage 2308. In use, a seal (not shown) seated in the seal groove 2316 provides a seal between the neck 2302 and the mating component engaged within the central passage 2308 for limiting the flow of lubricant through the interface between the neck 2302 and the mating component. A bearing support surface 2318 and a main axle recess 2320 can be provided within the central passage 2308.

The first side of the thrust reaction flange 2304 can be defined by a bearing thrust reaction surface 2322 (See FIGS. 31 and 32). A bearing support shoulder 2324 extends from the bearing thrust reaction surface 2322. A number of engagement features 2326 (for example, splines) and pilot guides 2328 extend from a second side 2330 of the thrust reaction flange 2304 around a periphery of the thrust reaction flange 2304. Mating pairs of the engagement features 2326 and pilot guides 2328 can be radially aligned and angularly spaced apart around the longitudinal axis L3. The pilot guides 2328 extend farther from the second side 2330 than do the engagement features 2326.

Referring now to FIGS. 30-33, in one embodiment, the output shaft 2300 is rotatably mounted on the shoulder 1028 at the first end portion 1006 of the main axle 1000. The shoulder 1028 is positioned within the central passage 2308. A tip portion of the main axle 1000 can reside within the main axle recess 2320. A bearing 2332 or other suitable device (for example, a roller bearing or bushing) resides between the shoulder 1028 and the bearing support surface 2318. The output shaft 2300 circumferentially engages the second axial force generator subassembly 2800B in a manner that inhibits unrestricted rotation of the second axial force generator subassembly 2800B with respect to the output shaft 2300. More specifically, all or a portion of the engagement features 2326 engage adjacent pairs of the engagement features 2835 of the load cam ring 2802 with the pilot guides 2328 extending over a peripheral edge of the load cam ring 2802 for helping to maintain alignment of the load cam ring 2802 with the output shaft 2300. Through such inhibiting of unrestricted rotation of the second axial force generator subassembly 2800B with respect to the output shaft 2300, torque can be transferred from the second axial force generator subassembly 2800B to the output shaft 2300.

Figure 33:
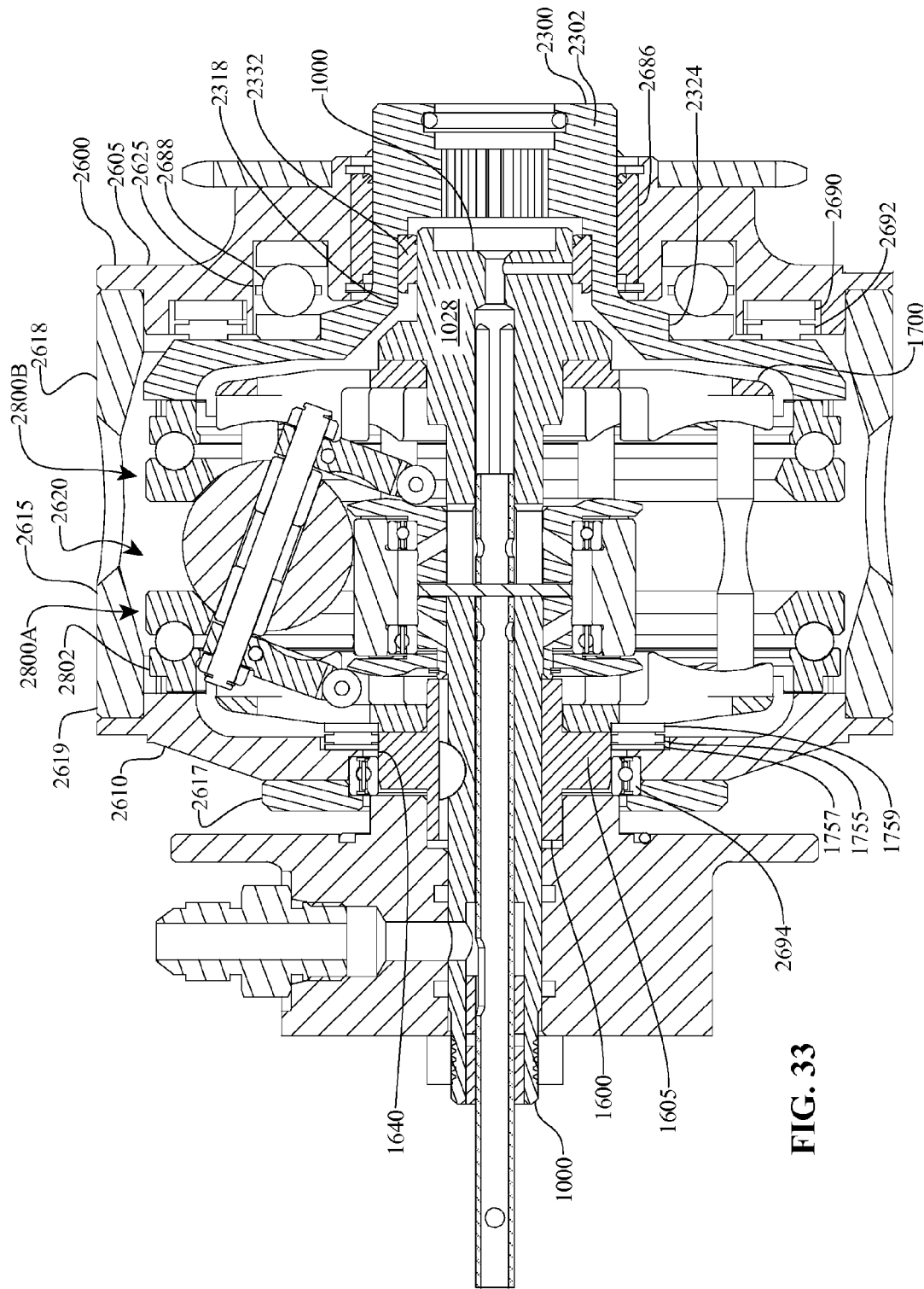
FIG. 33 is yet another partial cross-sectional view of the CVT of FIG. 1.
Figure 42:
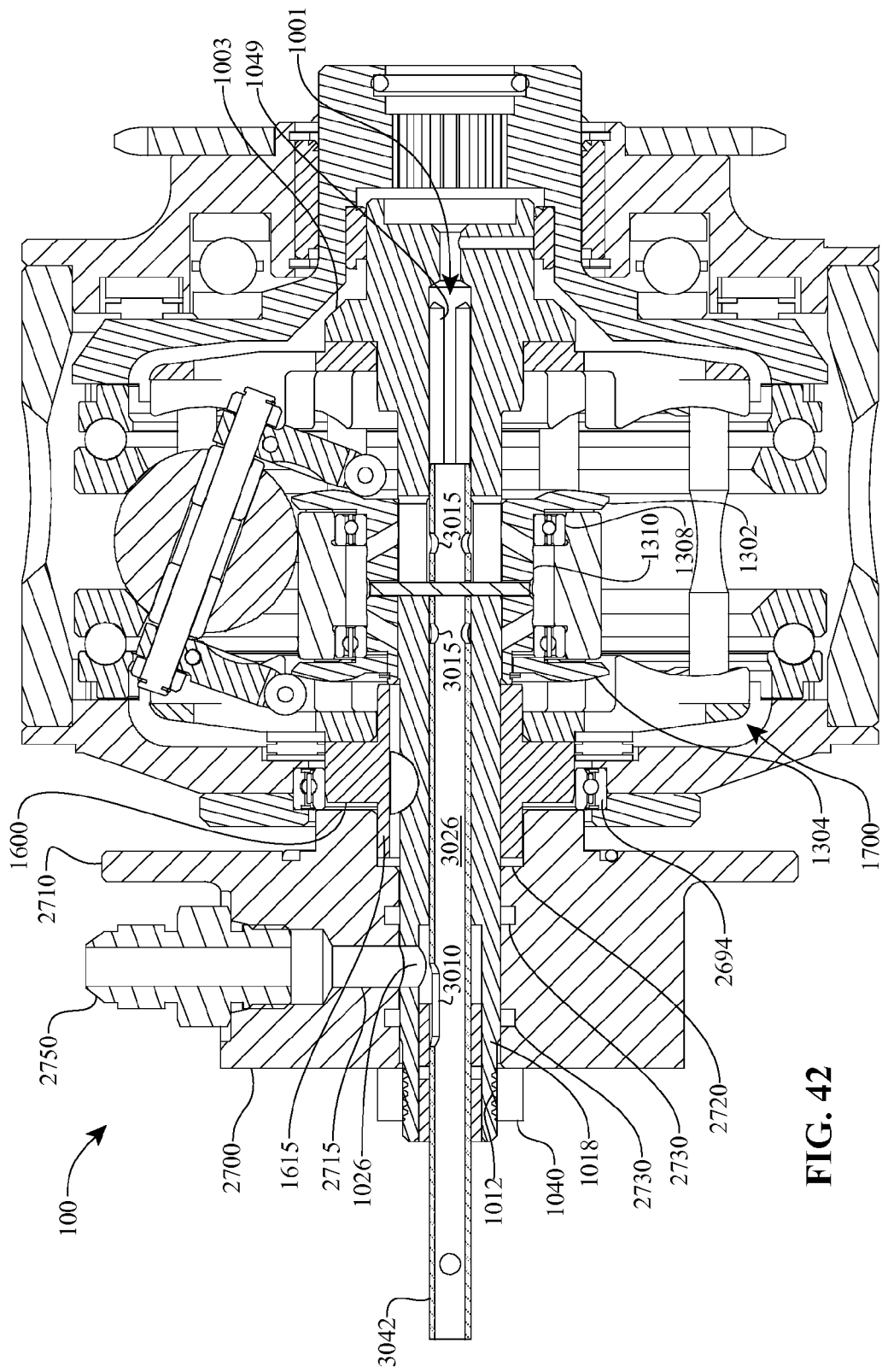
FIG. 42 is yet another cross-sectional view of the CVT of FIG. 1.

As best shown in FIG. 33, in one embodiment, the housing subassembly 2600 includes a first housing cover plate 2605, a second housing cover plate 2610, a central housing shell 2615 and an end cap 2617. The central housing shell 2615 has a generally cylindrical shape. The first housing cover plate 2605 attaches to a first end portion 2618 of the central housing shell 2615 and the second housing cover plate 2610 attaches to a second end portion 2619 of the central housing shell 2615 such that the first housing cover plate 2605, the second housing cover plate 2610 and the central housing shell 2615 jointly define an interior space 2620 therebetween. The housing cover plates 2605, 2610 can be attached to the central housing shell 2615 by a variety of ways such as, for example, welding, threaded fasteners, mating structural features and the like. Regardless of the specific method of attaching the housing cover plates 2605, 2610 to the central housing shell 2615, the housing cover plates 2605, 2610 are preferably attached in a manner that provides for unrestricted rotation of the housing cover plates 2605, 2610 with respect to the central housing shell 2615.

Referring to FIGS. 34-36, in one embodiment, the first housing cover plate 2605 includes a central bore 2620, a bearing recess 2625, a thrust washer recess 2630, retention device grooves 2631, a peripheral flange 2635, and a peripheral shoulder 2640. The first housing cover plate 2605 can be generally circular with the bearing recess 2625, the thrust washer recess 2630, the peripheral flange 2635, and the peripheral shoulder 2640 extending concentrically with respect to a longitudinal axis L5 of the central bore 2620. The bearing recess 2625 can be inboard of the thrust washer recess 2630 with respect to the central bore 2620. The bearing recess 2625 and the thrust washer recess 2630 are accessible via a common side of the first housing cover plate 2605. Mounting holes 2637 can be provided in the peripheral flange 2635 such that fasteners can be extended therethrough for fixedly securing the first housing cover plate 2605 to the central housing shell 2615. In some embodiments, the first housing cover plate 2605 includes only one of the bearing recess 2625 and the thrust washer recess 2630.

Referring to FIGS. 37-38, in one embodiment, the second housing cover plate 2610 includes a central passage 2650, a bearing recess 2655, a thrust washer recess 2660, a peripheral flange 2665, a peripheral shoulder 2670, a number of engagement features 2675, and a number of pilot guides 2680. In some embodiments, the pilot guides 2680 can provide retention for a pre-load spring, such as a wave spring. The second housing cover plate 2610 can be generally circular with the bearing recess 2655, the thrust washer recess 2660, the peripheral flange 2665, and the peripheral shoulder 2670 extending concentrically with respect to a longitudinal axis L6 of the central passage 2650. The bearing recess 2655 is accessible through an outboard reference face 2682 of the second housing cover plate 2610 and the thrust washer recess 2660 is accessible through an inboard reference face 2684 of the second housing cover plate 2610. The engagement features 2675 (for example, splines) and a number of pilot guides 2680 extend adjacent the peripheral shoulder 2670. Mating pairs of the engagement features 2675 and pilot guides 2680 can be radially aligned and angularly spaced apart around the longitudinal axis L6. The pilot guides 2680 extend farther from the inboard face 2684 than do the engagement features 2675.

Referring now to FIGS. 33-38, in one embodiment, the housing subassembly 2600 mounts jointly on the output shaft 2300 and the auxiliary axle 1600. Mounted in this manner, the shift-cam-and-sun subassembly 1300, the stator subassembly 1700, the planet-and-shift-lever subassemblies 2100 and the axial force generator subassembly 2800A, 2800B are located within the interior space 2620. The first housing cover plate 2605 is rotatably mounted on the neck 2302 of the output shaft 2300. The first housing cover plate 2605 is rotatably mounted on the output shaft 2300 and the second housing cover plate 2610 is rotatably mounted on the auxiliary axle 1600.

A bearing 2686 couples between the output shaft neck 2302 and the first housing cover plate 2605 for rotatably and radially supporting the first housing cover plate 2605 on the output shaft 2300. The bearing 2686 resides within the central bore 2308 secured between retention devices such as c-clips engaged with the retention device grooves 2631. A ball thrust bearing 2688 couples between the bearing recess 2625 of the first housing cover plate 2605 and the bearing support shoulder 2324 for reacting axial loads between the first housing cover plate 2605 and the output shaft 2300. Alternatively, in some embodiments, a thrust washer 2690 and a thrust needle bearing 2692 couple between the thrust washer recess 2660 of the of the first housing cover plate 2605 and the bearing thrust reaction surface 2322 of the output shaft 2300 for reacting axial loads between the first housing cover plate 2605 and the output shaft 2300.

An axle ball bearing 2694 couples between the second housing cover plate 2610, the end cap 2617, and the reaction flange 1605 of the auxiliary axle 1600 for reacting radial loads between the second housing cover plate 2610 and the auxiliary axle 1600. The axle ball bearing 2694 engages a bearing recess 2655, a bearing support surface 1640 of the auxiliary axle 1600, and a bearing support surface of the end cap 2617. The end cap 2617 is secured to the second housing cover plate 2610 through, for example, threaded fasteners (not shown) that extend through holes in the end cap 2617 and engage mating holes of the second housing cover plate 2610, thereby securing the axle ball bearing 2694 in place. A thrust needle roller bearing 1755 is coupled between the thrust washers 1757, 1759, which are respectively in contact with the thrust washer recess 2660 of the second housing cover plate 2610 and a thrust washers reaction surface 1760 of the stator subassembly 1700. The auxiliary axle lubricant passages 1630 are aligned with the first lubricant delivery passage 1024 of the main axle 1000 to allow the flow of lubricant from the shift rod central bore 3026 to the axle ball bearing 2694, thrust bearing 1755, and optionally subsystem components adjacent to the reaction flange 1605 and/or the axle ball bearing 2694.

The second housing cover plate 2610 circumferentially engages the first axial force generator subassembly 2800A in a manner that inhibits unrestricted rotation of the first axial force generator subassembly 2800A with respect to the housing subassembly 2600. More specifically, all or a portion of the engagement features 2326 engage adjacent pairs of the engagement features 2835 of the load cam ring 2802 with the pilot guides 2328 extending over a peripheral edge of the load cam ring 2802 for helping to maintain alignment of the load cam ring 2802 with the second housing cover plate 2610. Through such inhibiting of unrestricted rotation of the second axial force generator subassembly 2800B with respect to the second housing cover plate 2610, torque can be transferred to the second axial force generator subassembly 2800B from the second housing cover plate 2610.

As best shown in FIGS. 39-41, in one embodiment, the lubricant manifold 2700 includes a central bore 2705, a flange 2710, a lubricant channel 2715, a piloting recess 2720, an engagement hub 2725, bore seal grooves 2730 and a flange seal groove 2735. The central bore 2705 can be longitudinally aligned with the piloting recess 2720 with the bore seal groove 2730 being concentric with the central bore 2705. The lubricant channel 2715 intersects the central bore 2705 thereby allowing fluid communication therethrough. The lubricant channel 2715 can intersect the central bore 2705 at a position between the bore seal grooves 2730. In some embodiments the lubricant channel can be provided in a lubricant boss 2711 that is located on one side of the flange 2710. The engagement hub 2725, which serves to pilot/align the lubricant manifold with respect to a mating structure, can have a circular cross-sectional shape and be concentric with respect to the central bore 2705. Examples of such a mating structure include, but are not limited to, a housing or case of an engine, transmission, motor and the like. Fastener holes 2732 can extend through the flange 2710 for allowing the flange 2710 to be fixedly engaged with the mating structure. The flange seal groove 2735 is formed in an engagement face 2736 of the flange 2710. The flange seal groove 2735 is configured for carrying a seal (for example, an O-ring seal) for providing a liquid and/or contaminant resistant seal between the flange 2710 and the mating structure. The piloting recess 2720 extends through a reaction surface 2737 of the engagement hub 2725 and has a rectangular cross-sectional profile that allows the piloting recess 2720 to engage the auxiliary axle second shoulder 1615 in an interlocked and/or indexed manner. A main axle reaction surface 2740 can be provided at a first end portion 2745 of the central bore 2705 for supporting a mating end portion of the main axle 1000.

Referring now to FIGS. 39-42, in one embodiment, the lubricant manifold 2700 mounts jointly on the auxiliary axle 1600 and the main axle 1000. The piloting recess 2720 supportably engages the auxiliary axle second shoulder 1615 and the main axle reaction surface 2740 supportably engages the third segment 1018 of the main axle 1000. The engagement hub 2725 engages the axle ball bearing 2694 for reacting axial loads exerted on the axle ball bearing 2694 by the stator subassembly 1700. A main axle nut 1040 engages the main axle treads 1012 and exerts an axial load on the lubricant manifold 2700 such that the auxiliary axle 1600, the stator subassembly 1700 and the lubrication manifold 2700 are axially constrained between the axial reaction flange 1003 and the main axle nut 1040. In some embodiments, the main axle nut 1040 can facilitate the application of a preload to the bearing 2694. A lubricant port 2750 engages within the lubricant channel 2715. The lubricant channel 2715 aligns with the main axle lubricant inlet passage 1026, thereby allowing lubricant supplied through the lubricant port 2750 to flow into the shift rod central bore 3026. Accordingly, the spaced apart bore seal grooves 2730 engage the main axle 1000 on opposing sides of the lubricant inlet passage 1026.

In operation (referring to FIG. 42), the lubricant manifold 2700 receives lubricant via the lubricant port 2750. From the lubricant port 2750, lubricant flows from lubricant channel 2715 through the lubricant inlet passage 1026 and the slot 3010 into the shift rod central bore 3026. A plug (not shown) within the central bore 3026 at the distal end 3042 of the shift rod 3000 limits the flow of lubricant from the shift rod central bore 3026 at the distal end 3042. From the central bore 3026, lubricant flows through the shift rod 3000 to the lubricant ports 3015 of the shift rod 3000 and into one or both of the lubricant channels 1318 of the shift cam extension 1310. The lubricant lubricates the shift cam thrust bearings 1308 and, after exiting via the space between the shift cam bodies 1302, 1304 and the sun 1306, lubricates the planet assemblies 2100. In one embodiment, lubricant pressure at the lubricant port 2750 is about 7 psi and 1 gpm.

Referring to FIGS. 43-45, an embodiment of a drivetrain casing 3700 is shown. The drivetrain casing is one example of the mating structure referred to above. The drivetrain casing 3700 is specifically configured for the CVT 100 discussed above into a driveline of a vehicle between the prime mover and the remaining downstream driveline components. Additionally, in some embodiments, the drivetrain casing 3700 is adapted to allow integration of the CVT 100 with a vehicle chassis or a prime mover structure. Examples of a vehicle chassis structure include, but are not limited to a vehicle frame and a vehicle uni-body. Examples of a prime mover structure include, but are not limited to an engine block, an engine casing and a motor housing.

A main body 3702 of the drivetrain casing 3700 includes a transmission mounting portion 3704 to which the flange 2710 of the CVT100 (See FIGS. 39-42) can be fastened. The mounting portion 3704 includes a mounting surface 3706 configured for being engaged with the flange engagement face 2736 (See FIGS. 40-42). The mounting surface 3706 includes a central passage 3708 configured for piloting the lubrication manifold engagement hub 2725. Fasteners (not shown) extend jointly through respective fastener holes 3710, 2732 for fixedly securing the flange 2710 to the mounting portion 3704. In this mounted arrangement, the lubrication manifold 2700 and the distal end 3042 of the shift rod 3000 are external to an interior space 3712 of the main body 3702, with the housing subassembly 2600 and CVT components engaged therewith being located within the interior space 3712.

The drivetrain casing main body 3702 is configured for fixedly securing to a mating portion of a vehicle chassis structure or a prime mover structure. In one embodiment, the main body 3702 includes fastener bosses 3714 that are each configured for receiving a fastener (for example, a threaded bolt or threaded screw). Through engagement of each fastener with a respective engagement portion of the vehicle chassis structure or a prime mover structure (for example, treaded holes), fasteners extending through the fastener bosses 3714 secure the drivetrain casing 3700 to the vehicle chassis structure or a prime mover structure.

In one embodiment, the drivetrain casing 3700 includes a lubricant sump cavity 3716. The lubricant sump cavity 3716 is a partially separated space from the main body interior space 3712 and includes an edge portion 3718 that is configured for being engaged by a sump cavity cover plate (not shown). Through sealed engagement of the sump cavity cover plate with the edge portion 3718, the lubricant sump cavity 3716 and the sump cavity cover plate jointly define a sump chamber in which lubricant can be contained and extracted by a sump pump (not shown) that supplies lubricant to the lubricant manifold 2700. It is disclosed herein that the sump cavity cover plate can be replaced by a wall that is unitarily formed with the drivetrain casing 3700, with a lubricant fill plug opening and/or lubricant drain plug opening being provided for facilitating filling the sump chamber with lubricant and/or draining removing lubricant from the sump chamber. It is further disclosed herein that the drivetrain casing 3700 and/or the sump cavity cover plate can include cooling fins for dissipating heat.

Figure 46:
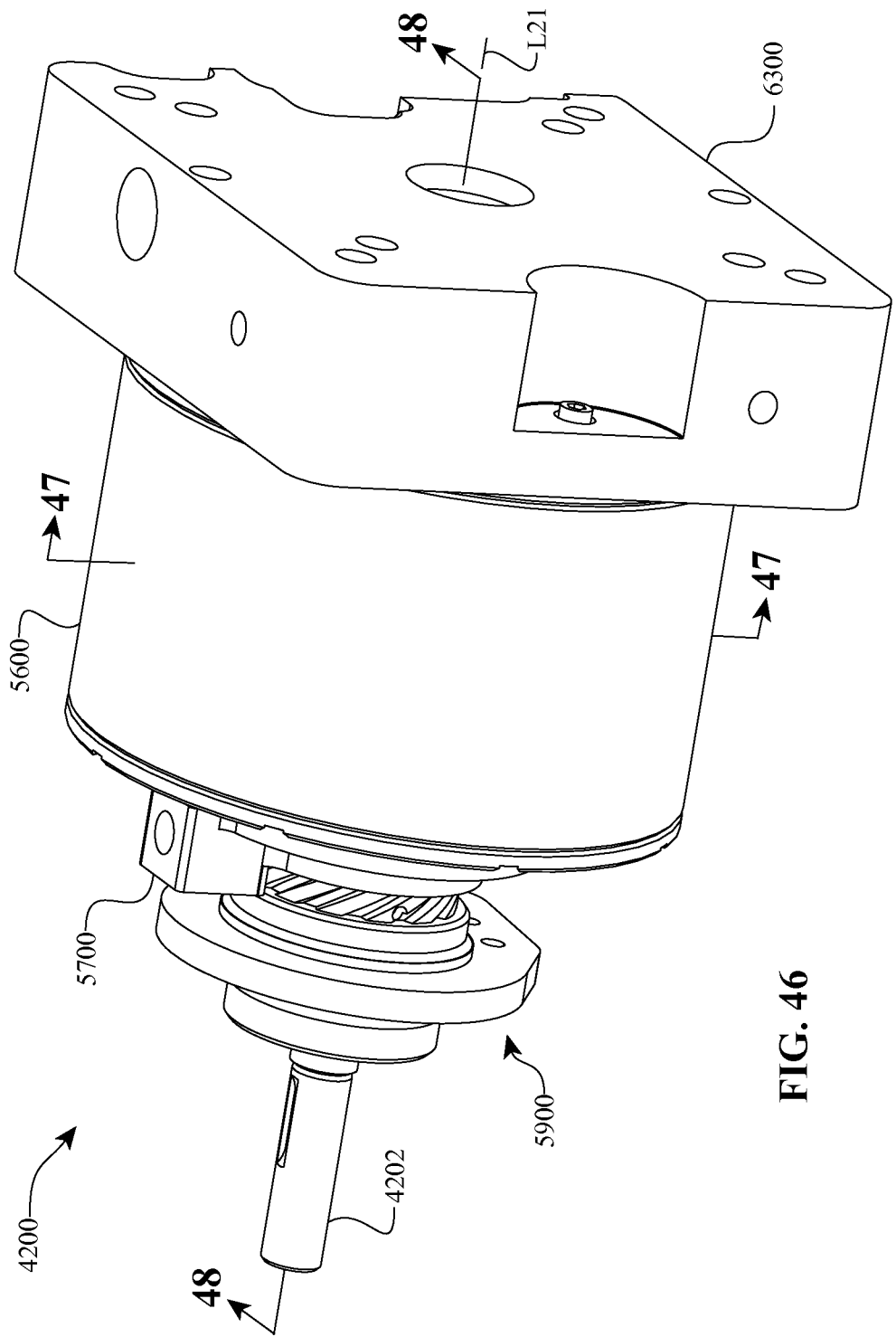
FIG. 46 is a perspective view of one embodiment of an infinitely variable transmission (IVT).
Figure 47:
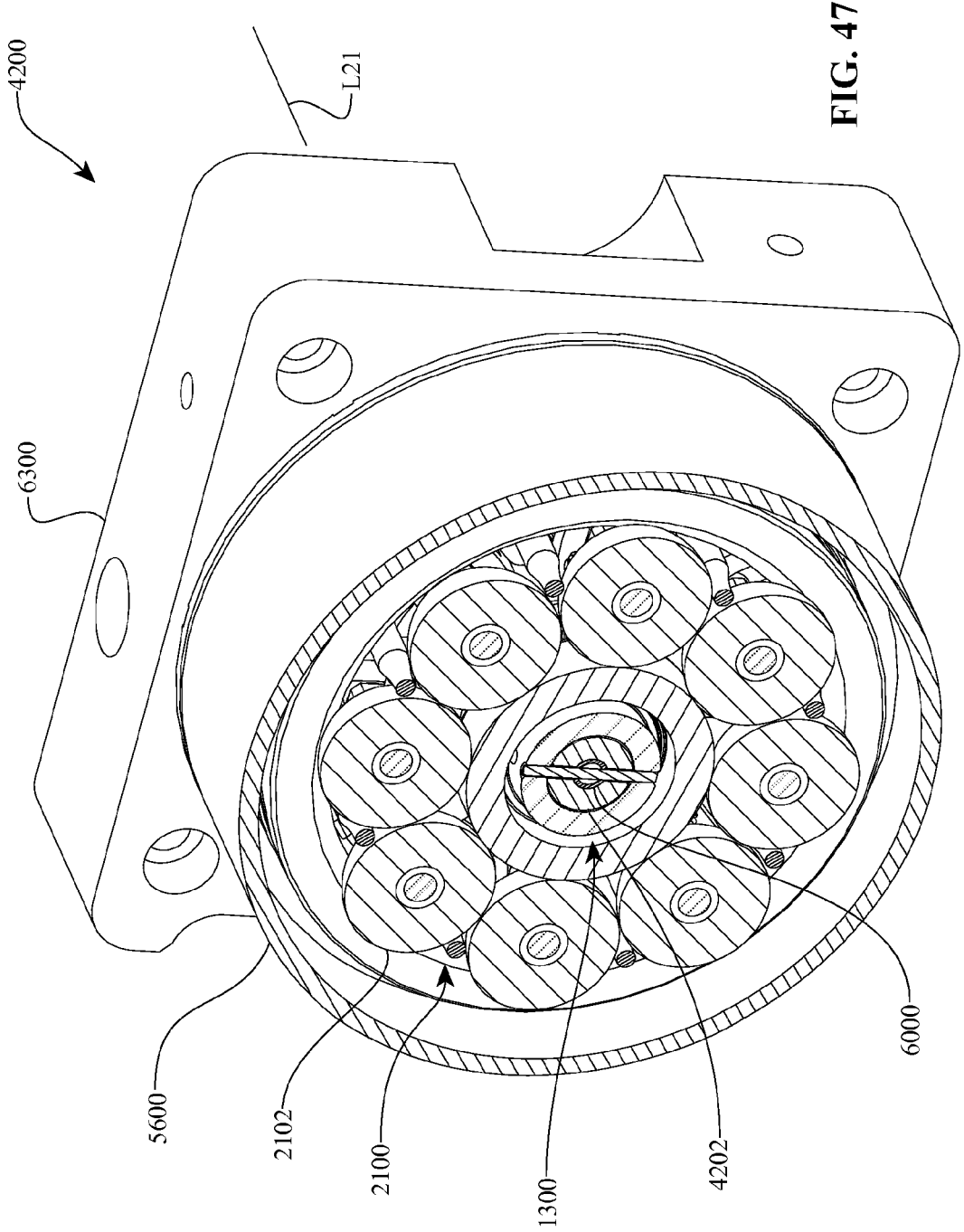
FIG. 47 is a cross-sectional perspective view of the IVT of FIG. 46.
Figure 48:
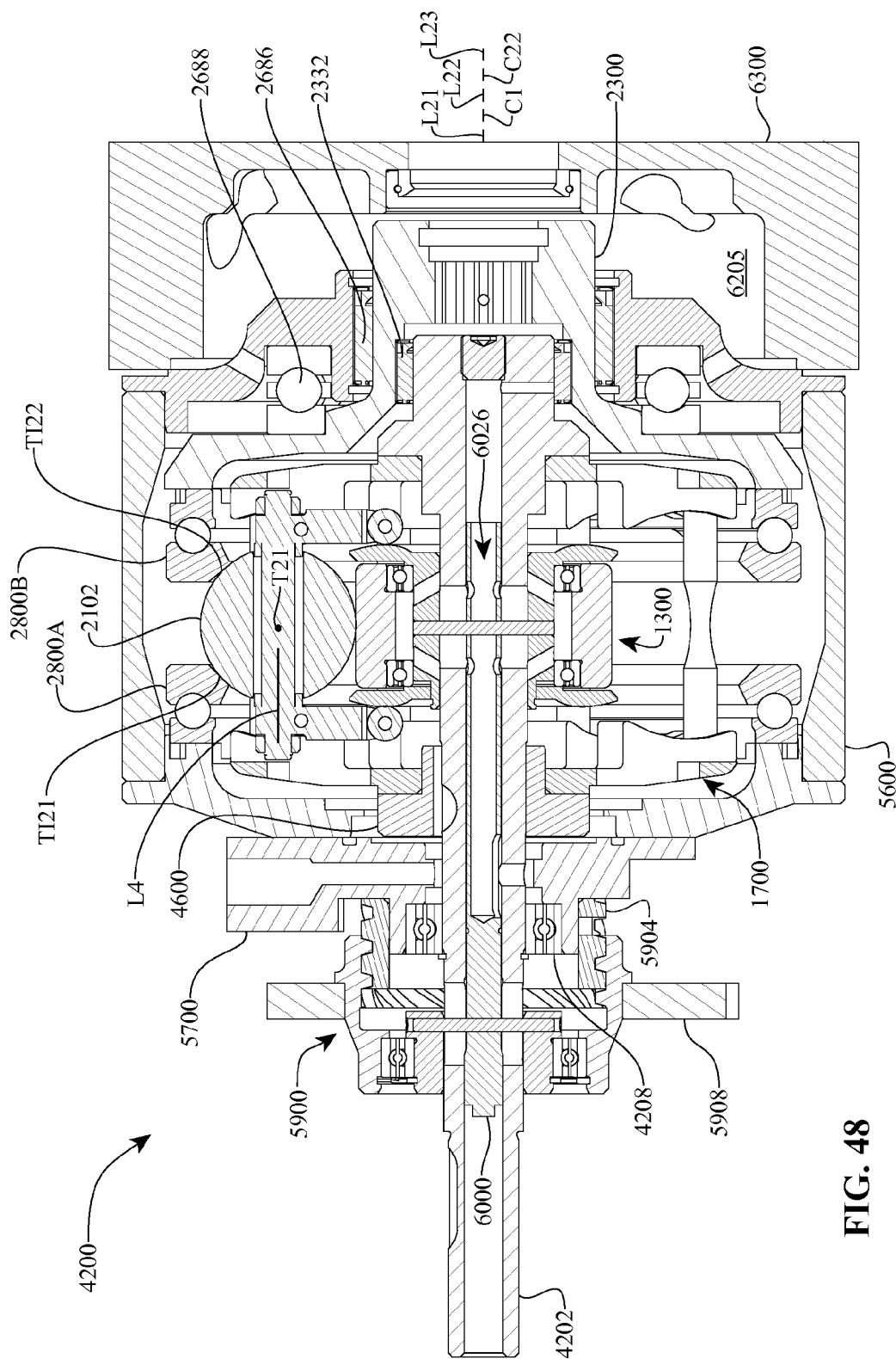
FIG. 48 is a cross-sectional view of the IVT of FIG. 46.

Referring to FIGS. 46-48, an embodiment of an infinitely variable transmission (IVT) 4200 is shown. The IVT 4200 is particularly suitable for, among other applications, vehicles such as a tractor or other type of load-carrying commercial/industrial vehicle. In use, the IVT 4200 couples between a prime mover (for example, a gas powered engine, motor or the like) and a load (for example an axle assembly) for varying torque applied from the prime mover to the load, or for controlling the speed ratio between the prime mover and the output. As discussed below in greater detail, components of the IVT 4200 are arranged and interconnected in a manner that facilitates the infinitely variable transmission (IVT) 4200 can include one or more of the various components and subassemblies that are essentially or identically the same as that discussed above in reference to FIGS. 1-45. In such cases, discussion of those essentially or identically the same components and/or subsystems will be limited to that necessary to sufficiently describe how these components and/or subsystems are implemented within the IVT 4200. Where components and/or subsystems are implemented in the IVT 4200, reference numbers for those components and/or subsystems will be the same as those used above in FIGS. 1-45.

Still referring to FIGS. 46-48, an input shaft 4202 supports the shift-cam-and-sun subassembly 1300 discussed in reference to the CVT 100. The shift-cam-and-sun subassembly 1300 is supported by the input shaft 4202 in a manner allowing translation of the shift-cam-and-sun subassembly 1300 along a longitudinal axis L21 of the input shaft 4202. The input shaft 4202 supports an auxiliary axle 4600 in a manner that coincidentally aligns a longitudinal axis L22 of the auxiliary axle 4600 with the input shaft longitudinal axis L21 and that inhibits unrestricted relative rotation of the auxiliary axle 4600 with respect to the input shaft 4202. The auxiliary axle 4600 is generally the same configuration as the auxiliary axle 1600 with the exception that the auxiliary axle 1600 includes the second shoulder 1615 whereas the auxiliary axle 4600 does not include a second shoulder. The input shaft 4202 and the auxiliary axle 4600 jointly support the stator subassembly 1700 discussed above in reference to the CVT 100. The stator subassembly 1700 is supported such that the centerline axis C1 of the stator subassembly 1700 extends coincidentally with the input shaft longitudinal axis L21.

The number of planet-and-shift-lever subassemblies 2100 discussed above in reference to the CVT 100 is arrayed angularly around the input shaft longitudinal axis L21 and is supported jointly by the shift-cam-and-sun subassembly 1300 and the stator subassembly 1700. The input shaft 4202 supports the output shaft 2300 discussed above in reference to the CVT 100. Bearings 2686, 2688, and 2332 rotatably support the output shaft 2300 between the input shaft 4202 and the housing subassembly 5600 in a manner such that a longitudinal axis L23 of the output shaft 2300 extends coincidentally with the input shaft longitudinal axis L21.

The output shaft 2300 and the auxiliary axle 4600 jointly support a housing subassembly 5600. The housing subassembly 5600 is supported in a manner that coincidentally aligns a centerline axis C22 of the housing subassembly 5600 with the input shaft longitudinal axis L21 and allows relative rotation of the housing subassembly 5600 with respect to output shaft 2300 and the auxiliary axle 4600. A shift actuation subassembly 5900 mounts on the input shaft 4202 in a manner allowing select components of the shift actuation subassembly 5900 to rotate with the input shaft 4202 while other components of the shift actuation subassembly 5900 are held stationary and/or allowed to rotate independent from rotation of the input shaft 4202. The shift actuation subassembly 5900 is coupled to the shift-cam-and-sun subassembly 1300 through a shift rod 6000 for facilitating selective translation of the shift-cam-and-sun subassembly 1300 along the input shaft longitudinal axis L21. A lubricant manifold 5700 is jointly supported by the housing subassembly 5600, the shift actuation subassembly 5900 and a bearing 4208 in a manner whereby the lubricant manifold 5700 is held stationary with respect to rotation of the input shaft 4202. A lubricant sump body 6300 mounts on the housing subassembly 5600 thereby providing a sump chamber 6205 in which a supply of lubricant can be maintained.

With respect to the IVT 4200, the stator subassembly 1700 and the planet-and-shift-lever subassemblies 2100 can be configured and interact in the same manner discussed above in reference to the CVT 100. Accordingly, the planet-and-shift-lever subassemblies 2100 can be synchronously rotated for facilitating torque ratio adjustment. Through such synchronous rotation, all of the planet-and-shift-lever subassemblies 2100 are in the same relative rotational position at a given point in time. Furthermore, it is disclosed herein that the stator subassembly 1700 can be secured to the input shaft 4202 and/or the auxiliary axle 4600 by any suitable fastening method. Examples of such suitable fastening methods include, but are not limited to, interference press fit, threaded fastener and mating threaded holes, keyed engagement, splined engagement, etc. For example, one or both of the stators 1705A, 1705B can be secured using screws that engage mating threaded holes (not shown) of the input shaft 4202 and/or the auxiliary axle 4600.

Referring now to FIG. 48, in one embodiment, the first axial force generator subassembly 2800A discussed above in reference to the CVT 100 couples between the housing subassembly 5600 and the planets 2102, and the second axial force generator subassembly 2800B discussed above in reference to the CVT 100 couples between the output shaft 2300 and each one of the planets 2102. The first axial force generator subassembly 2800A couples to the housing subassembly 5600 in a manner inhibiting unrestricted relative rotation of the first axial force generator subassembly 2800A with respect to the housing subassembly 5600. The second axial force generator subassembly 2800B couples to the output shaft 2300 in a manner inhibiting unrestricted relative rotation of the second axial force generator subassembly 2800B with respect to the output shaft 2300. The first axial force generator subassembly 2800A, the second axial force generator subassembly 2800B and the shift-cam-and-sun subassembly 1300 jointly locate each one of the planets 2102 in a manner that inhibits their axial translation and constrains their angular translation about a respective reference axis T21, which extends through the center of the planets 2102 perpendicularly with respect to the input shaft 4202.

During operation of the IVT 4200, torque exerted on the input shaft 4202 causes the input shaft 4202 and the stator subassembly 1700 to jointly rotate about the input shaft longitudinal axis L21. The stator subassembly 1700 supports the planet-and-shift-lever subassemblies 2100 in a manner that inhibits unrestricted relative rotation of the planet-and-shift-lever subassemblies 2100 with respect to the stator subassembly 1700. Accordingly, the planet-and-shift-lever subassemblies 2100 rotate together with the input shaft 4202 and the stator subassembly 1700. The lubricant manifold 5700, the housing subassembly 5600, the lubricant sump body 6200, and portions of the shift actuation subassembly 5900 are held stationary with respect to rotation of the input shaft 4202. Through traction at a respective first traction interface TI21 between the input axial force generator subassembly 2800A and each planet 2102, torque is exerted by the first axial force generator subassembly 2800A on the planets 2102, thereby causing each planet 2102 to rotate about a respective planet longitudinal axis L4. The first traction interface TI21 is defined, as used here, as a region of contact between the first axial force generator subassembly 2800A and the respective planet 2102. The interaction between the first-axial force generator subassembly 2800A and the planets 2102 causes the planet-and-shift-lever subassemblies 2100 to orbit about the longitudinal axis L23. Through traction at a respective second traction interface TI22 between the second axial force generator subassembly 2800B and each planet 2102, torque is exerted by the planets 2102 on the second axial force generator subassembly 2800B, thereby causing the second axial force generator subassembly 2800B and output shaft 2300 to jointly rotate about the output shaft longitudinal axis L23. The second traction interface TI22 is defined, as used here, as a region of contact between the second axial force generator subassembly 2800B and the respective planet 2102.

Turning now to a brief discussion of power flow through the IVT 4200 and still referring to FIG. 48, torque is delivered to the IVT 4200 through the input shaft 4202 such as via a sprocket or hub fixedly mounted on the input shaft 4202. The exertion of torque on the input shaft 4202 urges the input shaft 4202 and the stator subassembly 1700 to rotate about the input shaft longitudinal axis L21. Because the planet-and-shift-lever subassemblies 2100 are supported by the stator subassembly 1700 in a manner that inhibits unrestricted rotation of the planet-and-shift-lever subassemblies 2100 with respect to the stator subassembly 1700, rotation of the input shaft 4202 causes orbiting of the planet-and-shift-lever subassemblies 2100 about the input shaft longitudinal axis L21. In view of the first axial force generator subassembly 2800A being precluded from rotating about the input shaft longitudinal axis L21 through its coupling to the housing subassembly 5600, traction between the first axial force generator subassembly 2800A and each planet 2102 at the respective first traction interface TI21 causes the planets 2102 to rotate about their respective longitudinal axis L4 in response to rotation of the input shaft 2300. In such an embodiment, the planets 2102 rotate about their respective longitudinal axis L4 in direction that is rotationally opposite the direction of rotation of the input shaft 4202. In response to rotation of the planets 2102, the planets 2102 transfer torque to the second axial force generator subassembly 2800B via the respective second traction interface TI22. The second axial force generator subassembly 2800B exerts torque on the output shaft 2300 thereby urging the output shaft 2300 to rotate about the output shaft longitudinal axis L23.

Presented now is a brief description of torque ratio variation functionality provided by an Infinitely Variable Transmission (IVT) in the context of the disclosures made herein (for example, the IVT 4200). Such IVT functionality, like the CVT functionality described above in reference to the CVT 100, allows essentially every fractional ratio within a given range to be selected in a continuous manner as opposed to a discrete or stepped manner. However, in addition to allowing essentially every fractional torque ratio within a given range to be selected in a continuous manner, IVT functionality also allows delivery of a zero output speed (a "powered zero" state) with a non-zero input speed of a power delivery device (for example, constant speed of a sprocket attached to the input shaft 4202 of the IVT 4200). Hence, given the definition of torque ratio as the ratio of input torque to output torque, an IVT in the context of the disclosures made herein is (at least theoretically) capable of delivering an infinite set of torque ratios.

For a given IVT construction, power input rotational direction with respect to power output rotational direction is variable. That is, for a given power input rotational direction, torque ratio adjustment can result in power output rotational direction being the same or opposite the given power input rotational direction. The zero output speed discussed above is present at the adjustment position where the input and output rotational directions transition between being the same and being opposite. For example, referring to the IVT 4200 and FIG. 48, a constant rotational speed of the input shaft 4202 in a given direction and the non-rotating arrangement of the first axial force generator subassembly 2800A and traction at the respective first traction interface TI21 of each planet 2102 causes the planets 2102 to rotate about the longitudinal axis L4 at a constant rotational speed. The surface speed, relative to the longitudinal axis L4, at the first traction interface TI21 of a planet 2102 is a function of orbital speed of the planet 2102 and the perpendicular distance from the first traction interface TI21 to the planet longitudinal axis L4.

With the planet-and-shift-lever subassemblies 2100 adjusted with their respective longitudinal axis L4 extending parallel to the longitudinal axis L21 of the input shaft 4202 (as shown in FIG. 48), the rotational speed and the orbital speed at the second traction interfaces TI22 of all the planets 2102 is the same as the surface speed at the first traction interfaces TI21 (that is, zero surface speed). With the planet-and-shift-lever subassemblies 2100 adjusted in this orientation, the IVT 4200 is in the "powered zero" state. The "powered zero" state exists in this orientation because while the input speed and torque (that is, power) provided by the input shaft 4202 is nonzero, the output speed at the second axial force generator subassembly 2800B is zero. Moreover, coupling of the second axial force generator subassembly 2800B to the output shaft 2300 dictates that the output shaft 2300 remains stationary as well.

Still referring to the IVT 4200 and FIG. 48 while still assuming that the rotational speed of the input shaft 4202 is being maintained constant, adjustment of the planet-and-shift-lever subassemblies 2100 (that is, rotation about the reference axis T21) causes a reduction or increase in the perpendicular distance between the first traction interface TI21 and the planet longitudinal axis L4 of each planet 2102. This reduction or increase in the perpendicular distance causes a proportional and respective reduction or increase in the rotational speed of the planets 2102, which causes a proportional and respective reduction or increase in the surface speed at the second traction interface TI22 of each planet 2102. Under the assumption that there is negligible or limited slippage between the planets 2102 and the second axial force generator subassembly 2800B, the planets 2102 apply a proportional rotational force on the second axial force generator subassembly 2800B. Because the orbital speed of the planets 2102 and the rotational speed of the planets 2102 are in opposite rotational directions, when the effect of the orbital speed of the planets 2102 is greater than the effect of the rotational speed of the planets 2102 on the resulting surface speed of the planets 2102, the planets 2102 urge the second axial force generator subassembly 2800B to rotate in the same direction as the input shaft 4202 is rotating. Conversely, when the effect of the orbital speed of the planets 2102 is smaller than the effect of the rotational speed of the planets 2102 on the resulting surface speed of the planets 2102, the planets 2102 urge the second axial force generator subassembly 2800B to rotate in the opposite direction as the input shaft 4202 is rotating. Accordingly, it can be seen that torque ratio adjustment of an IVT in accordance with the disclosures made herein provides for reversal of output shaft rotating direction with respect to a constant input shaft rotating direction. Hence, in some embodiments, IVT functionality of the IVT 4200 is achieved without the use of auxiliary gearing, coupling, or clutching. That is, in some embodiments, merely through adjustment of the tilt of the planets 2102, the IVT 4200 can produce a change from a positive rotation, to zero rotation, to a negative rotation. It should be noted that a load or prime mover cannot back drive the output shaft 2300 at the powered zero state because the first axial force generator subassembly 2800A is coupled to ground (that is, the subassembly 2800A is nonrotatable relative to the longitudinal axis L23).

It should be noted that some transmissions use a continuously variable variator unit (for example a CVT) coupled to other gearing and/or clutches to produce IVT functionality. Usually, in such transmissions, power is diverted from a mixing device, routed through the CVT section, and summed back to the original power path at some node in the transmission. In such an arrangement, recirculating power can be greater than the throughput power and can significantly decrease the efficiency of the transmission. Many of the inventive embodiments described here require no split powered arrangement to achieve IVT functionality. In the context of the disclosures presented herein, IVT functionality such as that provided by the IVT 4200 is preferably understood as providing IVT functionality without being necessarily coupled to additional gearing, clutches, split powered arrangements, and/or other devices.

Figure 49:
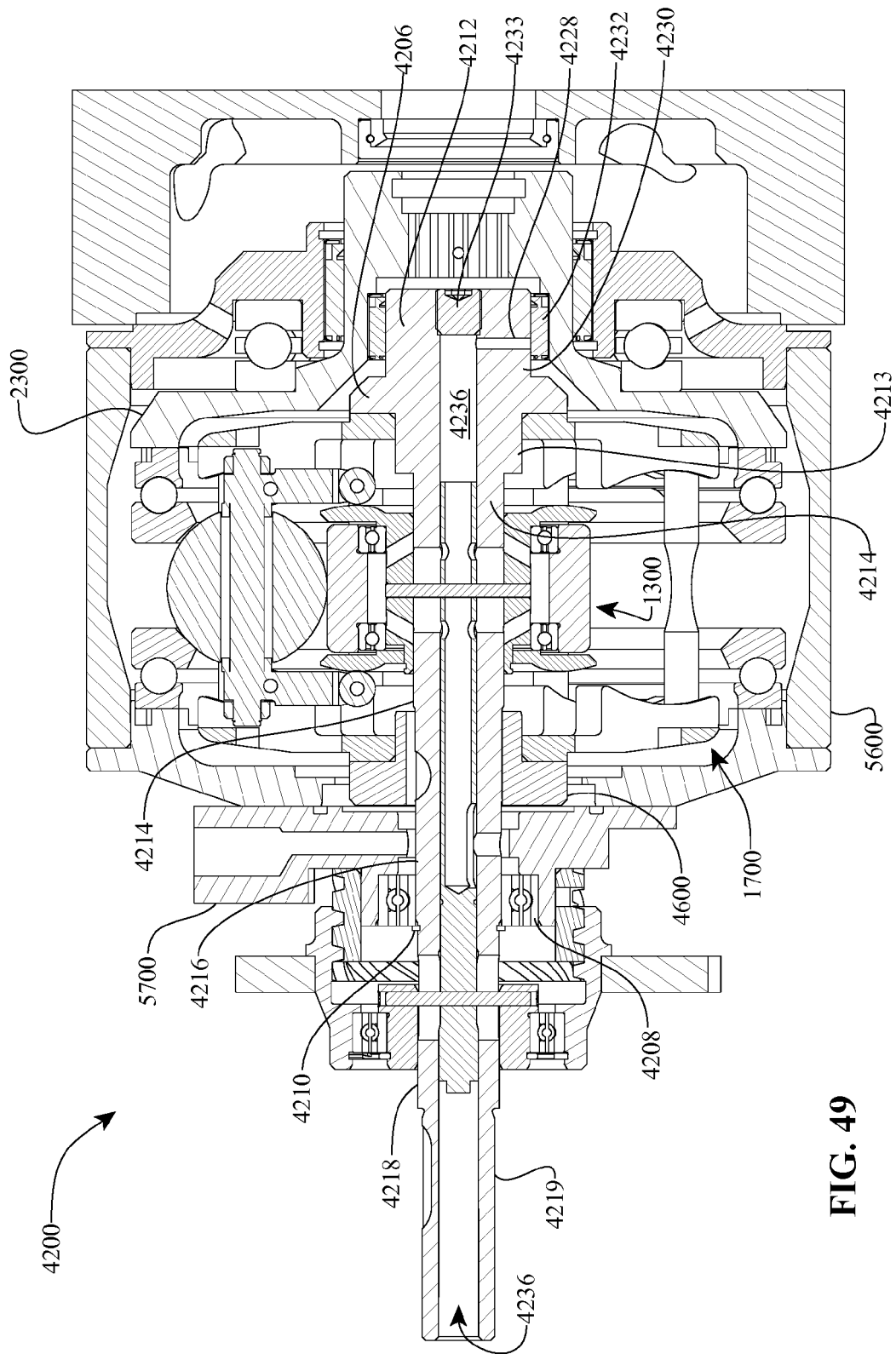
FIG. 49 is another cross-sectional view of the IVT of FIG. 46.

Returning now to discussing construction and elements of the IVT 4200, as best shown in FIGS. 49-51, one embodiment of the input shaft 4202 can be configured for having the shift-cam-and-sun subassembly 1300, the auxiliary axle 4600, the stator subassembly 1700, the housing subassembly 5600, and the lubricant manifold 5700 axially constrained between an axial reaction flange 4206 thereof and a bearing 4208. The bearing 4208 is axially constrained between the lubrication manifold 5700 and a retention device 4210 engaged with a respective retention device groove of the input shaft 4202. The axial reaction flange 4206 can be fixedly attached to a first end portion 4212 of the input shaft 4202.

The input shaft 4202 includes various structural features configured for engaging mating components of subassemblies and/or related fastening devices. In one embodiment, the input shaft 4202 includes a first segment 4213 of a first diameter, a second segment 4214 of a second diameter, a third segment 4216 of a third diameter, a fourth segment 4218, a fifth segment 4219 of a fifth diameter, a first slot 4220, a first locking member seat 4222 (for example, a recess configured for receiving a key), a second slot 4224, a second locking member seat 4225, a lubricant inlet passage 4226, a lubricant delivery passage 4228, and a retention device groove 4229. The first segment 4213 can extend from an inboard face 4229 of the axial reaction flange 4206, with the second segment 4214 extending from the first segment 4213, the third segment 4216 extending from the second segment 4214, the fourth segment 4218 extending from the third segment 4216, and the fifth segment 4219 extending from the fourth segment 4218. In this manner, the input shaft segments 4213-4219 can define respective shoulders on which various components and/or subassemblies can be mounted.

The first end portion 4212 of the input shaft 4202 can include a shoulder 4230 extending from an outboard face 4231 of the axial reaction flange 4206 for supporting a bearing 4232 and can have a recess 4233 therein to provide for receiving a plug 4233 adapted to contain a spring (not shown) within a longitudinal passage 4236 of the input shaft 4202. The bearing 4232 serves to rotatably support the output shaft 2300 on the input shaft 4202. The spring and plug arrangement can be configured to bias the shift rod 6000 to a prescribed position. The first locking member seat 4222 is configured for receiving a retention device (for example, a key) that also engages a mating retention feature (for example, slot) of the auxiliary shaft 4600 for inhibiting unrestricted rotation of the auxiliary shaft 4600 with respect to the input shaft 4202. The second locking member seat 4225 is configured for engaging a retention device that also engages a mating structure (for example slot) of a power input means (not shown) such as, for example, a pulley, gear, sprocket, etc.

In one embodiment, a longitudinal passage 4236 of the input shaft 4202 extends along the longitudinal axis L1 between the end portions 4212, 4239. The longitudinal passage 4236 can be configured for having the shift rod 6000 slidably disposed therein. The slot 4220, 4224, the lubricant inlet passage 4226, and the lubricant delivery passage 4228 each extends communicatively between a respective exterior face of the input shaft 4202 and the longitudinal passage 4236 for allowing respective structural interconnection and/or providing a respective lubricant flow path.

Figure 52:
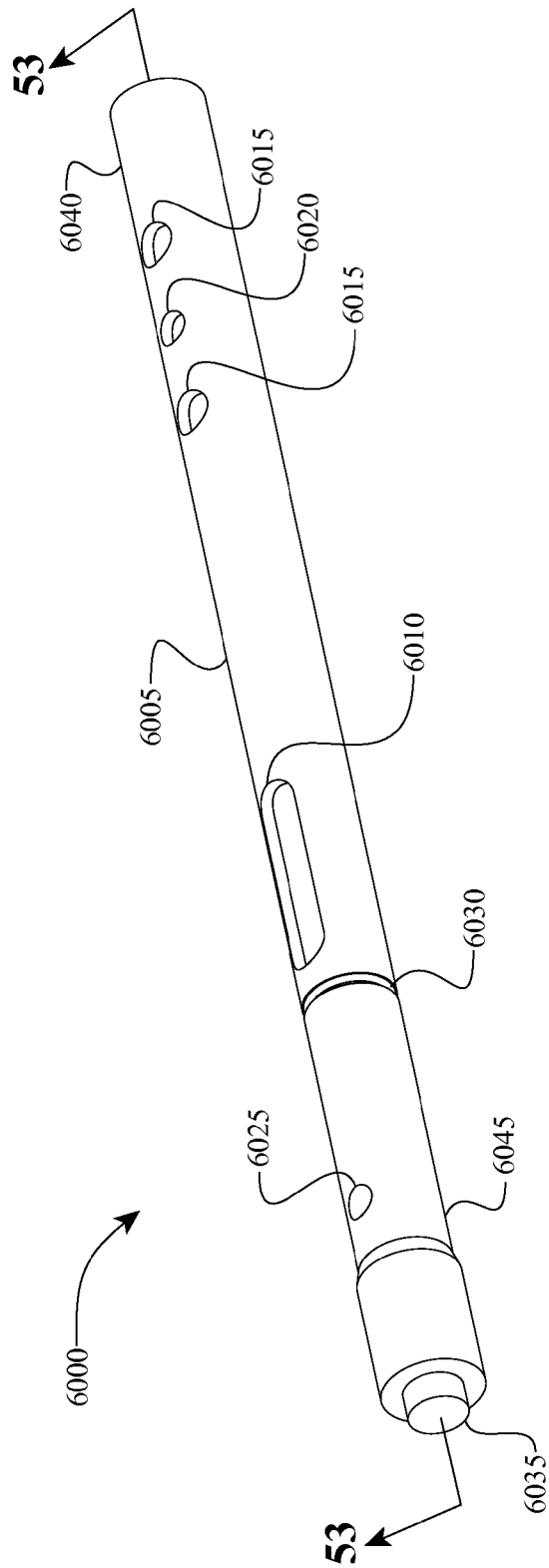
FIG. 52 is a perspective view of an embodiment of a shift rod that can be used with the IVT of FIG. 46.
Figure 53:
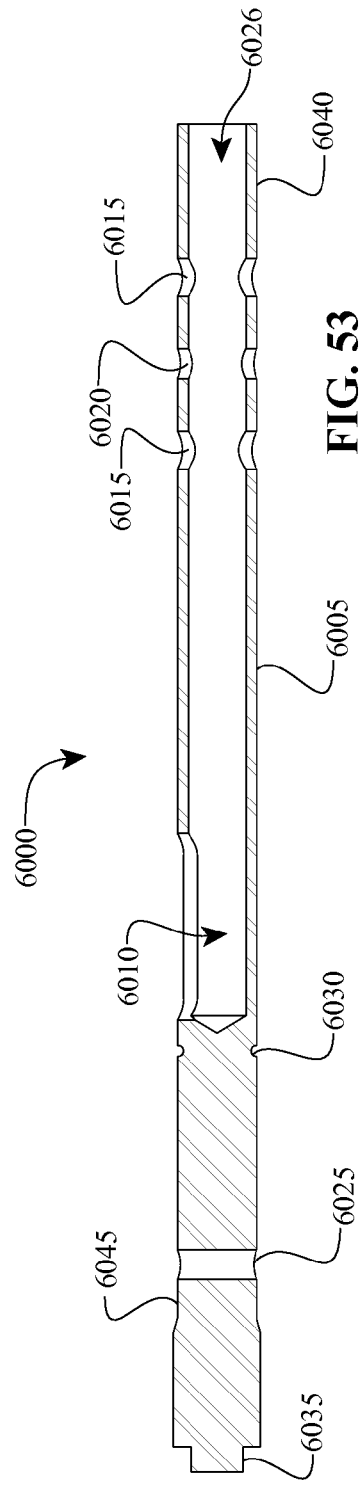
FIG. 53 is a cross-sectional view of the shift rod of FIG. 53.

As best shown in FIGS. 52 and 53, in one embodiment, the shift rod 6000 includes an elongated, generally round body 6005. The body 6005 includes a slot 6010, lubricant passages 6015, a first coupling device passage 6020, a second coupling device passage 6025, a central bore 6026, a seal groove 6030, and a piloting stub 6035. The central bore 6026 can extend partially from a first end portion 6040 of the body 6005 toward a second end portion 6045 or, alternatively, along the entire length. The slot 6010, the lubricant passages 6015, and the coupling device passages 6020 extend from an exterior surface of the elongated tubular body 3005 to the central bore 6026. The piloting stub engages a spring (not shown). This spring together with the spring (not shown) within the input shaft longitudinal passage 4236 can serve to bias or assist in moving the shift rod 6000 toward a particular position such as, for example, a position corresponding to a particular torque ratio.

Figure 54:
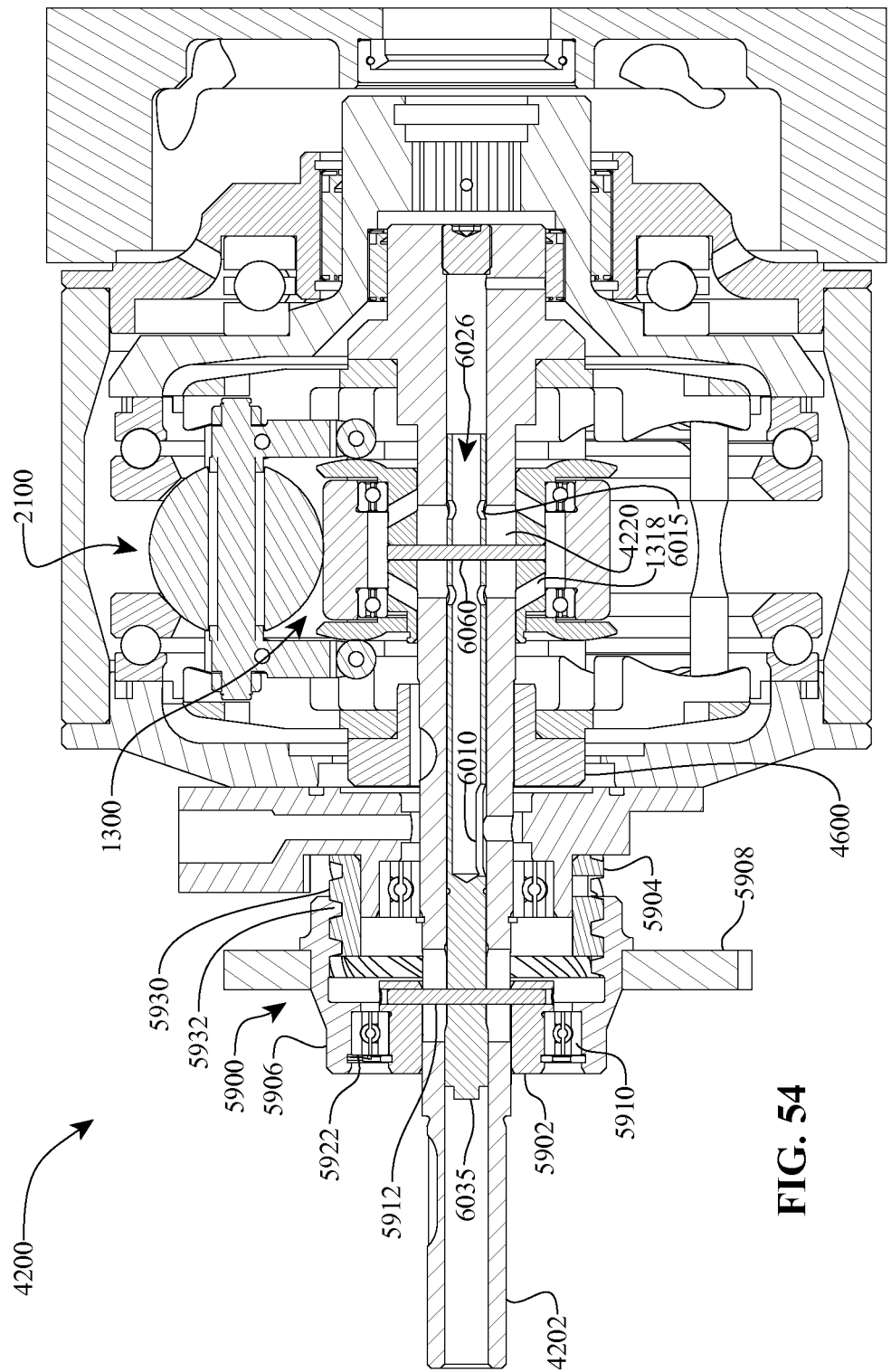
FIG. 54 is another cross-sectional view of the IVT of FIG. 46.
Figures 55, 56:
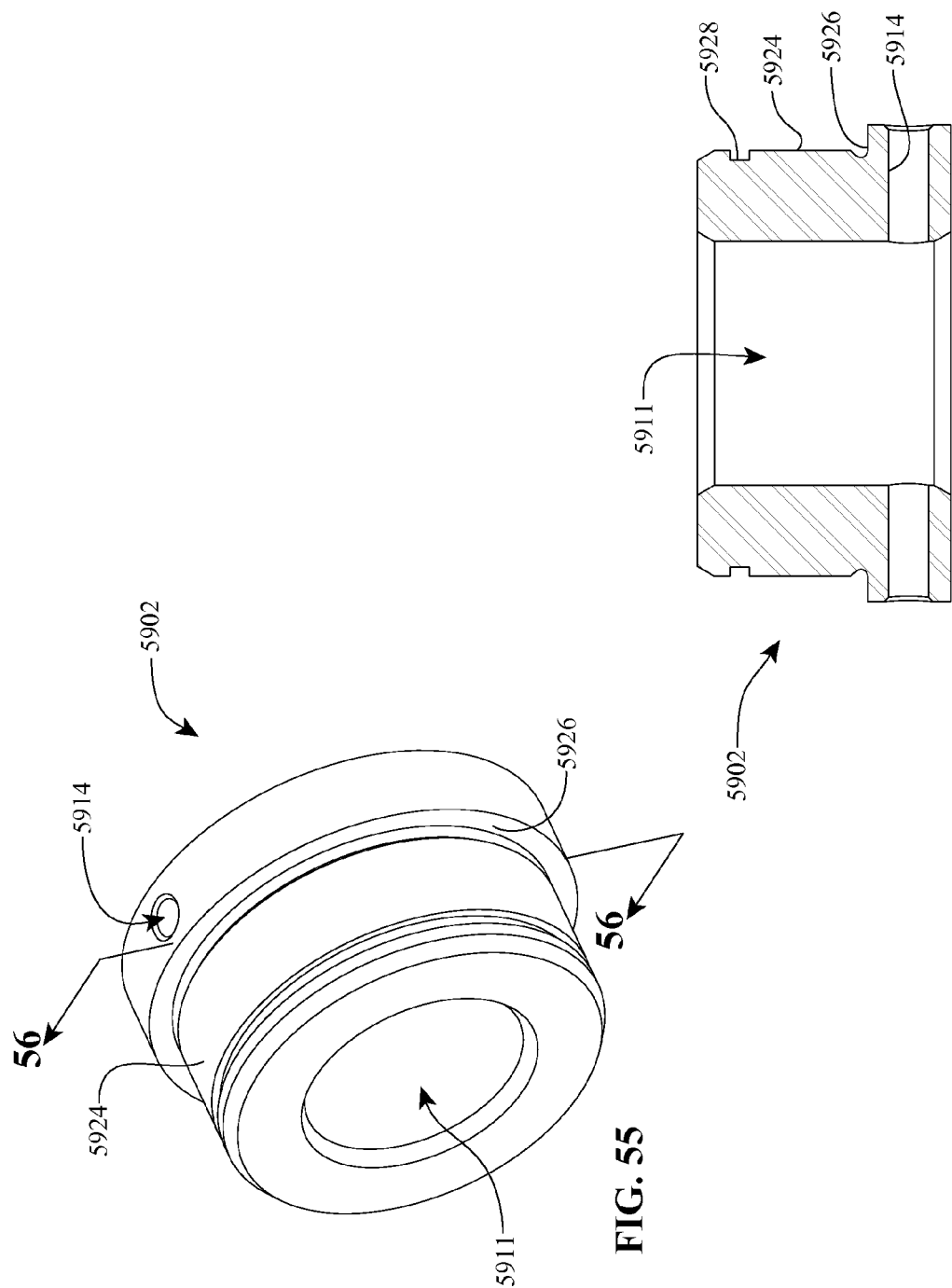
FIG. 55 is a perspective view of one embodiment of a shift pin collar that can be used with the IVT of FIG. 46.
FIG. 56 is a cross-sectional view of the shift pin collar of FIG. 55.

Referring to FIGS. 52-54, the shift rod 6000 can be slidably engaged within the input shaft longitudinal passage 4236 for affecting synchronous rotation of the planet-and-shift-lever subassemblies 2100. A coupling device 6060 such as a roll pin couples the shift rod 6000 to the shift-cam-and-sun subassembly 1300. The coupling device 6060 extends through the coupling device passage 6020 and fixedly engages the coupling member holes 1316 (see FIG. 16) of the shift-cam-and-sun subassembly 1300 such that axial translation of the shift rod 6000 causes a corresponding axial translation of the shift-cam-and-sun subassembly 1300. Through engagement of the shift-cam-and-sun subassembly 1300 with all of the planet-and-shift-lever subassemblies 2100, translation of the shift-cam-and-sun subassembly 1300 causes all of the planet-and-shift-lever subassemblies 2100 to synchronously rotate the about the respective axis T1, thereby resulting in an adjustment of the torque ratio. The slot 6010 allows lubricant to flow from the lubricant manifold 2700 into the central bore 6026 with the shift rod 6000 at various translated positions. The lubricant passages 6015 allow lubricant to flow from the central bore 6026 to the shift-cam-and-sun subassembly 1300 via the slot 4220 of the input shaft 4202 and the lubricant passage 1318 of the shift-cam-and-sun subassembly 1300.

Referring to FIGS. 54-60, in one embodiment, the shift actuation subassembly 5900 includes a shift pin collar 5902, a shift nut 5904, a shift screw 5906, a control plate 5908, a shift screw bearing 5910, and a coupling device 5912. The shift pin collar 5902 includes a central bore 5911 through which the fourth segment 4218 of the input shaft 4202 extends. The coupling device 5912 extends through the second coupling device passage 6025 of the shift rod 6000 and the second slot 4224 of the input shaft 4202 into fixed engagement with coupling device holes 5914 of the shift pin collar 5902. The central bore 5911 and the input shaft fourth segment 4218 are jointly configured such that the shift pin collar 5902 is translatable along the input shaft longitudinal reference axis L21. For example, in one embodiment, the central bore 5911 and the input shaft fourth segment 4218 are jointly dimensioned to provide a close tolerance clearance fit. Accordingly, translation of the shift pin collar 5902 along the input shaft 4202 causes a corresponding translation of the shift-cam-and-sun subassembly 1300 along the input shaft 4202.

The shift screw 5906 rotationally engages the shift pin collar 5902 and engages the shift nut 5904, which mounts on a mating structure of the lubricant manifold 5700 in a manner that limits, if not inhibits, relative rotation and translation therebetween. For example, in one embodiment, a press fit interface is provided between a central bore 5917 of the shift nut 5904 and the mating structure of the lubricant manifold 5700, which precludes the shift nut 5904 from relative rotation or translation with respect to the engaged mating structure. The shift screw bearing 5910 is coupled between the shift pin collar 5902 and the shift screw 5906 for allowing the shift pin collar 5902 to rotate independently from the shift screw 5906. With respect to the shift screw 5906 (See FIGS. 54, 58 and 59), the shift screw bearing 5910 mounts within a recess 5916 and is captured between a shoulder 5918 and a retention device 5922 engaged within a groove 5920. With respect to the shift pin collar 5902 (See FIG. 54-56), the shift screw bearing 5910 mounts on a neck 5924 and is captured between a shoulder 5926 and the retention device 5922, which is engaged within a groove 5928. Constrainment of the shift screw bearing 5910 in this manner inhibits unrestricted translation of the shift screw 5906 relative to the shift pin collar 5902.

Threads 5930 of the shift nut 5904 engage threads 5932 of the shift screw 5906. Rotation of the shift screw 5906 causes the shift screw 5906 to thread in or thread out of the shift nut 5904, resulting in corresponding translation of the shift screw 5906 along the input shaft longitudinal reference axis L21. Accordingly, due to constrainment of the shift screw 5906 with the shift pin collar 5902, the shift pin collar 5902 translates essentially in unison with the shift screw 5906 as does the shift rod 6000 and shift-cam-and-sun subassembly 1300. In this manner, the torque ratio can be adjusted through rotation of the shift screw 5906. The control plate 5908 can be attached to the shift screw 5906 such as through press fit interference between a central bore 5934 of the control plate 5908 and a shoulder 5936 of the shift screw 5906. In one embodiment, the shift screw 5906 includes a reaction flange 5014 adapted to react and/or locate the control plate 5908. In this manner, an external adjustment mechanism can be connected to the control plate 5908 such as via the one of more holes 5938 for allowing the external adjustment mechanism to control rotation of the shift screw 5906 and, thereby, control adjustment of the torque ratio.

Figure 62:
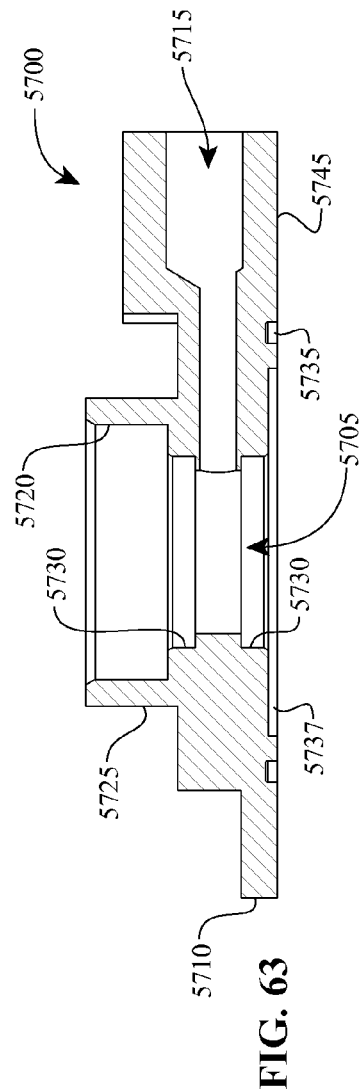
FIG. 62 is another perspective view of the lubricant manifold of FIG. 46.
Figure 61:
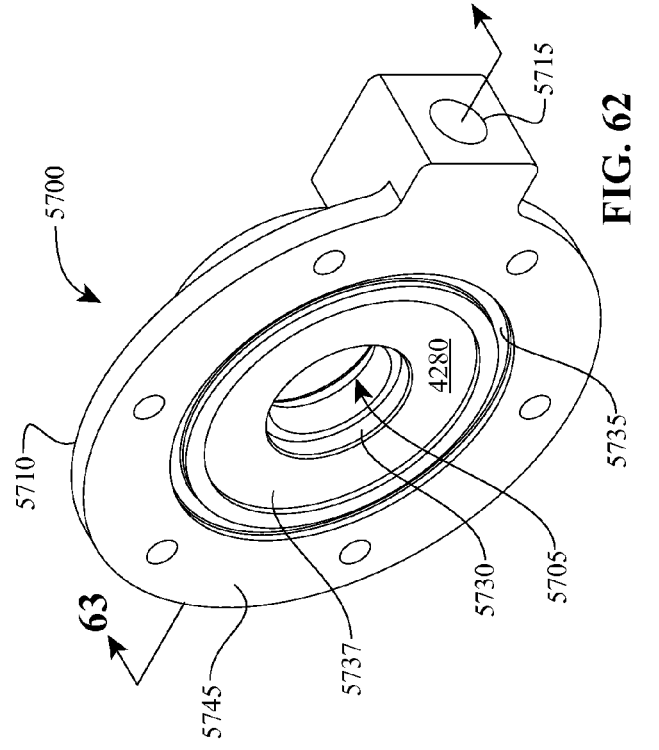
FIG. 61 is a perspective view of an embodiment of a lubricant manifold that can be used with the IVT of FIG. 46.
Figure 63:
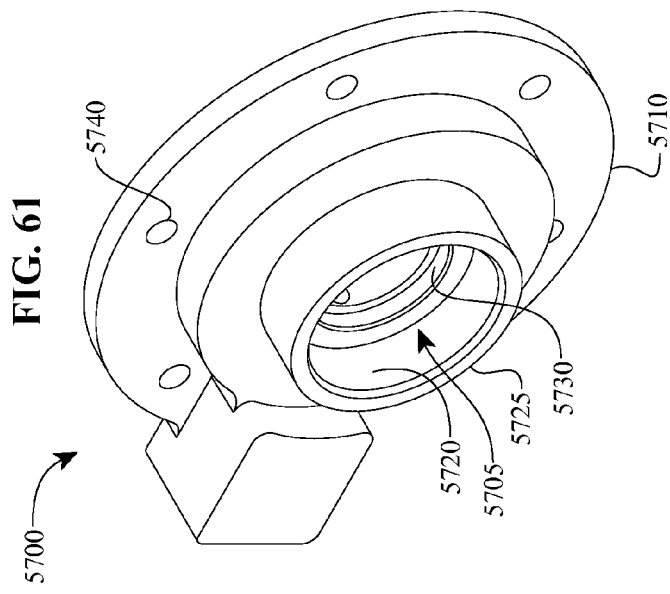
FIG. 63 is a cross-sectional view of the lubricant manifold of FIG. 46.

As best shown in FIGS. 61-63, in one embodiment, the lubricant manifold 5700 can include a central bore 5705, a flange 5710, a lubricant channel 5715, a bearing pocket 5720, an engagement shoulder 5725, bore seal grooves 5730, a flange seal groove 5735, and a recess 5737. The central bore 5705, the bearing pocket 5720, and the bore seal groove 5730 are axially aligned and concentric with respect to each other. The bore seal grooves 5730 can be provided within the central bore 5705. The lubricant channel 5715 intersects the central bore 2705 thereby allowing fluid communication therethrough. The lubricant channel 5715 can intersect the central bore 5705 at a position between the bore seal grooves 5730. The engagement shoulder 5725, which serves as the mating structure of the lubricant manifold on which the shift nut 5904 is mounted, can have a circular cross-sectional shape and be concentric with respect to the central bore 5705. Fastener holes 5740 can extend through the flange 5710 for allowing the flange 5710 to be fixedly engaged with the housing subassembly 5600. The flange seal groove 5735 is formed in an engagement face 5745 of the flange 5710. In one embodiment, the flange seal groove 5735 is configured for carrying a seal (for example, an O-ring seal) for providing a liquid and/or contaminant resistant seal between the flange 5710 and the housing subassembly 5600.

Referring now to FIGS. 61-64, in one embodiment, the lubricant manifold 5700 interfaces with the input shaft 4202 through the bearing 4208, which is captured within the bearing pocket 5720, and is fixedly secured to the housing subassembly 5600 by threaded fasteners (not shown) that extend through the mounting holes 5740 into threaded engagement with mating holes of the housing subassembly 5600. The recess 5737 provides for clearance between the lubricant manifold 5700 and the auxiliary axle 4600. Interaction of the lubricant manifold 5700 with the input shaft through the bearing 4208 allows rotation of the input shaft 4202 with respect to the lubricant manifold 5700. The lubricant channel 5715 aligns with the lubricant inlet passage 4226 of the input shaft 4202, thereby allowing lubricant supplied through the lubricant channel 5715 to flow into the shift rod central bore 3026. Accordingly, seals (not shown) within the spaced apart bore seal grooves 5730 engage the input shaft 4202 on opposing sides of the lubricant inlet passage 4226 between the input shaft 4202 and the lubricant manifold 5700.

Figure 64:
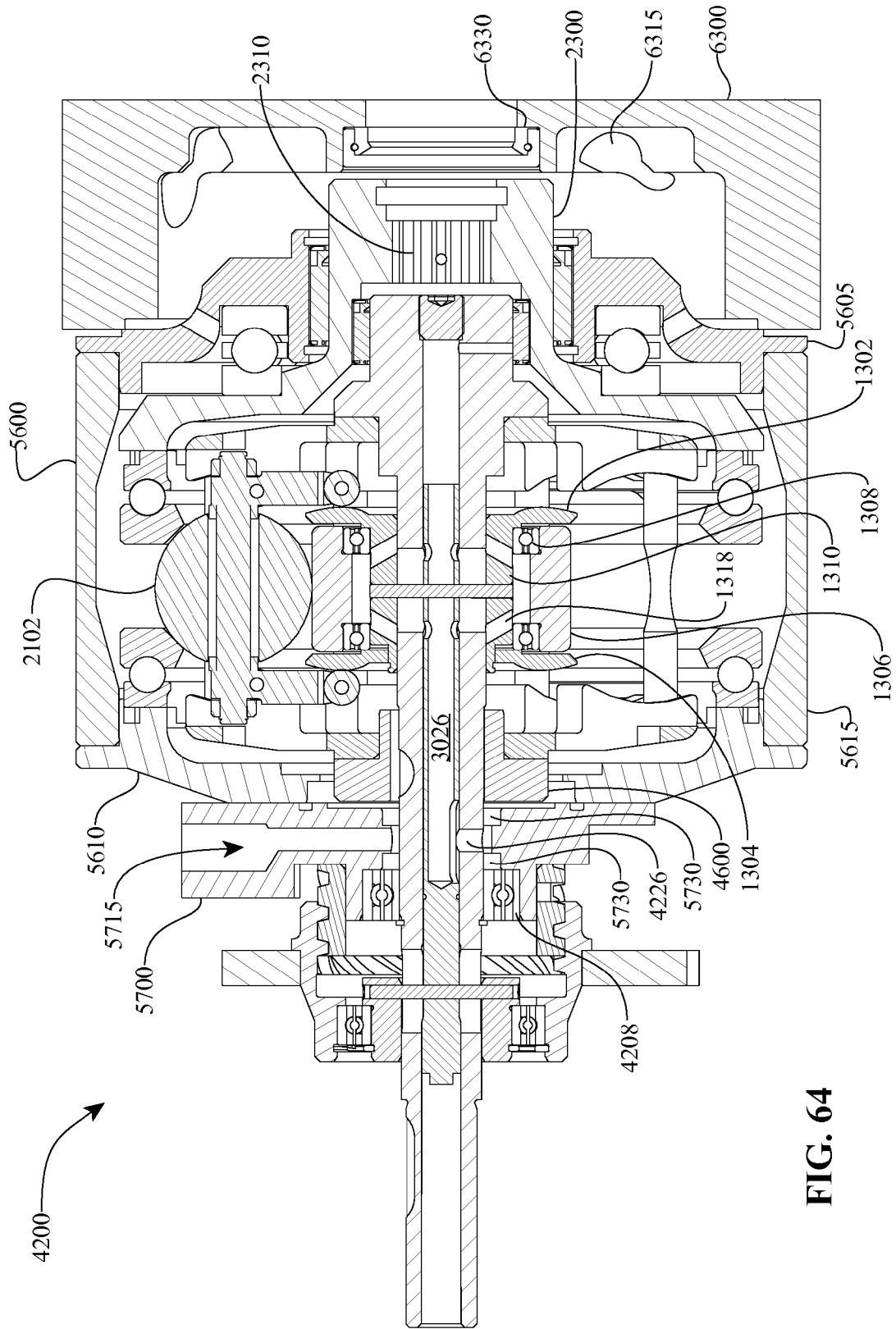
FIG. 64 is yet another cross-sectional view of the IVT of FIG. 46.

As shown in FIG. 64, in one embodiment, the housing subassembly 5600 includes a first housing cover plate 5605, a second housing cover plate 5610, and a central housing shell 5615. The second housing cover plate 5610 and the central housing shell 5615 are constructed and interconnected essentially the same as the second housing cover plate 2610 and the central housing shell 2615 discussed above in reference to the CVT 100. The first housing cover plate 5605 attaches to the central housing shell 5615 in essentially the same manner as the first housing cover plate 2605 attaches to the central housing shell 2615 discussed above in reference to the CVT 100. Furthermore, the housing subassembly 5600 engages the input shaft 4202 and auxiliary axle 4600 in the essentially the same manner as the housing subassembly 2600 mounts on the main axle 1000 and the auxiliary axle 1600 discussed above in reference to the CVT 100. Accordingly, the second housing cover plate 5610 and the central housing shell 5615 will not be discussed in further detail, nor will attachment of the first housing cover plate 5605 to the central housing shell 5615 or mounting of the housing assembly 5600 on the input shaft 4202.

Figure 66:
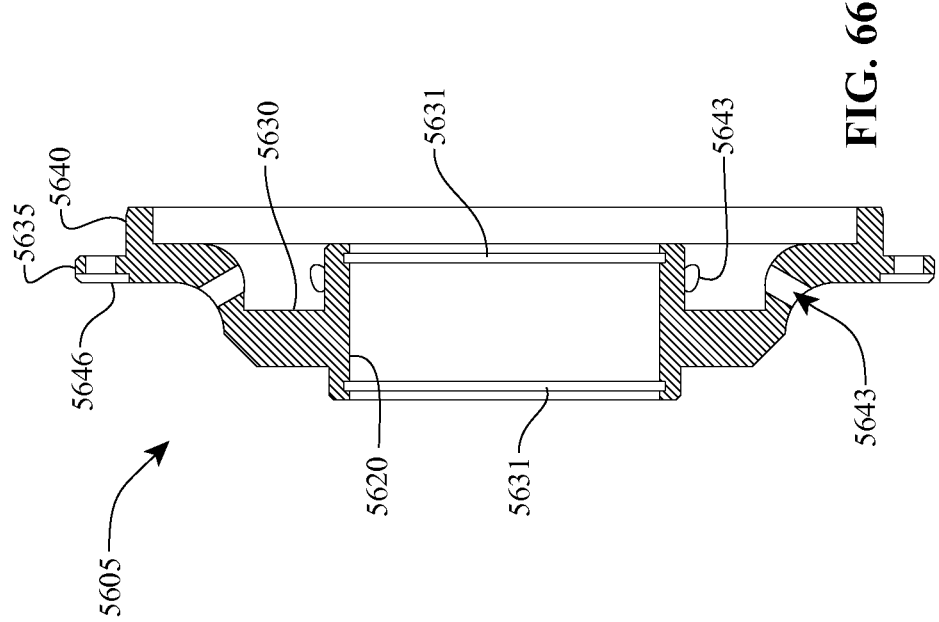
FIG. 66 is a cross-sectional view of the first housing cover plate of FIG. 46.
Figure 65:
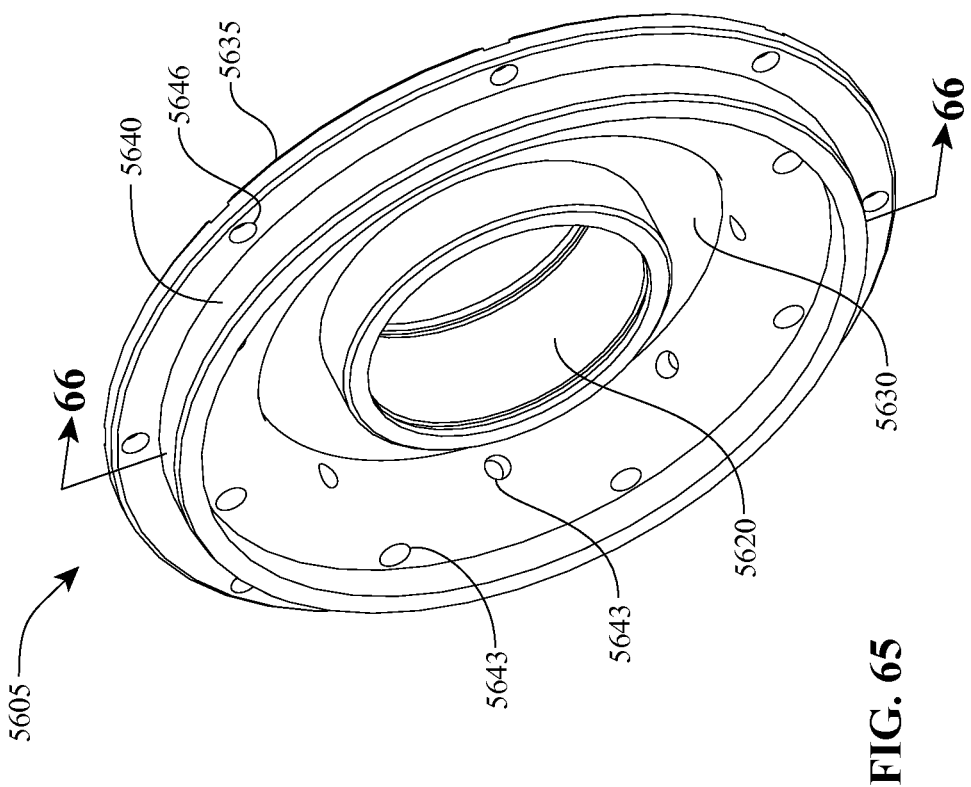
FIG. 65 is a perspective view of an embodiment of a first housing cover plate that can be used with the IVT of FIG. 46.

Referring to FIGS. 64-66, in one embodiment, the first housing cover plate 5605 includes a central bore 5620, a bearing recess 5630, retention device grooves 5631, a peripheral flange 5635, a peripheral shoulder 5640, and lubricant channels 5643. The first housing cover plate 5605 can be generally circular with the bearing recess 5630, the peripheral flange 5635, and the peripheral shoulder 5640 extending concentrically with respect to the longitudinal axis of the central bore 5620. Mounting holes 5646 can be provided in the peripheral flange 5635 such that fasteners can be extended therethrough to fixedly secure the first housing cover plate 5605 to the central housing shell 5615. The lubricant channels 5643 allow lubricant to drain from within the housing subassembly 5600.

As shown in FIGS. 67-69, in one embodiment, the lubricant sump 6300 includes a body 6302. The body 6302 includes chassis mounting holes 6305, housing mounting holes 6310, lubricant passages 6315, a lubricant cavity 6320, a central bore 6325, and a seal pocket 6330. The lubricant cavity 6320, the central bore 6325, and the seal pocket 6330 are preferably, but not necessarily, generally concentric. The lubricant passages 6315 extend from an exterior surface of the body 6302 to the lubricant cavity 6320 for allowing the flow of lubrication therethrough. The seal pocket 6330 is configured for receiving a seal therein to facilitate providing a seal with a power transfer shaft of a load (not shown) coupled with the splines 2310 of the output shaft 2300.

101951 The chassis mounting holes 6305 can be positioned adjacent an exterior perimeter edge portion of the body 6302 and can be configured for receiving fasteners therein to secure the lubricant sump to a support structure (for example, a chassis, housing, block and/or case of a vehicle, an engine, a transmission, a motor, a differential, a power take-off unit and/or the like). The housing mounting holes 6310 can be positioned uniformly around the lubricant cavity 6320 and can be configured for receiving fasteners therein to secure the body 6302 to the housing subassembly 5600. For example, the mounting holes 6310 can be arranged to align with all or a portion of the mounting holes 5646 of the first housing cover plate 5605 such that the same fasteners fasten the body 6302 and the first housing cover plate 5605 to the central housing shell 5615 of the housing subassembly 5600.

In operation (referring to FIG. 64), lubricant is supplied to the lubricant manifold 5700 through the lubricant channel 5715 by a pump (not shown). From the lubricant channel 5715, lubricant flows through the lubricant inlet passage 4226 and the slot 6010 into the central bore 6026 of the shift rod 6000. From the central bore 6026, lubricant flows through the shift rod 6000 to lubricant ports 6015 of the shift rod 6000 and into one or both of the lubricant channels 1318 of the shift cam extension 1310. The lubricant lubricates the shift cam thrust bearings 1308 and, after exiting via the space between the shift cam bodies 1302, 1304 and the sun 1306, lubricates the planets 2102. Lubricant flows through the lubricant channels 5643 in the first cover plate 5605 and collects in the lubricant sump 6300. Lubricant is then recirculated from the lubricant sump 6300 to the lubricant manifold 5700.

Figure 70:
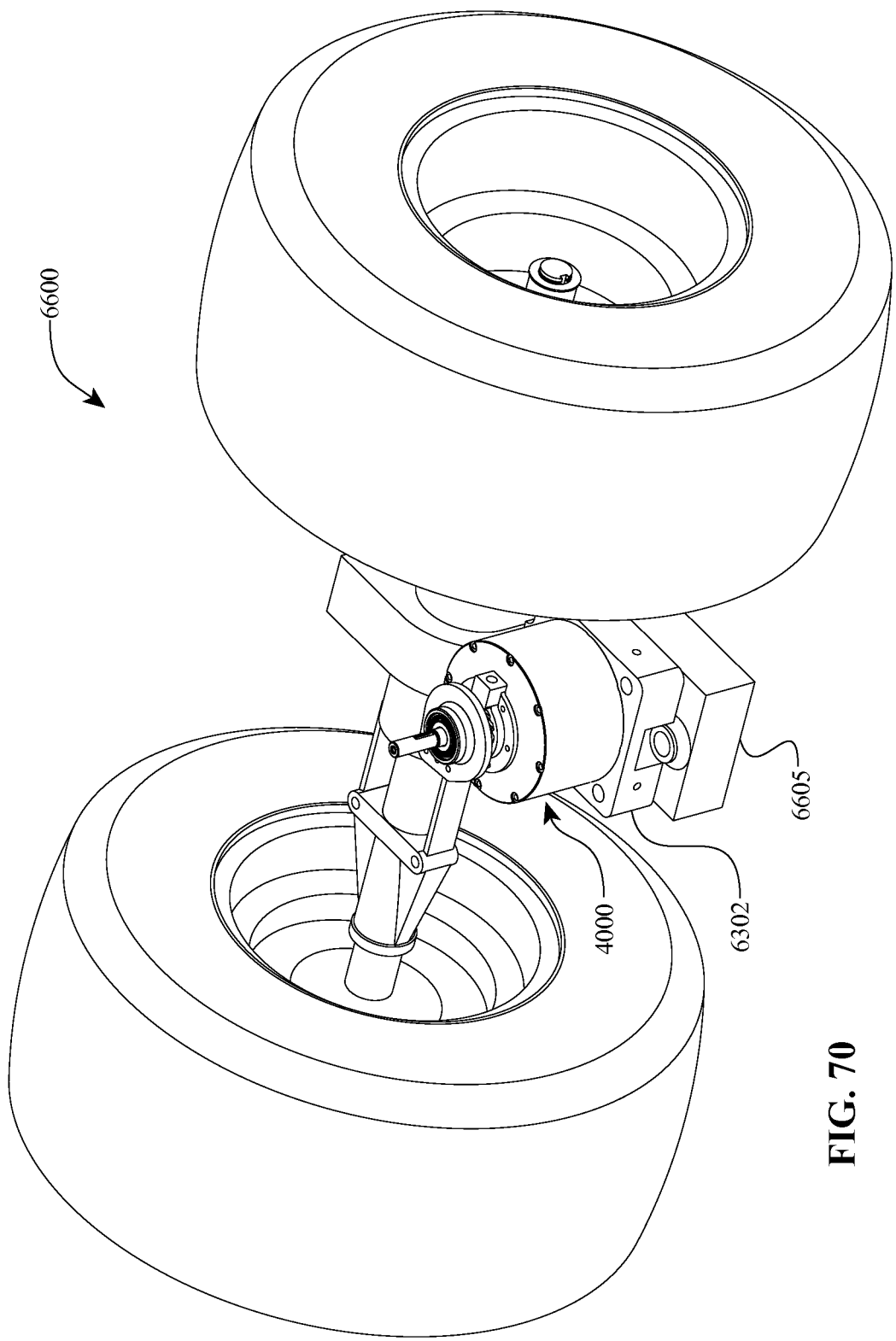
FIG. 70 is a perspective view of one embodiment of a tractor rear end assembly configured to cooperate with the IVT of FIG. 46.

Referring now to FIG. 70, in one embodiment, a tractor rear end assembly 6600 includes a drivetrain unit 6605 (for example, a differential unit) with the IVT 4000 coupled thereto. The lubricant sump body 6302 is fixedly attached to the drivetrain unit 6605 (for example, bolted thereto) thereby fixedly attaching the IVT 4000 to the drivetrain unit 6605. A power transfer shaft (not shown) of the drivetrain unit 6605 is engaged with the output shaft 2300 for allowing rotational power to be transferred from the IVT 4000 to the drivetrain unit 6605.

Turning now to FIGS. 71-73 and again to FIG. 52, in one embodiment, an infinitely variable transmission (IVT) 6700 includes a shift-stop-spring assembly 6701 and a shift-stop dowel assembly 6702. The shift-stop dowel assembly 6702 can be coupled to the piloting stub 6035 (see FIG. 52) on one end of the shift rod 6000. In one embodiment, the shift-stop dowel assembly 6702 can include a spring 6703 arranged on the inner bore of the input shaft 4202 that pilots on the piloting stub 6035. The spring 6703 surrounds and retains a shift-stop dowel 6704. An adjustment screw 6705 can be coupled to the inner bore of the input shaft 4202. In one embodiment, the shift-stop-spring assembly 6701 can be coupled to the end of the shift rod on a distal end from the piloting stub 6035 end. In some embodiments, the shift-stop-spring assembly 6701 can include a shift stop cylinder 6708 coupled to a shift spring 6706. An adjustment screw 6710 can thread in the input shaft 4202 and couple to the shift stop cylinder 6708. The shift spring 6706 can be coupled to one end of the shift rod 6000 and pilot on the inner bore of the shift stop cylinder 6708. In some embodiments, the shift stop cylinder 6708 is a generally hollow cylinder with a closed end having a lubricant drainage hole 6709 and at least one lubricant bleed slot 6707. The lubricant drainage hole 6709, in cooperation with a flat 6711 formed onto the side of the adjustment screw 6710, prevents the build-up of lubricant pressure along the inner bore of the input shaft 4202.

During operation of the IVT 6700, the shift rod 6000 translates axially to actuate a change in transmission ratio. The range of transmission ratio corresponds at least in part to the axial distance travelled by the shift rod 6000. In some embodiments, the axial travel of the shift rod 6000 is limited on one end by the shift-stop-spring assembly 6701, and is limited on another end by the shift-stop-dowel assembly 6702. During operation of the IVT 6700, reaction of the gyroscopic overturning moment that can be generated in the IVT 6700 is achieved by limiting the axial travel of the shift rod 6000 with, for example, washers 6750, or with the shift stop dowel assembly 6702 and the shift-stop-spring assembly 6701. Collectively, these means of limiting axial travel of the shift rod 6000 are called shift stops. The gyroscopic forces imposed on various rotating components depend on the axial position of the shift stops. Shift stops can prevent excess axial travel of the shift-cam-and-sun assembly 1300 due to the gyroscopic forces that tend to tilt the planet-and-shift-lever assemblies 2100 during operation. Without shift stops such as washers 6750, the gyroscopic forces are reacted through the coupling device 1002. In other embodiments, the washers 6750 can be replaced by springs, such as disc springs or wave springs to provide some restoring force to the shift rod. The shift stop springs 6703 and 6706 can provide a restoring force to the shift rod 6000. The axial position of the adjustment screws 6705 and 6710 along the input shaft 4202 can be adjusted to set the desired maximum axial travel of the shift rod 6000, and therefore set the desired transmission ratio range.

Figure 71:
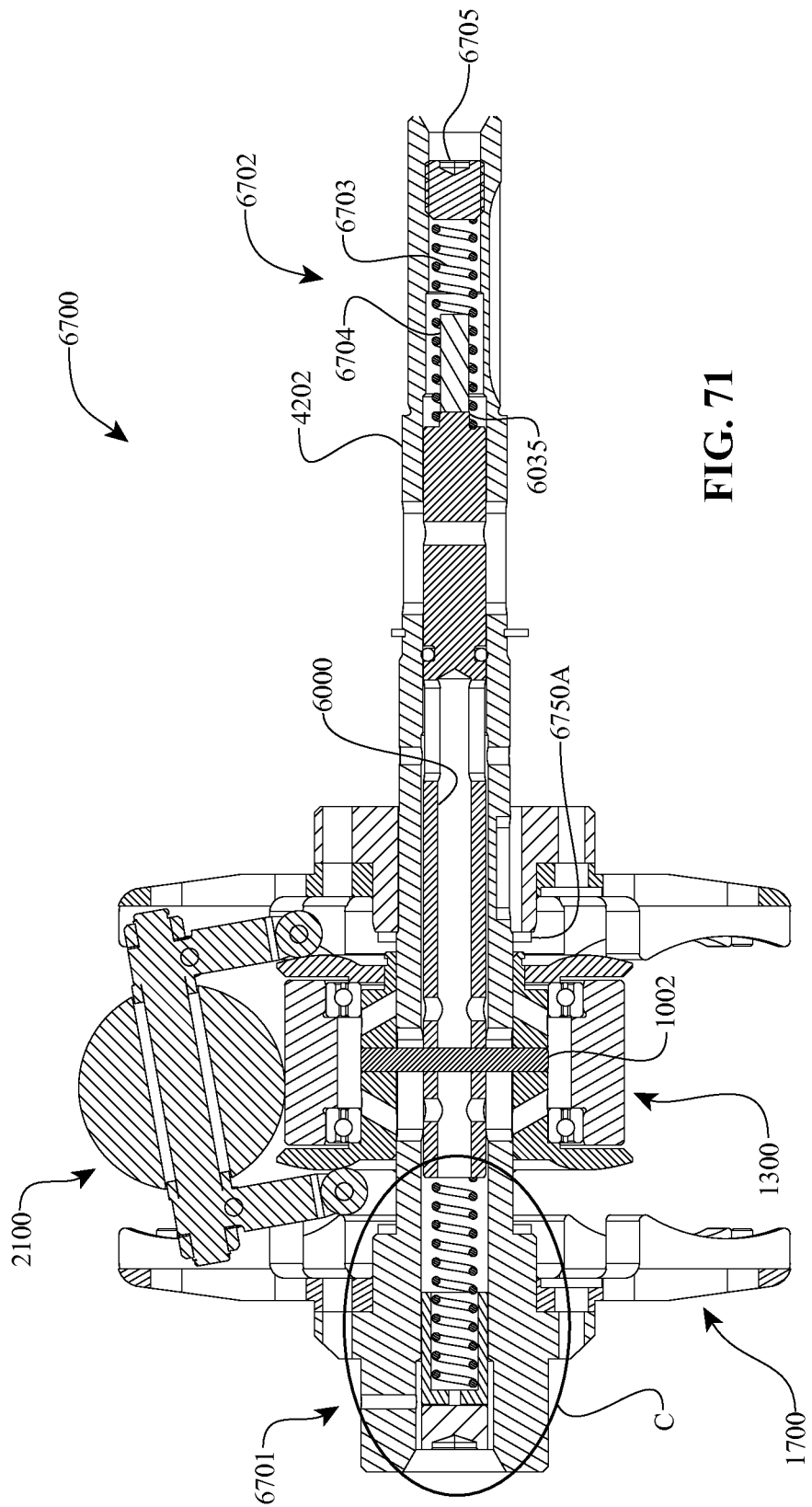
FIG. 71 is a partial cross-sectional view of another embodiment of an infinitely variable transmission (IVT).

Still referring to FIG. 71, during loaded operation of the IVT 6700, the planet-and-shift-lever assemblies 2100 deflect and orient the respective planet longitudinal axis L4 (see FIG. 3) in a direction that subsequently creates internal forces that effectively cause the tilt angle of the planet-and-shift-lever assemblies 2100 to change, and thereby change the transmission ratio. This phenomenon is referred here as "skew" and is a function of, among other things, the backlash (or play) at the interface between the planet-and-shift-lever assemblies 2100 and the stator assembly 1700. Further explanation of skew can be found in U.S. Patent Application 60/948,152. During operation, a skew backlash generates a small change in transmission ratio known as a ratio backlash. During certain operating conditions, the skew backlash among the planet-and-shift-lever assemblies 2100 is centered and symmetric about the transmission axis L1 and the effective ratio backlash is substantially centered about the powered zero state. During conditions when the powered zero state is within the ratio backlash, the IVT 6700 can maintain the powered zero state by automatically changing the transmission ratio. It is preferred to provide enough skew backlash to allow the operation described. There is a small but definite range for the skew backlash which will provide optimum control feel and performance. In some instances, skew backlash is in the range of 0.002 to 0.004 inches measured between the interfaces of the planet-and-shift-lever assemblies 2100 and the stator assembly 1700. In some embodiments, a brake (not shown) can be coupled to the output of IVT 6700 and engaged, without damaging the IVT, to ensure a zero output speed. In one embodiment, a switch, positioned on a control linkage for example, engages the brake through an electromotive actuator. In other embodiments, a clutch can be coupled to the input shaft 4202 and to the prime mover of the vehicle. In one embodiment, the clutch can be, for example, an automotive grade air conditioner compressor clutch with a pulley interface for a mid-1990's Honda Accord, or other appropriately sized clutching mechanism. A method to maintain the powered zero state can include actuating the clutch to disengage the input shaft 4202 from the prime mover when the transmission ratio is near the powered zero state. This method can reduce sensitivity to an error in the set point for the powered zero state.

Various embodiments of subassemblies are disclosed herein and each includes respective components thereof. It is disclosed herein that such subassemblies are not limited to the specific constituent components shown herein. For example, each one of such subassemblies can include few, greater and/or different constituent components disclosed herein. Furthermore, the functionality provided by a subassembly disclosed herein can be provided by a collection of components that are not characterized or deemed to be a subassembly. Furthermore, the bearings and bushings can be used interchangeably in some or all of their implementations. Still further, unless otherwise specified, the inventive embodiments are not limited to bearings being of a particular type.

The embodiments described herein are examples provided to meet the descriptive requirements of the law and to provide examples. These examples are only embodiments that can be employed by any party and they are not intended to be limiting in any manner. Therefore, the invention is defined by the claims that follow and not by any of the examples or terms used herein.

What is claimed is:

1. An infinitely variable transmission comprising:
   a rotatable input shaft arranged along a longitudinal axis of the transmission, the input shaft having an elongated tubular body with a central bore and an opening, wherein the elongated tubular body and the opening define a lubricant passage from an exterior surface to the interior of the transmission;
   a stator assembly coupled to, and coaxial with, the input shaft;
   a plurality of planets operably coupled to the stator assembly, wherein the plurality of planets are arranged angularly about the longitudinal axis of the transmission;
   a traction ring operably coupled to the plurality of planets, wherein the traction ring is substantially fixed from rotating with the input shaft; and
   a housing operably coupled to the traction ring, wherein the housing is substantially fixed from rotating with the input shaft.

2. The infinitely variable transmission of claim 1, wherein the opening is proximate a shift-cam-and-sun subassembly.

3. The infinitely variable transmission of claim 1, wherein the opening is proximate a planet-and-shift-lever subassembly.

4. The infinitely variable transmission of claim 1, further comprising a lubricant manifold configured to supply a lubricant to the input shaft.

5. The infinitely variable transmission of claim 1, further comprising a load cam ring coaxial with the plurality of planets, the load cam ring comprising:
   a substantially annular ring having a front face and a rear face;
   a plurality of bi-directional ramps located on the front face of the load cam ring, wherein the cross-section of the ramps is curved; and
   a plurality of engagement features located on the rear face of the load cam ring.

6. The infinitely variable transmission of claim 5, further comprising a plurality of load cam rollers coupled to the load cam ring.

7. The infinitely variable transmission of claim 1, further comprising a shift rod coupled to the input shaft.

8. The infinitely variable transmission of claim 7, wherein the shift rod is disposed in the central bore of the input shaft.

9. The infinitely variable transmission of claim 7, wherein the shift rod comprises a central bore that forms a portion of the lubricant passage to supply a lubricant to the interior of the transmission.

10. A method for lubricating internal components of a transmission having a plurality of planets operably coupled to a stator assembly and a traction ring operably coupled to the planets, the method comprising:
    providing a lubricant manifold configured to cooperate with a lubricant source;
    coupling a main axle of the transmission to the lubricant manifold, the main axle comprising an elongated tubular body having a central bore and an opening, wherein the main axle is adapted to receive a rotational power, wherein the central bore and the opening form a portion of a lubricant passage;
    providing a shift rod arranged in the central bore of the main axle, the shift rod having a central bore;
    supplying a lubricant via the lubricant manifold to the main axle;
    delivering the lubricant via the main axle lubricant passage to the shift rod;
    providing a housing operably coupled to the traction ring, wherein the housing is substantially fixed from rotating with the main axle; and
    adapting the traction ring to be substantially fixed from rotating with the main axle.

11. The method of claim 10, further comprising supplying a pressurized lubricant from the lubricant source.

12. The method of claim 10, further comprising delivering the lubricant through the main axle lubricant passage to the interior of the transmission.

13. The method of claim 10, wherein the opening is proximate a shift-cam-and-sun subassembly.

14. The method of claim 10, wherein the opening is proximate a planet-and-shift-lever subassembly.

15. An infinitely variable transmission comprising:
    a lubricant manifold configured to cooperate with a lubricant source;
    a rotatable input shaft arranged along a longitudinal axis of the transmission, the input shaft comprising an elongated tubular body having a central bore in fluid communication with the lubricant manifold and an opening to supply a lubricant to the interior of the transmission, wherein the central bore and the opening form a portion of a lubricant passage;

a stator assembly coupled to, and coaxial with, the input shaft;

a plurality of planets operably coupled to the stator assembly, wherein the plurality of planets are arranged angularly about the longitudinal axis of the transmission;

a traction ring operably coupled to the plurality of planets, wherein the traction ring is substantially fixed from rotating with the input shaft; and a housing operably coupled to the traction ring, wherein the housing is substantially fixed from rotating with the input shaft.

16. The infinitely variable transmission of claim 15, wherein the lubricant source is pressurized.

17. The infinitely variable transmission of claim 15, wherein the opening is proximate a shift-cam-and-sun subassembly.

18. The infinitely variable transmission of claim 15, wherein the opening is proximate a planet-and-shift-lever subassembly.

* * * * *